United States Patent [19]

Hayashi

[11] Patent Number: 5,611,037
[45] Date of Patent: Mar. 11, 1997

[54] METHOD AND APPARATUS FOR GENERATING IMAGE

[75] Inventor: Tetsuya Hayashi, Hanno, Japan

[73] Assignee: Casio Computer Co., Ltd., Tokyo, Japan

[21] Appl. No.: 405,521

[22] Filed: Mar. 16, 1995

[30] Foreign Application Priority Data

| Mar. 22, 1994 | [JP] | Japan | 6-075353 |
| Mar. 22, 1994 | [JP] | Japan | 6-075354 |
| Mar. 22, 1994 | [JP] | Japan | 6-075355 |
| Mar. 22, 1994 | [JP] | Japan | 6-075356 |

[51] Int. Cl.$^6$ .................................................. G06T 11/00
[52] U.S. Cl. ..................... 395/142; 395/133; 395/135; 395/328
[58] Field of Search .................... 395/142, 118, 395/129, 133–135, 141, 125, 155, 159–161, 131; 348/584; 382/276

[56] References Cited

U.S. PATENT DOCUMENTS

| 4,276,570 | 6/1981 | Burson et al. | 382/276 |
| 4,791,581 | 12/1988 | Ohba | 395/125 |
| 4,872,056 | 10/1989 | Hicks et al. | 348/584 |
| 5,247,610 | 9/1993 | Oshima et al. | 395/135 |
| 5,309,549 | 5/1994 | Iwamoto et al. | 395/141 X |
| 5,444,839 | 8/1995 | Silverbrook et al. | 395/141 |

FOREIGN PATENT DOCUMENTS

0571934A2  12/1993  European Pat. Off. .

OTHER PUBLICATIONS

Siggraph 1980 Conference Proceedings, Seventh Annual Conference on Computer Graphics and Interactive Techniques, Seattle, Wa. Jul. 1980, vol. 14, No. 3, ISSN 0097–8930, Computer Graphics, pp. 182–188, Ackland B. et al "Real time animation playback on a frame store display system".

Computer Gaphics and Image Processing, Nov. 1982, vol. 20, No. 3, ISSN 0146–664X, pp. 288–295, Distante A. et al, "A two–pass filling algorithm for raster graphics".

Pattern Recognition Letters, vol. 7, No. 5, Jun. 1988, pp. 299–303, XP 000005099, Sirjani A. et al, "An Algorithm for Polygonal Approximation of a Digital Object", p. 299.

CVGIP Graphical Models and Image Processing, vol. 55, No. 4, Jul. 1993, pp. 286–320, XP 000383908, Rosin P.L., "Multiscale Representation and Matching of Curves using Codons".

Primary Examiner—Almis R. Jankus
Attorney, Agent, or Firm—Frishauf, Holtz, Goodman, Langer & Chick

[57] ABSTRACT

A stored plurality of closed curved line data define a plurality of closed curved lines that represent parts of a face image. From the stored data, all coordinates of the closed curved lines on a raster grid plane are computed. A stored plurality of color data each designate a color of a different one of the image objects surrounded by the closed curved lines. Each coordinate on the plane is painted with a color designated by the stored color data of the image object having the highest priority in the image objects that include the coordinate, thus making a colored face image. The face expression of the image may be changed by transforming the closed curved lines with stored transforming data. An animation of an image sequence with a continuously changing face expression may be made by successively transforming the closed curved lines with a stored sequence of transforming data. Bit map data may be applied to represent part of the face image.

36 Claims, 38 Drawing Sheets

FIG.3

| (1) | (2) | (n) |
|---|---|---|
| CLOSED CURVED LINE A GEN DATA | CLOSED CURVED LINE A GEN DATA | CLOSED CURVED LINE A GEN DATA |
| CLOSED CURVED LINE B GEN DATA | CLOSED CURVED LINE B GEN DATA | CLOSED CURVED LINE B GEN DATA |
| CLOSED CURVED LINE C GEN DATA | CLOSED CURVED LINE C GEN DATA | CLOSED CURVED LINE C GEN DATA |
| CLOSED CURVED LINE D GEN DATA | CLOSED CURVED LINE D GEN DATA | CLOSED CURVED LINE D GEN DATA |
| CLOSED CURVED LINE E GEN DATA | CLOSED CURVED LINE E GEN DATA | CLOSED CURVED LINE E GEN DATA |
| CLOSED CURVED LINE F GEN DATA | CLOSED CURVED LINE F GEN DATA | CLOSED CURVED LINE F GEN DATA |
| CLOSED CURVED LINE A COLOR DATA | CLOSED CURVED LINE A COLOR DATA | CLOSED CURVED LINE A COLOR DATA |
| CLOSED CURVED LINE B COLOR DATA | CLOSED CURVED LINE B COLOR DATA | CLOSED CURVED LINE B COLOR DATA |
| CLOSED CURVED LINE C COLOR DATA | CLOSED CURVED LINE C COLOR DATA | CLOSED CURVED LINE C COLOR DATA |
| CLOSED CURVED LINE D COLOR DATA | CLOSED CURVED LINE D COLOR DATA | CLOSED CURVED LINE D COLOR DATA |
| CLOSED CURVED LINE E COLOR DATA | CLOSED CURVED LINE E COLOR DATA | CLOSED CURVED LINE E COLOR DATA |
| CLOSED CURVED LINE F COLOR DATA | CLOSED CURVED LINE F COLOR DATA | CLOSED CURVED LINE F COLOR DATA |

FIG.4

| |
|---|
| SELECTED FACE IMAGE NO. |
| CLOSED CURVED LINE A GEN DATA |
| CLOSED CURVED LINE B GEN DATA |
| CLOSED CURVED LINE C GEN DATA |
| CLOSED CURVED LINE D GEN DATA |
| CLOSED CURVED LINE E GEN DATA |
| CLOSED CURVED LINE F GEN DATA |
| CLOSED CURVED LINE A COLOR DATA |
| CLOSED CURVED LINE B COLOR DATA |
| CLOSED CURVED LINE C COLOR DATA |
| CLOSED CURVED LINE D COLOR DATA |
| CLOSED CURVED LINE E COLOR DATA |
| CLOSED CURVED LINE F COLOR DATA |
| COLOR CONDITION FLAG (A) |
| COLOR CONDITION FLAG (B) |
| COLOR CONDITION FLAG (C) |
| COLOR CONDITION FLAG (D) |
| COLOR CONDITION FLAG (E) |
| COLOR CONDITION FLAG (F) |
| BACKGROUND COLOR NO. |
| |

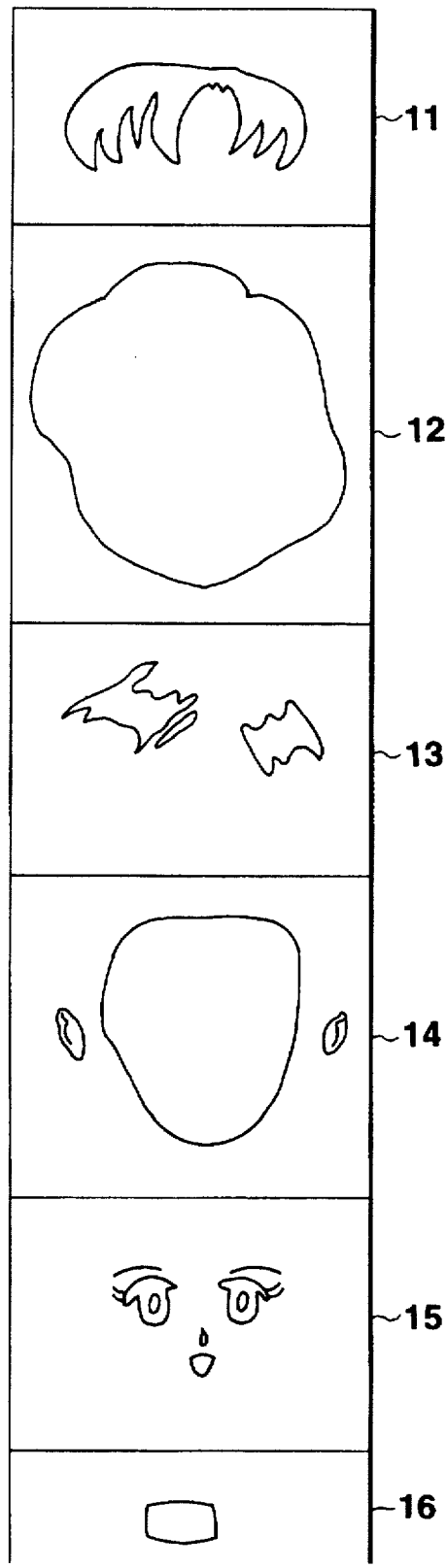

COLOR CONDITION FLAGS (INITIALIZED)

| COLOR OF OBJECT 1 | -1 |
| --- | --- |
| COLOR OF OBJECT 2 | -1 |
| COLOR OF OBJECT 3 | -1 |
| ⋮ | ⋮ |
| COLOR OF OBJECT n | -1 |
| COLOR OF BACKGROUND | COLOR NO. |

FIG.15

| CLOSED CURVED LINE A GEN DATA |
|---|
| CLOSED CURVED LINE B GEN DATA |
| CLOSED CURVED LINE C GEN DATA |
| CLOSED CURVED LINE D GEN DATA |
| CLOSED CURVED LINE E GEN DATA |
| CLOSED CURVED LINE F GEN DATA |
| CLOSED CURVED LINE A COLOR DATA |
| CLOSED CURVED LINE B COLOR DATA |
| CLOSED CURVED LINE C COLOR DATA |
| CLOSED CURVED LINE D COLOR DATA |
| CLOSED CURVED LINE E COLOR DATA |
| CLOSED CURVED LINE F COLOR DATA |

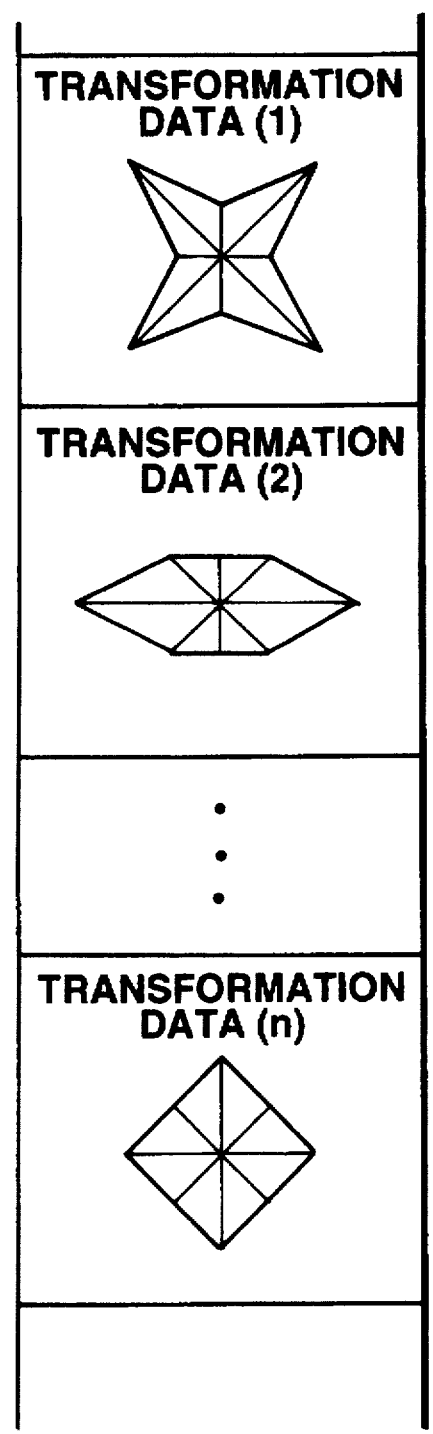

FIG.16

| | |
|---|---|
| CLOSED CURVED LINE A GEN DATA | |
| CLOSED CURVED LINE B GEN DATA | |
| CLOSED CURVED LINE C GEN DATA | |
| CLOSED CURVED LINE D GEN DATA | |
| CLOSED CURVED LINE E GEN DATA | |
| CLOSED CURVED LINE F GEN DATA | |
| CLOSED CURVED LINE A COLOR DATA | |
| CLOSED CURVED LINE B COLOR DATA | |
| CLOSED CURVED LINE C COLOR DATA | |
| CLOSED CURVED LINE D COLOR DATA | |
| CLOSED CURVED LINE E COLOR DATA | |
| CLOSED CURVED LINE F COLOR DATA | |
| COLOR CONDITION FLAG (A) | |
| COLOR CONDITION FLAG (B) | |
| COLOR CONDITION FLAG (C) | |
| COLOR CONDITION FLAG (D) | |
| COLOR CONDITION FLAG (E) | |
| COLOR CONDITION FLAG (F) | |
| BACKGROUND COLOR NO. | |

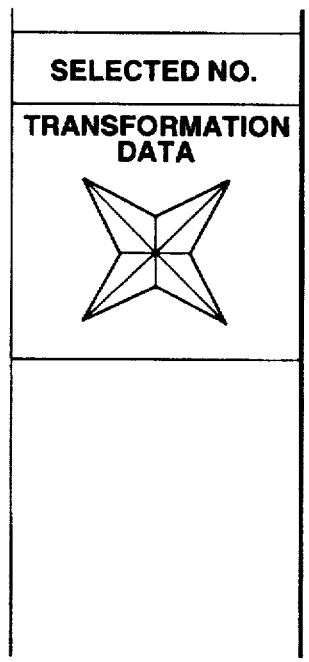

SELECTED NO.

TRANSFORMATION DATA

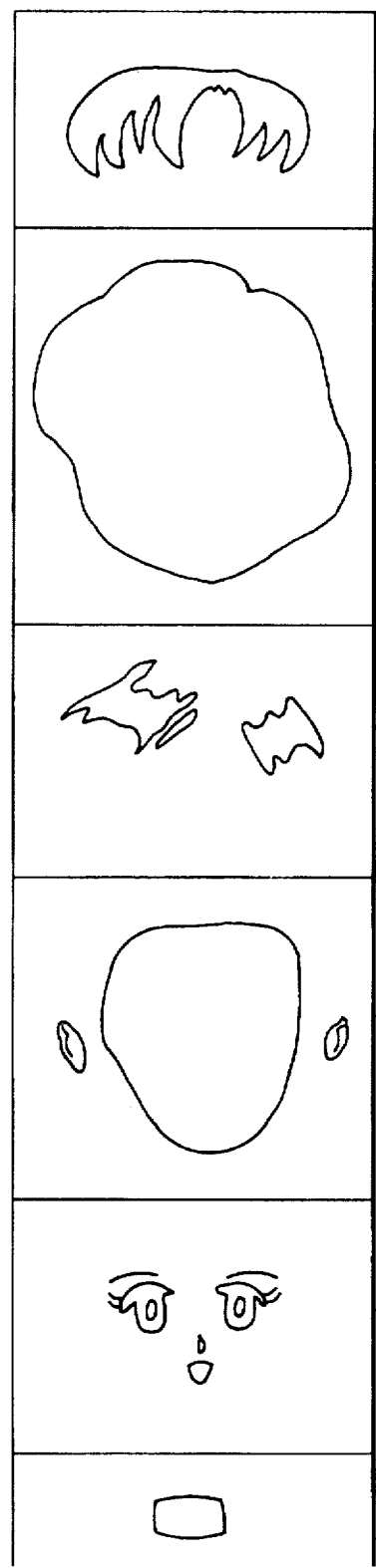

FIG.20
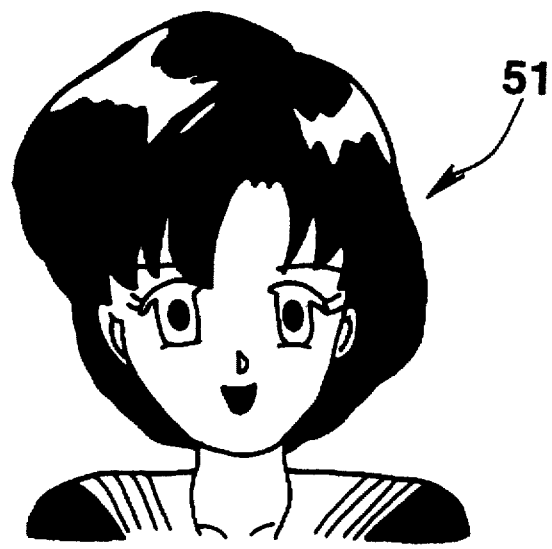
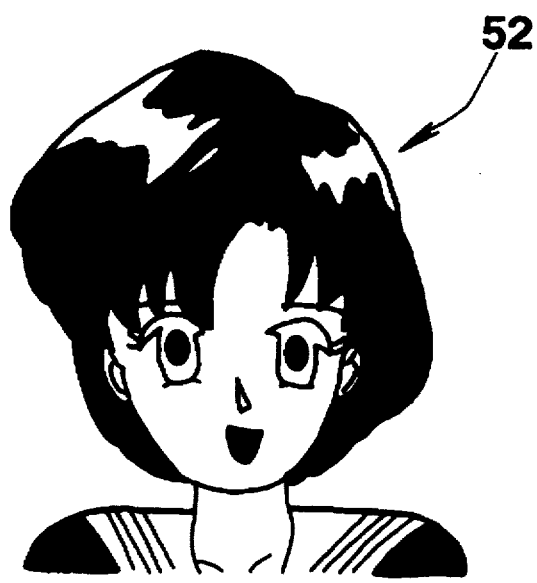

FIG.24
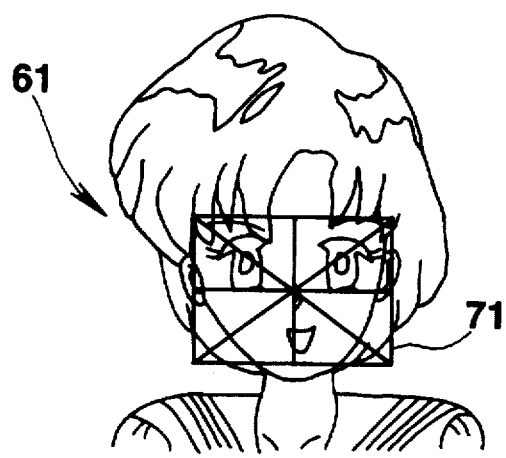
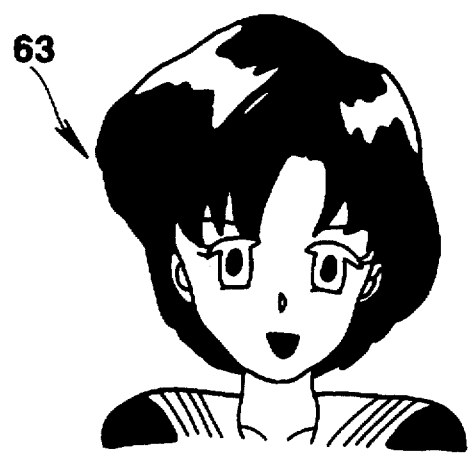

FIG.27

| | |
|---|---|
| CLOSED CURVED LINE A GEN DATA | |
| CLOSED CURVED LINE B GEN DATA | |
| CLOSED CURVED LINE C GEN DATA | |
| CLOSED CURVED LINE D GEN DATA | |
| CLOSED CURVED LINE E GEN DATA | |
| CLOSED CURVED LINE F GEN DATA | |
| CLOSED CURVED LINE A COLOR DATA | |
| CLOSED CURVED LINE B COLOR DATA | |
| CLOSED CURVED LINE C COLOR DATA | |
| CLOSED CURVED LINE D COLOR DATA | |
| CLOSED CURVED LINE E COLOR DATA | |
| CLOSED CURVED LINE F COLOR DATA | |
| COLOR CONDITION FLAG (A) | |
| COLOR CONDITION FLAG (B) | |
| COLOR CONDITION FLAG (C) | |
| COLOR CONDITION FLAG (D) | |
| COLOR CONDITION FLAG (E) | |
| COLOR CONDITION FLAG (F) | |
| BACKGROUND COLOR NO. | |

| |
|---|
| SEQUENCE NO. |
| TRANSFORMATION DATA (1) |
| TRANSFORMATION DATA (2) |
| TRANSFORMATION DATA (3) |
| ⋮ |
| TRANSFORMATION DATA (n) |

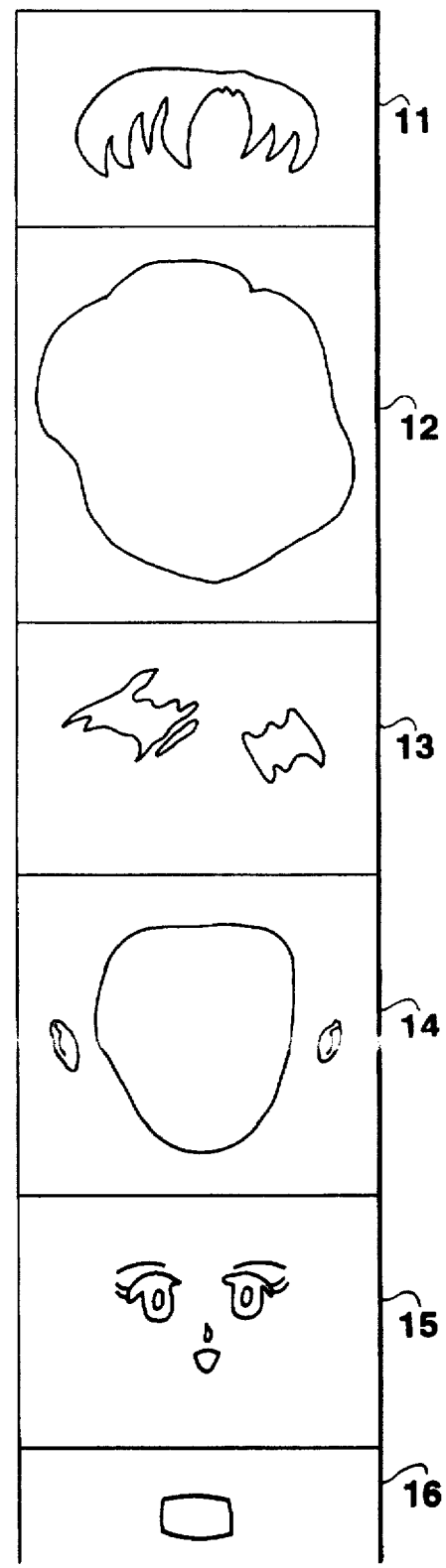

FIG.34

| CLOSED CURVED LINE A GEN DATA |
|---|
| CLOSED CURVED LINE B GEN DATA |
| CLOSED CURVED LINE C GEN DATA |
| CLOSED CURVED LINE D GEN DATA |
| CLOSED CURVED LINE E GEN DATA |
| CLOSED CURVED LINE F GEN DATA |
| CLOSED CURVED LINE A COLOR DATA |
| CLOSED CURVED LINE B COLOR DATA |
| CLOSED CURVED LINE C COLOR DATA |
| CLOSED CURVED LINE D COLOR DATA |
| CLOSED CURVED LINE E COLOR DATA |
| CLOSED CURVED LINE F COLOR DATA |

FIG.37

FIG.38

| SELECTED FACE IMAGE NO. |
| CLOSED CURVED LINE A GEN DATA |
| CLOSED CURVED LINE B GEN DATA |
| CLOSED CURVED LINE C GEN DATA |
| CLOSED CURVED LINE D GEN DATA |
| CLOSED CURVED LINE E GEN DATA |
| CLOSED CURVED LINE A COLOR DATA |
| CLOSED CURVED LINE B COLOR DATA |
| CLOSED CURVED LINE C COLOR DATA |
| CLOSED CURVED LINE D COLOR DATA |
| CLOSED CURVED LINE E COLOR DATA |
| COLOR CONDITION FLAG (A) |
| COLOR CONDITION FLAG (B) |
| COLOR CONDITION FLAG (C) |
| COLOR CONDITION FLAG (D) |
| COLOR CONDITION FLAG (E) |
| DOT DATA COLOR FLAG (−2) |
| BACKGROUND COLOR NO. |
| BIT MAP DATA F |

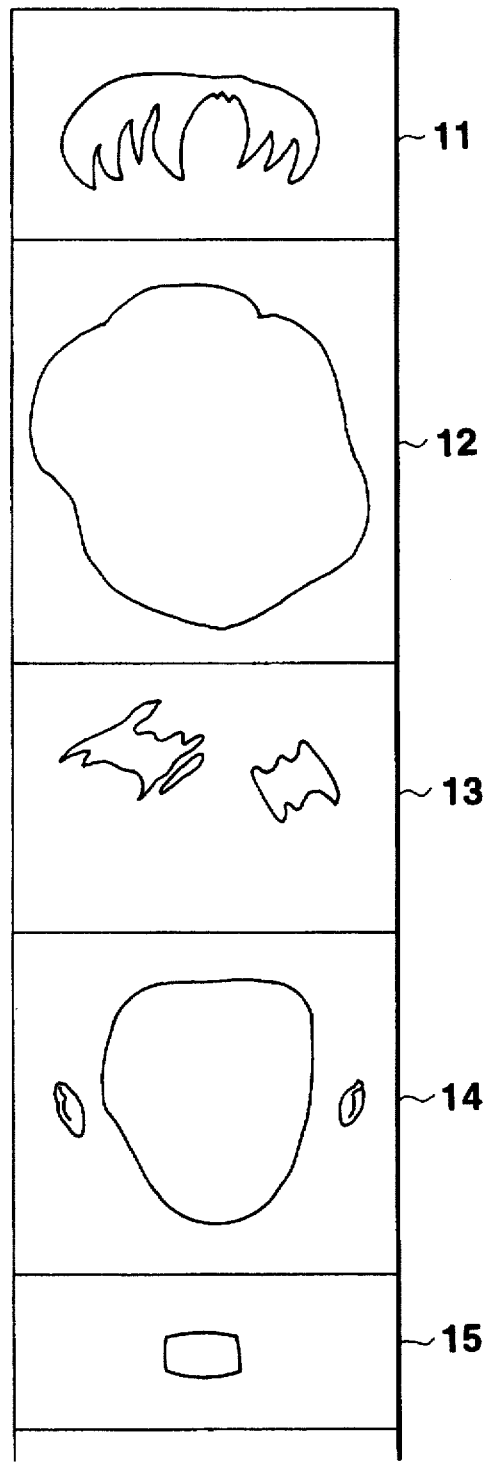

METHOD AND APPARATUS FOR GENERATING IMAGE

BACKGROUND OF THE INVENTION

1. Field

The present invention relate to a method and apparatus for generating an image. More particularly, the invention aims to provide a method and apparatus for generating an image which is capable of making an image (e.g., face image, animation) by drawing a plurality of closed curved lines and painting inside thereof.

2. Description of the Prior Art

The Prior art of animation, video game apparatus typically employs stored image data in a bit array form to display an image such as a face image of a character. The image data in the bit array form is constructed by dot or picture element (pixel) units in which each dot (pixel) is assigned color bits of a color or pallet number. Such stored pixel-by-pixel image data are all required to display a color image on a computer or television screen.

Therefore the prior art image generating method and apparatus necessarily require a massive amount of data to represent a color image on the screen.

In addition, the prior art requires a massive storage system to accommodate such massive image data, thus making the apparatus expensive.

In order to display changing or animation images by a series of image frames in which, for example, a character's face expression changes from one frame to another, the prior art requires pixel-by-pixel image data, amount of which increases in proportion to the number of changing expressions.

SUMMARY OF THE INVENTION

It is therefore an object of the invention to provide a method and apparatus for generating an image, which is less expensive and yet capable of making and displaying a color image from a reduced amount of data.

In accordance an aspect of the invention, there is provide a method for generating an image which comprises the steps of (A) storing a plurality of closed curved line data which define a plurality of closed curved lines on a predetermined plane; (B) storing a plurality of color data each corresponding to a different one of the plurality of closed curved lines; (C) computing coordinates of each closed curved line on the predetermined plane based on the stored closed curved line data to thereby draw the plurality of closed curved lines; (D) determining a color of coordinates of an area enclosed by the computed coordinates of a closed curved line according to the stored color data corresponding to the closed curved line, and determining a color of coordinates of an overlapped area in common with a plurality of areas enclosed by a plurality of closed curved lines, referred to as overlapping closed curved lines, by selecting the stored color data corresponding to one of the overlapping closed curved lines; and (E) painting the computed coordinates of closed curved line and the coordinates of the area enclosed by the computed coordinates of the closed curved line with the determined color, to thereby generate a colored image. Further, the invention provides an apparatus for generating an image which comprises storage means for storing a plurality of closed curved line data which define a plurality of closed curved lines on a predetermined plane and for storing a plurality of color data each corresponding to a different one of the plurality of closed curved lines; drawing means for computing coordinates of each closed curved line on the predetermined plane based on the closed curved line data stored in the storage means to thereby draw the plurality of closed curved lines; overlap determining means for determining whether an area enclosed by coordinates of a closed curved line computed by the drawing means is overlapped with an area enclosed by coordinates of a different closed curved line or lines; and painting means for painting coordinates of an area enclosed by coordinates of a closed curved line such that those coordinates of an area which is not found to be overlapped by the overlap determining means are painted with color data stored in the storage means and corresponding to the closed curved line whereas those coordinates of an area which is found to be overlapped by the overlap determining means are painted with color data stored in the storage means and corresponding to one of overlapping closed curved lines.

Unlike the prior art, this arrangement does not require color data assigned to pixel by pixel to display a color image. With this arrangement, a color image is made from a reduced amount of data i.e., closed curved line data functionally defining closed curved lines and color data corresponding to each closed curved line.

A further object of the invention is to provide a method and apparatus for generating an image, which is less expensive and yet capable of displaying changing images (e.g., these having different face expression) from a reduced amount of data.

In accordance with an aspect of the invention, there is provided a method for generating an image which comprises the steps of (A) storing a plurality of closed curved line data which define a plurality of closed curved lines on a predetermined plane; (B) storing a plurality of color data each corresponding to a different one of the plurality of closed curved lines (C) computing coordinates of each closed curved line on the predetermined plane based on the stored closed curved line data to thereby draw the plurality of closed curved lines; (D) designating an area on the predetermined plane including the computed coordinates, and transforming the computed coordinates included in the designated area based on transforming data; (E) determining a color of coordinates of an area enclosed by the coordinates of a closed curved line including the transformed coordinates according to the stored color data corresponding to the closed curved line, and determining a color of coordinates of an overlapped area in common with a plurality of areas enclosed by a plurality of overlapping curved lines, by selecting the stored color data corresponding to one of the overlapping closed curved lines; and (F) painting coordinates of a closed curved line including the transformed coordinates, and coordinates of an area enclosed by the coordinates of the closed curved line with the determined color.

The invention provides an apparatus for generating an image which comprises storage means for storing a plurality of closed curved line data which define a plurality of closed curved lines on a predetermined plane and for storing a plurality of color data each corresponding to a different one of the plurality of closed curved lines; transforming means for designating an area on the predetermined plane including the computed coordinates and for transforming the computed coordinates included in the designated area based on transforming data; overlap determining means for determining whether an area enclosed by coordinates of a closed curved line including the transformed coordinates is overlapped with an area enclosed by coordinates of a different closed curved line or lines; and painting means for painting coordinates of an area enclosed by coordinates of a closed curved line including the transformed coordinates such that those coordinates of an area which is not found to be overlapped by the overlap determining means are painted with color data stored in the storage means and corresponding to the closed curved line whereas those coordinates of an area which is found to be overlapped by the overlap determining means are painted with color data stored in the storage means and corresponding to one of overlapping closed curved lines.

Unlike the prior art, this arrangement does not require massive stored image data which increases in proportion to a number of image frames when it is desired to display a first image and then display a second image changed from the first image. With this arrangement, the first image is made from closed curved line data and color data representing a color of each closed curved line while the second or changed image is made by transforming the first image with transformation data.

A further object of the invention is to provide a method and apparatus for generating an image which is less expensive and yet capable of displaying animation (moving picture) images from a reduced amount of stored data.

The invention provides a method for generating an image which comprises the steps of (A) storing a plurality of closed curved line data which define a plurality of closed curved lines on a predetermined plane; (B) storing a plurality of color data each corresponding to a different one of the plurality of closed curved lines; (C) computing coordinates of each closed curved line on the predetermined plane based on the stored closed curved line data to thereby draw the plurality of closed curved lines; (D) successively providing a plurality of transformation data; (E) transforming the computed coordinates of a closed curved line included in an area on the predetermined plane based on the successively provided transformation data; (F) determining a color of coordinates of an area enclosed by the coordinates of a closed curved line including the transformed coordinates according to the stored color data corresponding to the closed curved line, and determining a color of coordinates of an overlapped area in common with a plurality of areas enclosed by a plurality of overlapping closed curved lines by selecting the stored color data corresponding to one of the overlapping closed curved lines, and (G) painting coordinates of a closed curved line including the transformed coordinates, and coordinates of an area enclosed by the coordinates of the closed curved line with the determined color.

The invention also provides an apparatus for generating an image which comprises storage means for storing a plurality of closed curved line data which define a plurality of closed curved lines on a predetermined plane and for storing a plurality of color data each corresponding to a different one of the plurality of curved lines; drawing means for computing coordinates of each closed curved line on the predetermined plane based on the closed curved line data stored in the storage means to thereby draw the plurality of closed curved lines; transformation data providing means for successively providing a plurality of transformation data; transforming means for transforming the computed coordinates of a closed line included in an area on the predetermined plane based on the successively provided transformation data; overlap determining means for determining whether an area enclosed by coordinates of a closed curved line including the transformed coordinates is overlapped with an area enclosed by coordinates of a different closed curved line or lines; and painting means for painting coordinates of an area enclosed by coordinates of a closed curved line including the transformed coordinates such that those coordinates of an area which is not found to be overlapped by the overlap determining means are painted with color data stored in the storage means and corresponding to the closed curved line whereas those coordinates of an area which is found to be overlapped by the overlap determining means are painted with color data stored in the storage means and corresponding to one of overlapping closed curved lines.

This arrangement makes animation images from a highly reduced amount of data unlike the prior art which requires massive pixel-by-pixel image data for each image frame in the animation. With the arrangement, the first image in the animation is made from closed curved line data and color data thereof whereas the following images in the animation are made by successively transforming the first image by sequence data having a sequence of transforming data.

A further object of the invention is to provide a method and apparatus for generating an image, which is less expensive and yet capable of displaying an image having fine image parts with a reduced amount of data.

The invention provides a method for generating an image which comprises the steps of (A) storing a plurality of closed curved line data which define a plurality of closed curved lines on a predetermined plane; (B) storing a plurality of color data each corresponding to a different one of the plurality of closed curved lines; (C) storing all coordinates of an image object on the predetermined plane, the coordinates referred to as dot coordinates, and storing color data each assigned to a different one of the dot coordinates; (D) computing coordinates of each closed curved line on the predetermined plane based on the stored closed curved line data to thereby draw the plurality of closed curved lines; (E) determining color of each coordinate on the predetermined plane such that (a) if the coordinate is included in an area enclosed by one of the drawn closed curved lines and locates outside of an area enclosed by any other of the drawn closed curved lines and outside of the image object, color thereof is determined by stored color data corresponding to the one of the drawn closed curved lines, (b) if the coordinate is one of the dot coordinates and locates outside of an area enclosed by any of the drawn closed curved lines, color thereof is determined by stored color data assigned to the one of the dot coordinates, (c) if the coordinate is included in an overlapped area in common with a plurality of the drawn closed curved lines, referred to as overlapping closed curved lines, and locates outside of the image object, color thereof is determined by stored color data corresponding to a selected one of the overlapping closed curved lines, and (d) if the coordinate is one of the dot coordinates and is included in an area enclosed by at least one of the drawn closed curved line, referred to as overlapping closed curved line(s), color thereof is determined by a one selected from among stored color data assigned to the one of the dot coordinates and stored color data corresponding to the overlapping closed curved line(s); and (F) painting each coordinate on the predetermined plane with the determined color.

The invention further provides an apparatus for generating an image which comprises first storage means for storing a plurality of closed curved line data which define a plurality of closed curved lines on a predetermined plane and for storing a plurality of color data each corresponding to a different one of the plurality of closed curved lines; second storage means for storing all coordinates of an image object on the predetermined plane, the coordinates referred to as dot coordinates and for storing color data each assigned to a different one of the dot coordinates; drawing means for computing coordinates of each closed curved line on the predetermined plane based on the stored closed curved line data to thereby draw the plurality of closed curved lines; color determining means for determining color of each coordinate on the predetermined plane such that (a) if the coordinate is included in an area enclosed by one of the drawn closed curved lines and locates outside of an area enclosed by any other of the drawn closed curved lines and outside of the image object, color thereof is determined by stored color data corresponding to the one of the drawn closed curved lines, (b) if the coordinate is one of the dot coordinates and locates outside of an area enclosed by any of the drawn closed curved lines, color thereof is determined by stored color data assigned to the one of the dot coordinates, (c) if the coordinate is included in an overlapped area in common with a plurality of the drawn closed curved lines, referred to as overlapping closed curved lines, and locates outside of the image object, color thereof is determined by stored color data corresponding to a selected one of the overlapping closed curved lines, and (d) if the coordinate is one of the dot coordinates and is included in an area enclosed by at least one of the drawn closed curved line, referred to as overlapping closed curved line(s), color thereof is determined by a one selected from among stored color data assigned to the one of the dot coordinates and stored color data corresponding to the overlapping closed curved line(s); and painting means for painting each coordinate on the predetermined plane with the determined color.

With this arrangement, the desired part of an image is formed in fine and high quality. To represent the remaining part of the image, only closed curved line data and color data thereof are required. This arrangement represents a desired image in desired quality with a reduced amount of data in contrast to the prior art which requires massive pixel-by-pixel image data.

BRIEF DESCRIPTION OF THE DRAWINGS

The above and other objects and features of the invention will be better understood from the following description taken in conjunction with the drawings in which:

FIG. 3 represents data stored in ROM in accordance with the embodiment;

FIG. 4 represents data stored in RAM in accordance with embodiment;

FIG. 15 represents data stored in ROM in accordance with the embodiment;

FIG. 16 represents data stored in RAM in accordance with the embodiment;

FIG. 20 represents face images made by the embodiment;

FIG. 24 represents face expression changing images in accordance with the embodiment.

FIG. 27 represents data stored in RAM in accordance with the embodiment.

FIG. 34 represents data stored in ROM in accordance with the embodiment.

FIG. 37 represents data stored in ROM in accordance with the embodiment.

FIG. 38 represents data stored in RAM in accordance with the embodiment and

DETAILED DESCRIPTION OF THE PREFERRED EMBODIMENT

Now, embodiments of the invention will be described with reference to the drawings.

Figure 1:
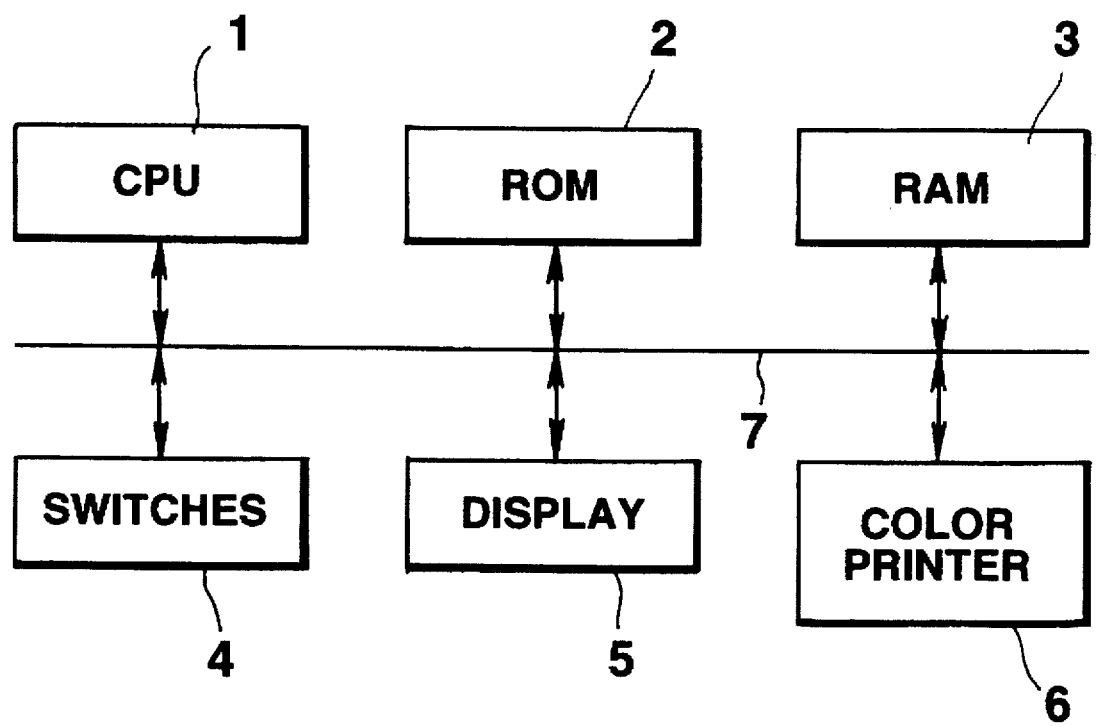
FIG. 1 is a block diagram of a hardware arrangement of an image generator incorporating the features of the invention.

FIG. 1 is a block diagram showing a first embodiment of the face image generator (corresponding to an image processor) for realizing the method of image processing according to the invention. Referring to FIG. 1, the face image generator largely comprises a CPU 1, a ROM 2, a RAM 3, switches 4, a display 5 and a color printer, these individual components being interconnected by a bus 7.

The CPU 1 controls the entire face image generator. When a command for image generation is input from the switches 4, the CPU 1 executes processes necessary for face image generation, such as processes of data calculation and painting of straight lines and Bezier curves necessary for making the outline and various parts of a face, on the basis of control programs stored in the ROM 2 so as to correspond to command information. The CPU 1 has internal resisters for storing values of flags and pointers.

In the ROM 2 are stored control programs to be executed by the CPU 1 and further such parameters as closed curved line generating data representing the outline and various parts of the face and closed curved line color data. The RAM 3 is used as a work area for calculation processes executed by the CPU 1, and temporarily stores data.

The switches 4 are operated by the operator. Among these switches are face image selecting switches, which are operated for face image selection, and a start switch operated when starting the process of image generation. The operation switches may be independently operable push switches, or they may be constituted by a switch or key board having a plurality of switches or keys. Further, it is possible to use a mouth, a track ball, etc. as well as the switch or key board as the switches 4.

The display 5 is for displaying face image that is generated in processes in the CPU 1 for each process, and it includes a video display processor (hereinafter referred to as VDP), a VRAM, and a TV or LCD display capable of displaying a color image.

The color printer 6 serves to print image on predetermined paper and, for instance, can print color face image corresponding to the one displayed on the display 5.

The functions of the face image generator of the first embodiment will now be described.

Main Program

Figure 2:
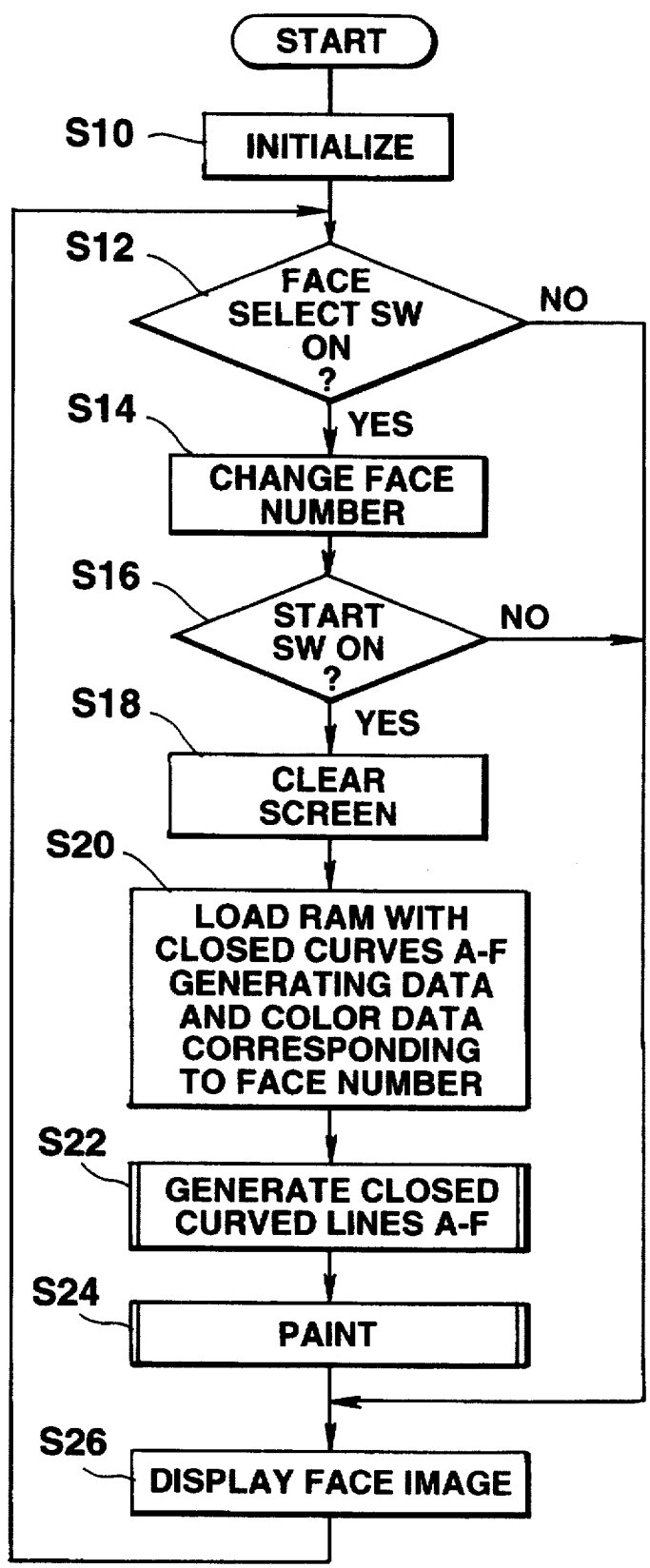
FIG. 2 is a flow chart of a main program for generating a face image in accordance with a first embodiment of the invention.

FIG. 2 is a flow chart of a main program for generating a face image. When the program is started, a step S10 of initialization is first executed to initialize various registers in the CPU 1, clear work area in the RAM 3, initialize sub-routines reset flags etc.

In a subsequent step S12, a check is made as to whether a face image selecting switch is "on". If there is no "on" face image selecting switch, the process jumps to a step S26 of a display process. As a result, an initial image is displayed on the display 5 in the first pass. If a face image has been displayed, it is continually displayed without change.

If a face image selecting switch is "on", the process goes to a step S14 of changing face number. In the ROM 2, different kinds of face image data (1) to (n) are stored as shown in FIG. 3. These face image data are stored as closed curved lines A to F generating data representing the outline and various parts of the face image and closed curved lines A to F color data designating colors of the closed curved lines, and they are stored in predetermined areas. The closed curved lines A to F color data designate colors of the closed curved lines A to F generating data (i.e., colors in which to paint the boundaries and inside of the closed curved lines). Thus, it is possible to freely set, for instance, the face image data (1) to (n) in correspondence to the face of a man or a woman.

If face image number "2", for instance, is selected in the step S14, face image data, i.e., closed curved line generation data and closed curved line color data, corresponding to the face image number "2" stored in the ROM 2 are read out. Then, in a step S18 a check is made as to whether the start switch among the switches 4 has been turned on. If the start switch is "off", the process jumps to the step S26 of the display process. As a result, in the first pass the initial image is held displayed on the display 5. If a face image has been displayed, it is continually displayed without change.

If the start switch is "on", the process goes to a step S18 to clear the image on the display 5. Thus, in the first routine the initial image is cleared. If a face image has been displayed, it is cleared.

Then, in a step S20 the closed curved lines A to F generating data and color data corresponding to the selected face number are read out from the ROM2 and loaded into the RAM 3.

The RAM 3 has various work areas as shown in FIG. 4, and the data read out from the ROM 2 are loaded in corresponding areas.

The work areas in the RAM 3 are as follows.

Selected face image No; area for storing face image No. selected by the face image selecting switch Closed curved line A generating data; area for storing data for generating closed curved line A Closed curved line B generating data; area for storing data for generating closed curved line B Closed curved line C generating data; area for storing data for generating closed curved line C Closed curved line D generating data; area for storing data for generating closed curved line D Closed curved line E generating data; area for storing data for generating closed curved line E Closed curved line F generating data; area for storing data for generating closed curved line F Closed curved line A color data; area for storing data designating color of closed curved line A Closed curved line B color data; area for storing data designating color of closed curved line B Closed curved line C color data; area for storing data designating color of closed curved line C Closed curved line D color data; area for storing data designating color of closed curved line D Closed curved line E color data; area for storing data designating color of closed curved line E Closed curved line F color data; area for storing data designating color of closed curved line F Color condition flag (A); area for storing flag of determining whether closed curved line A is to be designated for color setting area (i.e., be painted in color)

Color condition flag (B); area for storing flag of determining whether closed curved line B is to be designated for color setting area (i.e., be painted in color)

Color condition flag (C); area for storing flag of determining whether closed curved line C is to be designated for color setting area (i.e., be painted in color)

Color condition flag (D); area for storing flag of determining whether closed curved line D is to be designated for color setting area (i.e., be painted in color)

Color condition flag (E); area for storing flag of determining whether closed curved line E is to be designated for color setting area (i.e., be painted in color)

Color condition flag (F); area for storing flag of determining whether closed curved line F is to be designated for color setting area (i.e., be painted in color)

Background color number; area for storing data designating background color

Further, areas 11 to 16 are provided for storing generated closed curved lines corresponding to various parts of face. For example, in the area 11 is stored hair, in the area 12 is stored hair style, in the area 13 is stored shine of hair, in the area 14 is stored outline of face, in the area 15 is stored parts of face, and in the area 16 is stored neck.

In a subsequent step S22, closed curved lines A to F are generated according to the loaded closed curved line generating data A to F (as will be described later in detail in connection with a subroutine), and in a step S24 the generated closed curved lines A to F are painted (as will be described later in detail in connection with a subroutine). Thus, the closed curved lines A to F corresponding to the selected face image No. are generated and then painted in predetermined colors, whereby face image is generated. Subsequently, a step S26 of displaying face image is executed. In this step, the generated face image is displayed on the display 5. After the step S26, the program goes back to the step S12 to repeat the same loop. In the above way, face image which corresponds to the face image No. selected by the image selecting switch is generated and displayed.

Subroutine of Generating Closed Curved Lines A to F

Figure 5:
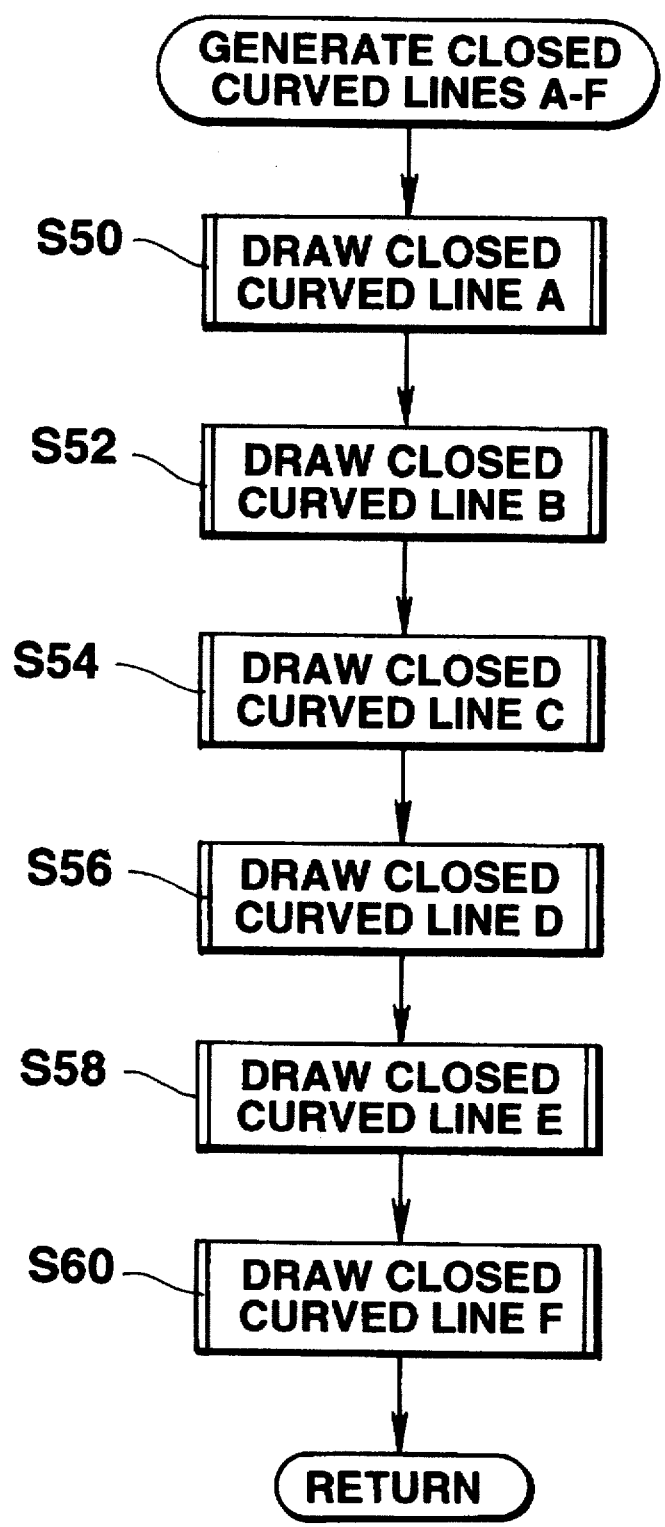
FIG. 5 is a flow chart of a routine for generating closed curved lines in accordance with the embodiment.

FIG. 5 is a flow chart showing the subroutine of the process (step S22) of generating the closed curved lines A to F in the main program. When this subroutine is brought about, a step S50 is executed to generate the closed curved line A. When the closed curved line A corresponds to hair, for instance, closed curved line of hair (i.e., image stored in the area 11 in FIG. 4) is generated.

Then, a step S54 is executed to generate the closed curved line C. When the closed curved line C corresponds to shine of hair, for instance, closed curved line of shine (i.e., image stored in the area 18 in FIG. 4) is generated.

Then, a step S56 is executed to generate the closed curved line D. When the closed curved line D corresponds to outline of face, for instance, closed curved line of outline (i.e., image stored in the area 14 in FIG. 4) is stored.

Then, a step S58 is executed to generate the closed curved line E. When the closed curved line E corresponds to parts of face, for instance, closed curved line of parts of face (i.e., image stored in the area 15 in FIG. 4) is generated. The parts of face include the eyebrow, the eye, the nose and the mouth.

Then, in a step S60 is executed to generate the closed curved line F. When the closed curved line F corresponds to neck, for instance, closed curved line of neck (i.e., image stored in the area 16 in FIG. 4) is generated. After the step S60, the subroutine returns to the main program.

In the above way, the closed curved lines A to F are generated.

Dot Calculation Subroutine

Figure 6:
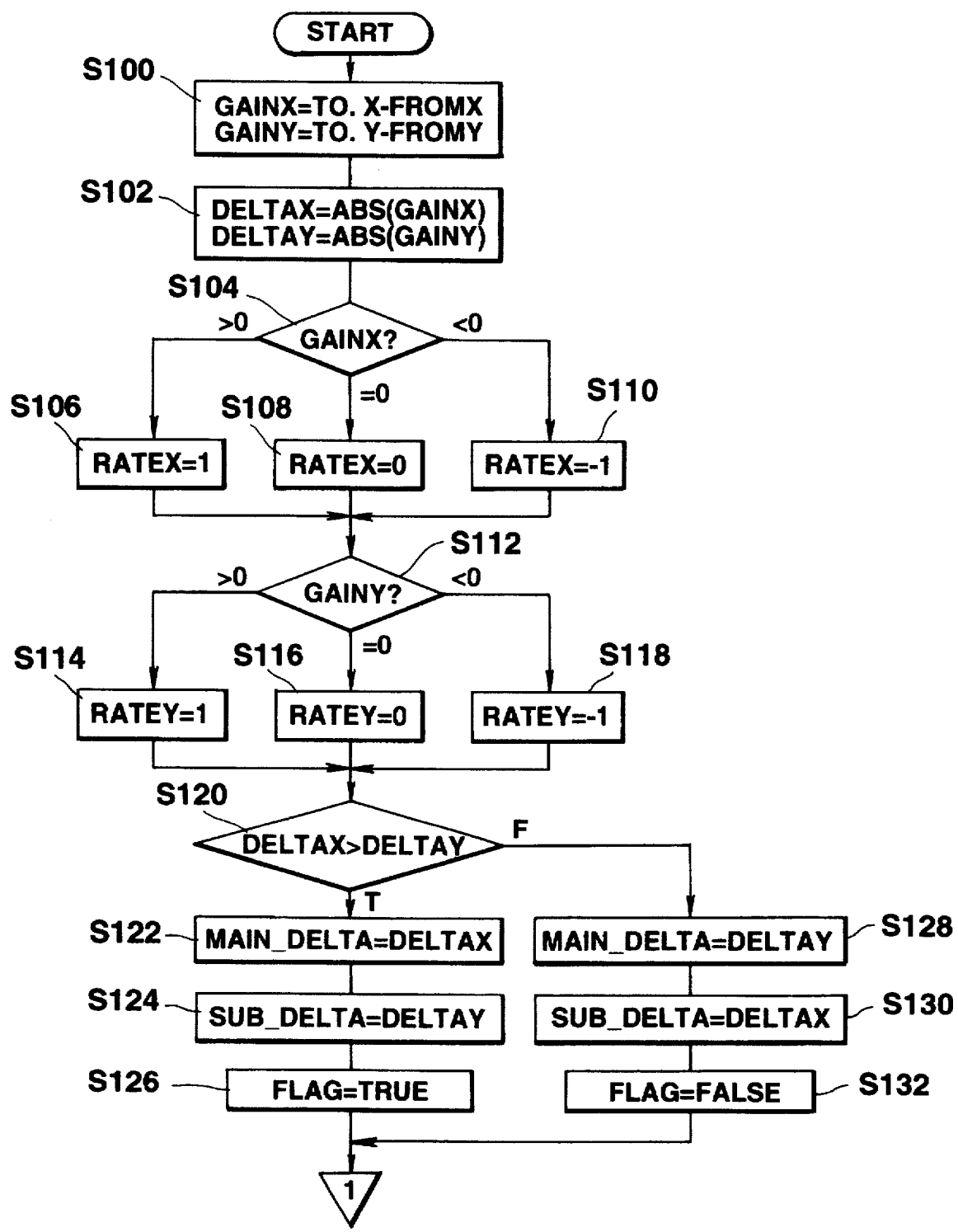
FIGS. 6 and 7 are flow charts of a routine for computing dots in accordance with the embodiment.
Figure 7:
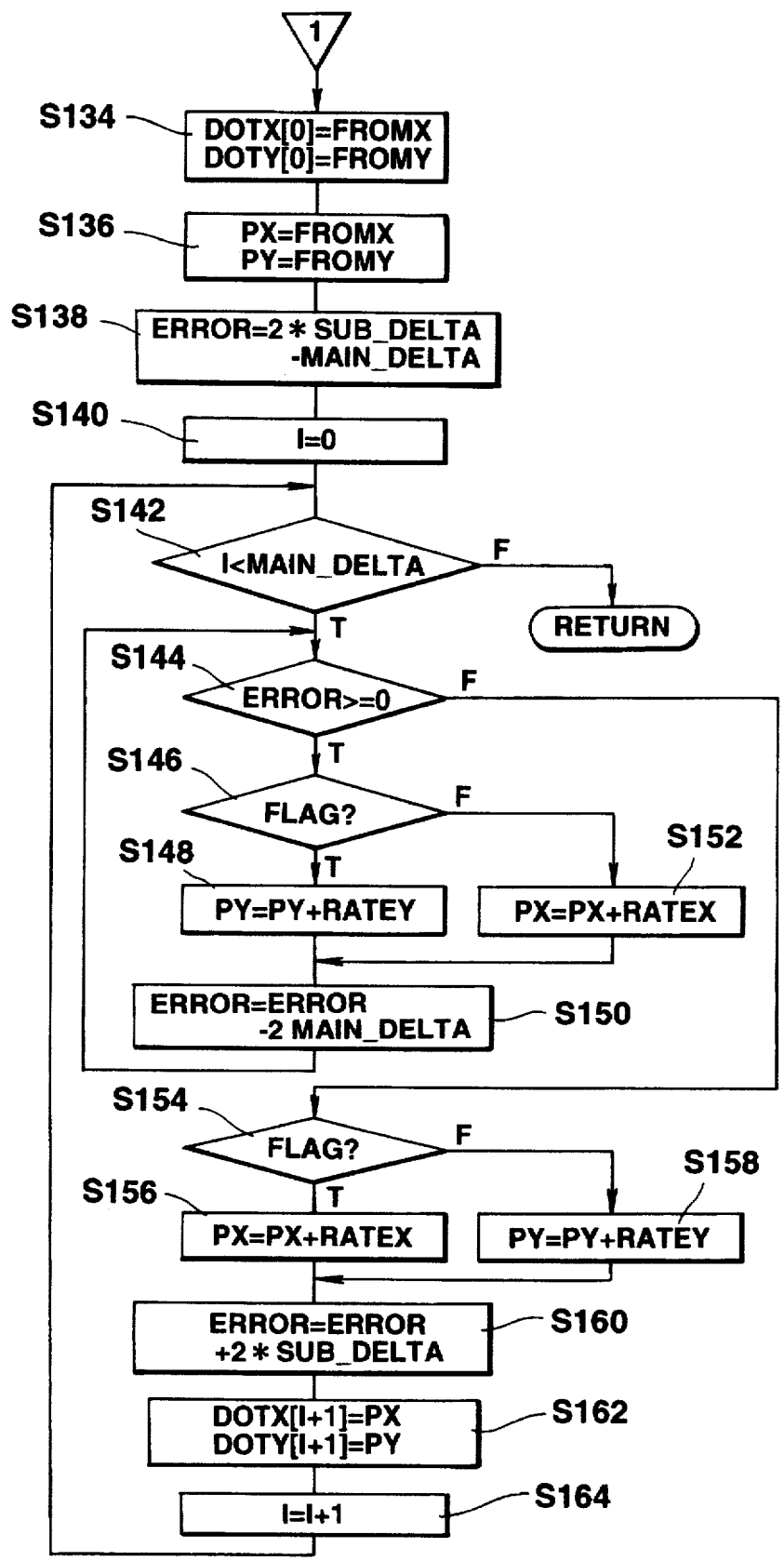

FIGS. 6 and 7 together form a flow chart showing a dot calculation processes subroutine called when generating the closed curved lines A to F. This process is for plotting a straight line connecting two points to be displayed on a TV display, which is the display 5, for instance a computer display screen or a television display screen. The straight line connecting two points is plotted by calculating all dots between them. This technique is an application of the algorithm of the commonly called "integer type Bresenham" which is used for computer straight line drawing. The usual "Bresenham" algorithm requires floating point addition, subtraction and division for determining the slope or error of line. In the "integer type Bresenham" algorithm processing speed is increased by using integer calculations and also eliminating the division. The following description of the flow chart uses a "C language" for computers. The content of each step is expressed, if necessary, by "C language". This also applies to the individual flow charts to be described hereinunder.

In the step S100, as the difference between the start and end point coordinates of a straight line (i.e., slope of the line), gains x and y are calculated for the x and y coordinates, respectively. In FIG. 6, the x and y coordinates of the start point are expressed as fromx and fromy, respectively, and the x and y coordinates of the end point are expressed as to x and to y, respectively. The formula of calculating the x coordinate difference is the subtraction of the start point x coordinate fromx from the end point x coordinate to x, that is, to x−fromx.

Likewise, the formula of calculating the y coordinate difference is the subtraction of the start point y coordinate from y from the end point y coordinate to y, that is, to y−fromy.

In a subsequent step S102, the absolute value (delta) of the difference between the coordinates of the start and end points (i.e., slope) of the line is computed with respect to the x and y coordinates by delta x=abs (gain y), and delta y=abs (gain y).

In a subsequent step S104, the sign of the difference gain x between the x coordinates of the start and end points of the straight line is checked. If the gain x is positive, rate x=1 is set in a step S106. If the gain x is "0", rate x=0 is set in a step S108. If the gain x is negative, rate x=−1 is set in a step S110.

After either of the steps S106 to S110, a step S112 is executed, in which the sign of the difference between the y coordinates of the start and end points of the straight line is checked likewise. If the gain y is positive, rate y=1 is set in a step S114. If the gain y is "0", rate y=0 is set in a step S116. If the gain y is negative, rate y=−1 is set in a step S118. After either of the steps S114 to S118, a step S120 is executed.

In the step S120, the absolute values delta x and delta y of the x and y coordinate direction slopes are compared to see whether delta x is greater than delta y. This is done for determining which of the x and y coordinate directions is the main delta term. If delta x>delta y, a step S122 is executed to set the main delta term (main delta) to delta x.

In a subsequent step S126, a main determining flag (flag) is set to true, and then a step S184 in FIG. 7 is executed. The main determining flag (flag) is indicative of whether the main delta term (main delta) is set to delta x or delta y.

If delta x>delta y, a step S128 is executed to set the main delta term (main delta) to delta y. In a subsequent step S132, the main determining flag (flag) is set to false, and then a step S134 in FIG. 7 is executed.

In the step S134, shown in FIG. 7, dotx (0) corresponding to the start point x coordinate of the line is set to start point x coordinate fromx, and doty (0) corresponding to the start point y coordinate of the line is set to the start point y coordinate fromy. Thus, the start point dot coordinates are determined. Likewise, in a step S130 x and y coordinate direction parameters px and py are set to start point x and y coordinate fromx and fromy. Then, in a step S138 error is initialized to;

$$error=2(sub\ delta)-(main\ delta).$$

In a subsequent step S140, pointer i is initialized to "0". The pointer i successively designates a number of the dots forming the straight line, and it is successively incremented by one. In a subsequent step S142, a check is made as to whether the pointer i is smaller than the main delta term (main delta). If true, a step S144 is executed to check whether error≧0. If error≧0, a step S146 tests the main determining flag (flag). If the main determining flag (flag) is true, a step S148 is executed, in which the y coordinate direction parameter py pass is computed as $$py=py+ratey.$$

Subsequently, in a step S150 the error is computed as $$error=error-2(main\ delta).$$

The error is thus changed with the main error. Then, the subroutine goes back to the step S144 to repeat the same loop.

If it is found in the step S146 that the main determining flag (flag) is false, a step S152 computes the x coordinate directing parameter px by $$px=px+rate\ x.$$

Subsequently, a step S150 is executed to compute the error. The subroutine then goes back to the step S144. If it is found in the step S144 that the error term is error<0, a step S154 executed. The process with respect to the main error term (main delta) is executed in the above steps S144 to S152.

Now, a process is executed with respect to the sub delta term (sub delta). First, in the step S154 the main determining flag (flag) is tested. If flag is true, a step s156 is executed to compute the x coordinate direction parameter px as $$px=px+rate\ x.$$

Then, in a step S160 the error term e is computed as $$error=error+2(sub\ delta).$$

Thus, the error term is changed with the sub delta term (sub delta). In a subsequent step S162, dotx(i+1) is set to px, and doty (i+1) is set to py, thus plotting a new dot of the straight line.

In a subsequent step S164, the pointer i is incremented by one, and then the subroutine goes back to the step S142 to repeat the loop.

If it is found in the step S154 that the main determining flag (flag) is false, the step S158 computes the y coordinate direction parameter py by $$py=py+rate\ y.$$

Subsequently, in the step S160 the error term is computed after the above formula. Then, the subroutine goes back through the steps S162 and S164 to the step S142 to repeat the loop.

The above loop is repeated by successively incrementing the pointer i. If it is found in the step S142 that the pointer i has reached the main delta term (main delta), the subroutine is ended.

In the above way, dots of the straight line connecting the two points are calculated, and the line connecting the two points is displayed by these dots. In this embodiment, the "integer type Bresenham" algorithm is used, and integer calculations are performed. Thus, the processing speed of the algorithm is high.

Subroutine of Bezier Curved Line Data Calculation Process

Figure 8:
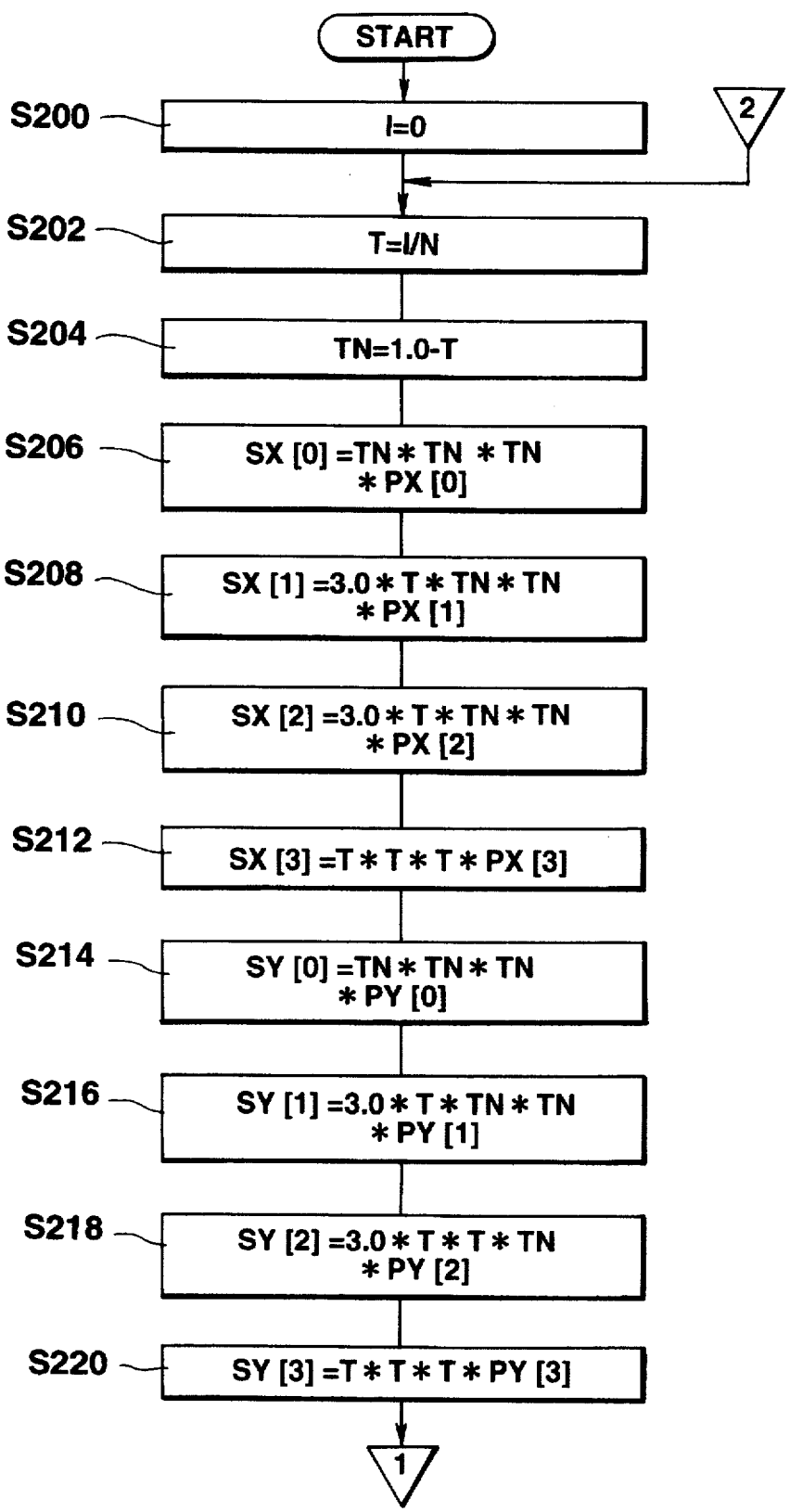
FIGS. 8 and 9 are flow charts of a routine for generating a Bezier curved line in accordance with the embodiment.
Figure 9:
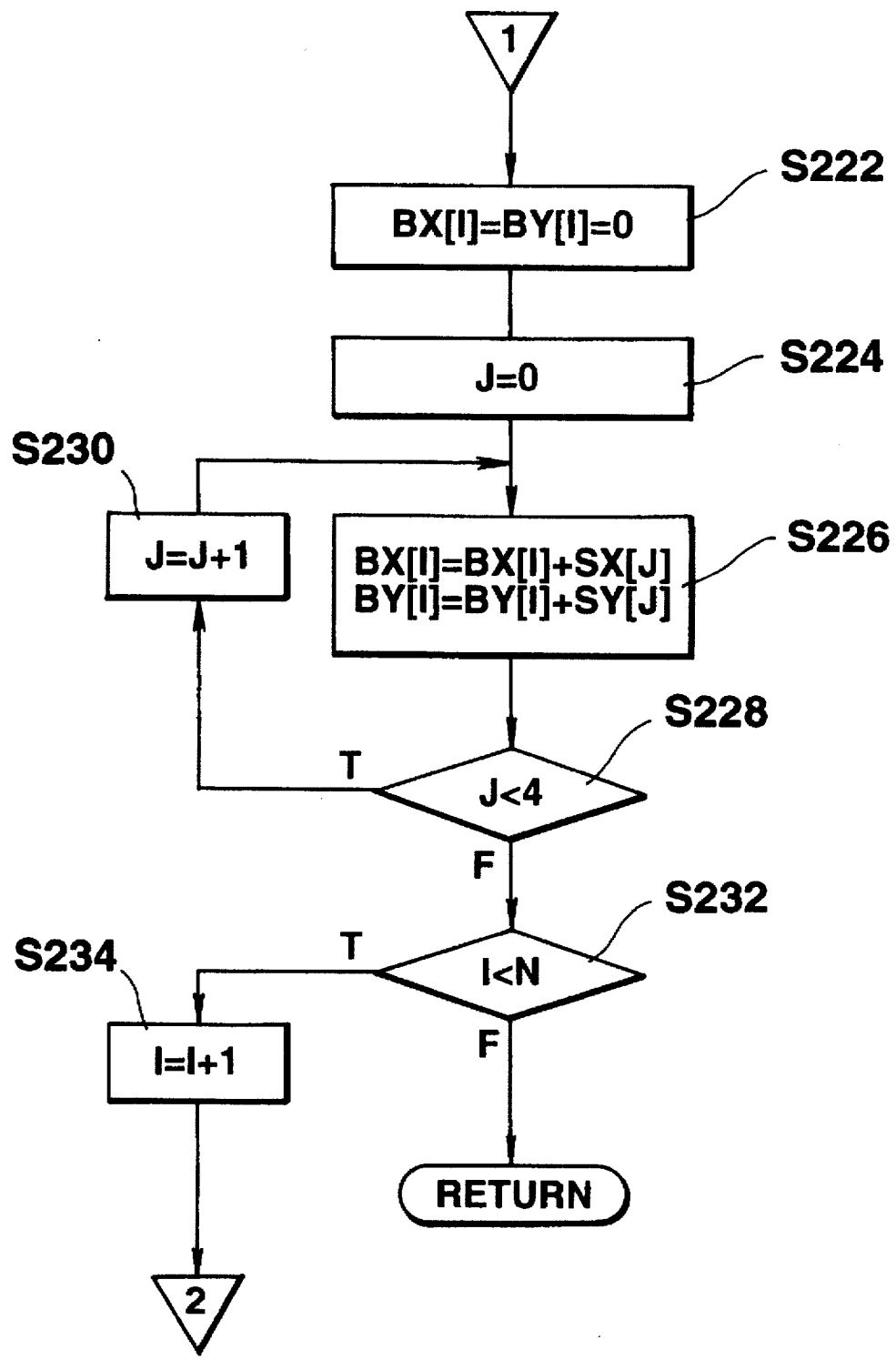

FIGS. 8 and 9 together form a flow chart showing the subroutine of a data calculation process for generating Bezeir curved line. Bezeir curved line B(t) is defined by two control points $P_2$ and $P_3$ and two anchor points $P_1$ and $P_4$, and it is expressed by a formula given below.

The anchor points $P_1$ and $P_4$ are two points at the ends of the curved line, and their coordinates are represented by, for instance, $P_1(x_1, y_1)$ and $P_4(x_4, y_4)$, respectively. The control points $P_2$ and $P_3$ are two points for controlling the shape of the curved line, and their coordinates are given by, $P_2(x_2, y_2)$ and $P_3(x_3, y_3)$.

$$B(t)=(1-t)^3P_1+3t(1-t)^2P_2+3t^2(1-t)P_3+t^3P_4$$

where $0 \leq t \leq 1$.

A parameter t varies between "0" and "1", and thus accurate calculation of points on the Bezeir curved line can be obtained by finely dividing the interval between "0" and "1." To reduce the number of calculations, after calculating an appropriate number of points on the curved line, these points are interpolated by straight line segments according to the straight line plotting process of FIGS. 6 and 7.

As an example, by substituting t=0 into the above formula, we have $P_1(x_1, y_1)$. This represents one of the end points. By substituting t=1, we obtain $P_4(x_4, y_4)$, representing the other end point.

It is possible to represent a straight line as a straight Bezeir curved line without width.

First, in a step S200 the pointer i is set to "0", and then in a step S202 the variable t is calculated as t=i/n. Since the pointer i is incremented by one by one, the variable is finely divided between "0" and "1" by dividing i by n.

In a subsequent step S204, deviation tn is computed as $$tn=1.0-t.$$

Then, in a step S206 the x coordinate of the zero power term of the variable t of the Bezeir curved line B(t) is computed as $$sx(0) = tn * tn * tn * Px(0)$$
$$= (1-t)^3 Px(0)$$
$$= (1-t)^3 P_1(x),$$

in which Px(0) is the x coordinate of the anchor point $P_1$. In a subsequent step S208, the x coordinate of the first power term of the variable t (i.e., t term) of the Bezeir curved line B(t) is computed as $$sx(1) = 0 * t * tn * Px(1)$$
$$= 3t (1-t)^2 Px(1)$$
$$= 3t (1-t)^2 P_2(x),$$

in which Px(1) is the x coordinate of the control point P2. In a subsequent step S210, the x coordinate of the second power term of the variable t (i.e., $t^2$ term) of the Bezeir curved line B(t) is computed as $$sx(2) = 3.0 * t * t * tn * Px(2)$$
$$= 3t^2 (1-t) Px(2)$$
$$= 3t^2 (1-t) P_3(x),$$

in which Px(2) is the x coordinate of the control point $P_3$. In a subsequent step S212 the x coordinate of the third power term of the variable t (i.e., $t^3$ term) of the Bezeir curved line B(t) is computed as $$sx(3) = t * t * t * Px(3)$$
$$= t^3 Px(3)$$
$$= t^3 P_4(x),$$

in which Px(3) is the x coordinate of the anchor point $P_4$.

Subsequently, in steps S214 to S220 similar computation is made with respect to the y coordinate of the variable t of the Bezeir curved line B(t). More specifically, in the step S214 the y coordinate of the zero power term of the variable (i.e., $t^0$ term) of the Bezeir curved line is computed as $$sy(0) = tn * tn * tn * py(0)$$
$$= (1-t)^3 Py(0)$$
$$= (1-t)^3 P_1(y),$$

in which Py(0) is the y coordinate of the anchor point $P_1$. Then, in the step S216 the y coordinate of the first power term of the variable t (i.e., t term) of the Bezeir curved line B(t) is computed as $$sy(1) = 3.0 * t * tn * tn * Py(1)$$
$$= 3t (1-t)^2 Py(1)$$
$$= 3t (1-t)^2 P_2(y),$$

in which Py(1) is the y coordinate of the control point $P_2$. In the subsequent step S218, the y coordinate of the second power term of the variable t (i.e., $t^2$ term) of the Bezeir curved line B(t) is computed as $$sy(2) = 3.0 * t * t * tn * Py(2)$$
$$= 3t^2 (1-t) Py(2)$$
$$= 3t^2 (1-t) P_3(y),$$

in which Py(2) is the y coordinate of the control point $P_3$. In the subsequent step S220, the y coordinate of the third power term of the variable t of the Bezeir curved line B(t) is computed as $$sy(3) = t * t * t * Py(3)$$
$$= t^3 Py(3)$$
$$= t^3 P_4(y),$$

in which Py(3) is the y coordinate of the anchor point $P_4$.

In a subsequent step S222 in FIG. 9, bx(i) and by(i) are initialized to "0." Then, in a step S224 pointer j is initialized to "0", and in a subsequent step S226 the x and y coordinates bx(i) and by(i) are computed as $$bx(i)=bx(i)+sx(j), \text{ and}$$

$$by(i)=by(i)+sy(j).$$

Subsequently, in a step S228 a check is made as to whether the pointer j has become "3." If the pointer j is less than "3", a step S230 is executed to increment the pointer j by one. The subroutine then returns to the step S226 to repeat the loop, if it is found in the step S228 that the pointer j has become "3", a step S232 is executed.

In the step S232, a check is made as to whether the pointer i has become n. If the pointer i is less than n, a step S234 is executed to increment the pointer i by one. Then, the subroutine goes back to the step S202 in FIG. 8 to repeat the same loop. If it is found in the step S232 that the pointer i has become n, the subroutine is ended.

As shown, by calculating points on the Bezeir curved line B(t), which is defined by the two control points $P_2$ and $P_3$ and two anchor points $P_1$ and $P_4$, by incrementing the pointer i from "0" to n and finely varying t between "0" and "1", it is possible to obtain accurate calculation of the coordinates on the Bezeir curved line.

Subroutine of Color Determining Process

Figure 10:
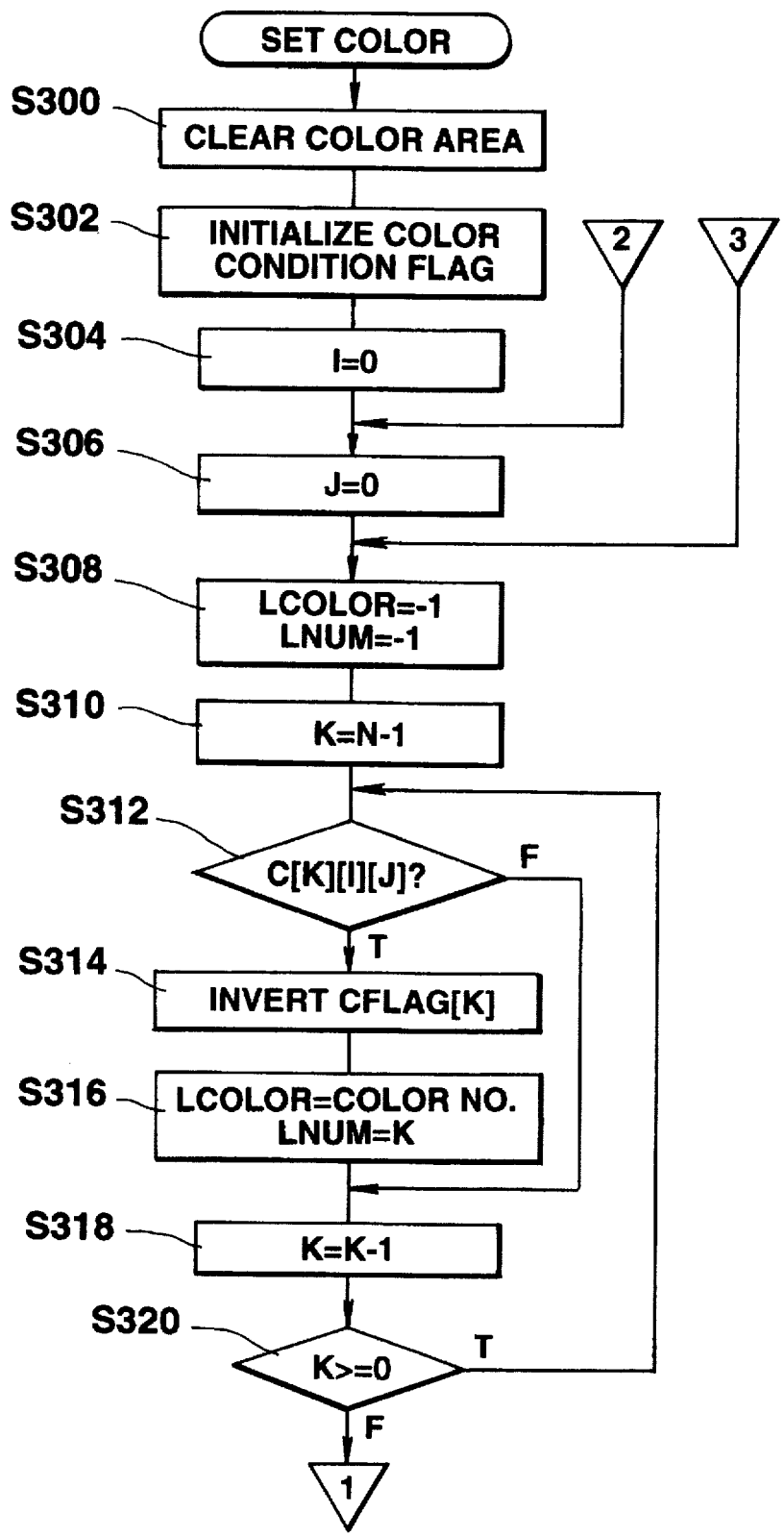
FIGS. 10 and 11 are flow charts of a routine for determining a color of coordinates in accordance with the embodiment.
Figure 11:
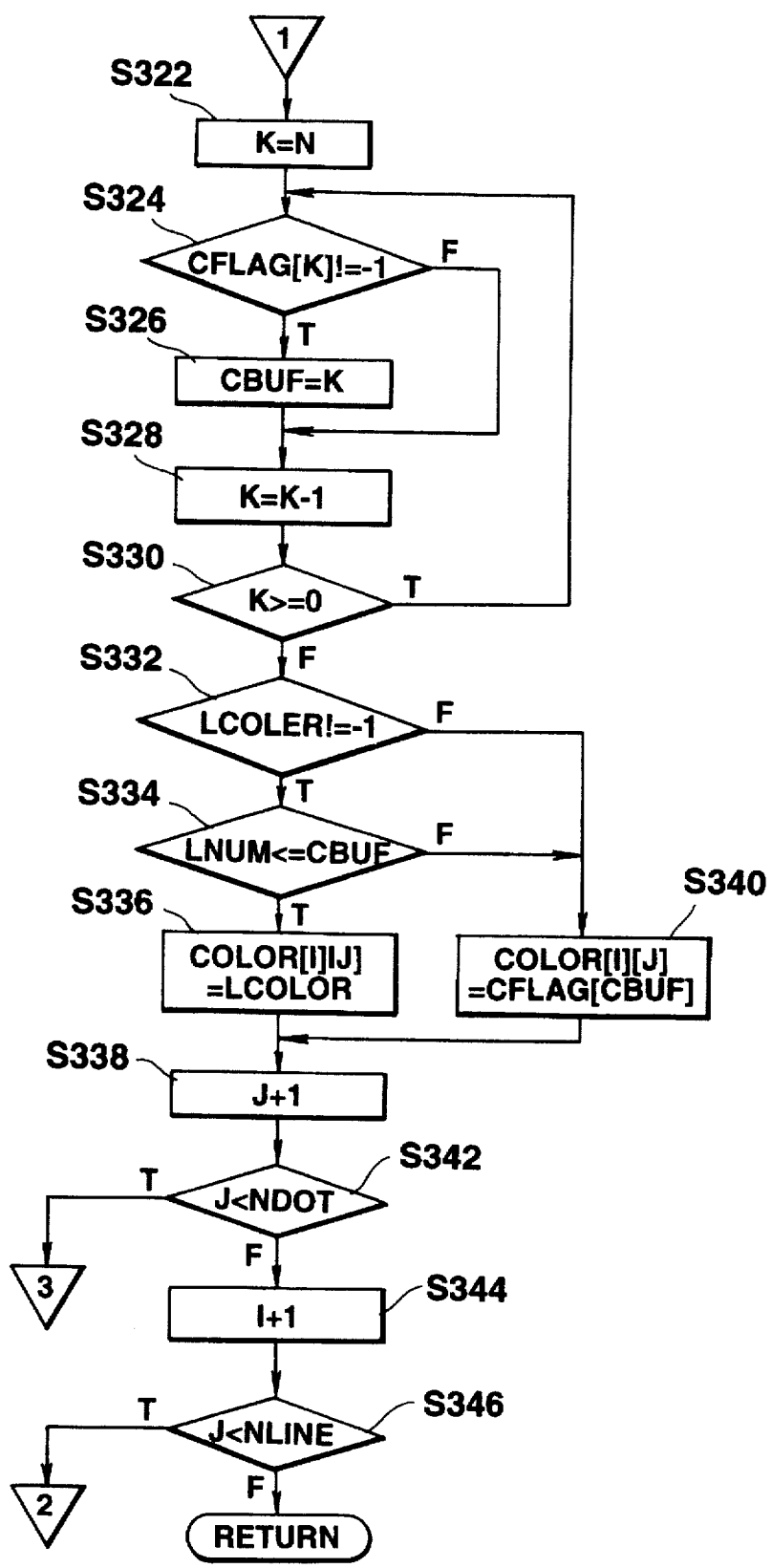

FIGS. 10 and 11 together form a flow chart showing a color determining subroutine in the painting process of the step S24 in the main program. This subroutine, paints in colors with respect to areas surrounded by generated closed curved lines by determining a color of each dot or pixel coordinate on a raster grid plane on which the closed curved lines have been drawn (see 11–16 in FIG. 4). The raster grid plane has a dimension of nline lines by ndot columns so that a dot coordinate is represented by (i,j) in which i=i-th line and j=j-th column. The color determining subroutine scans the raster grid plane in a manner of raster scan starting with i=0 and j=0. If the coordinate locates in an area enclosed by a drawn closed curved line and locates outside of an area enclosed by any other drawn closed curved line, the color thereof is determined by stored color data assigned to that drawn closed curved line. If the coordinate locates in an overlapped area in common with a plurality of overlapping closed curved lines, the color thereof is determined by stored color data assigned to a selected one of the overlapping closed curved lines having the highest priority therein.

Figures 12, 13:
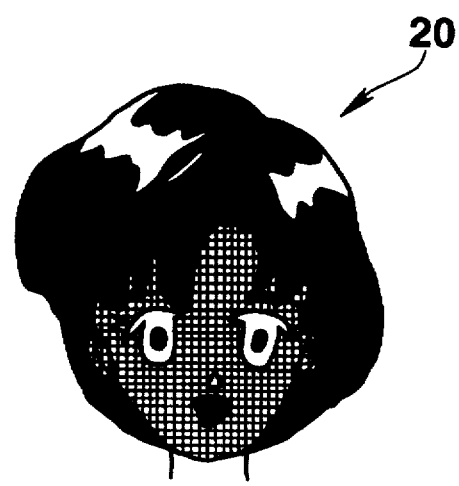
FIG. 12 represents color condition flags in accordance with the embodiment.
FIG. 13 represents a face image made by the embodiment.

First a step S300 of this subroutine clears color areas. Thus, all the areas on the raster grid plane are initially cleared to colorless. Then, in a step S302 color condition flags Cflag are initialized. Each color condition flag Cflag is for determining a corresponding closed curved line to be a color setting area (i.e., be painted). When these flags are initialized, they all become "−1", as shown in FIG. 12. The color condition flag of "−1" means the setting of the flag to a null number, which can not be taken as designating a color.

In FIG. 12, color condition flags of objects 1 to n are all initialized. Each object refers to an area enclosed by a closed curved line. The color condition flag of background is set to a background color No.

In scanning a line of the raster grid plane when entering an object, the color condition flag of that object is changed to a color No. indicative of the color of the closed curved line of that object (i.e., stored color data corresponding to the closed curved line). When going out of the object, the corresponding color condition flag is changed back to a null value of "−1."

In a step S304, the line pointer i is initialized to "0", and in a step S308 the column pointer j is initialized to "0". The line pointer i is for designating successive lines (for instance lines 0 to 524) on the raster grid plane, and the column pointer j is for designating successive columns. By setting pointer i=0 line 0 is designated, and by setting pointer j=0 column 0 on line 0 is designated.

In a subsequent step S308, line color lcolor is initialized to "−1", and line No. lnum is initialized to "−1." The line color lcolor is for designating the color of a closed curved line, and the line No.lnum is for designating the closed curved line No. In a subsequent step S310, closed curved line No.k is initialized to (n−1). For example, when there are 6 closed curved lines, the closed curved line No.k is set to "5". The closed curved line No.k designates the higher priority the smaller its value. That is, when k=0, the priority is highest, and it becomes progressively lower as k increases. Thus, in the step S810, the lowest priority is set.

In a subsequent step S812, closed curved line function C[k][i][j] is checked. The closed curved line function C[k][i][j] is a boundary test instruction for checking whether the coordinate (i, j) on the raster grid plane locates on a boundary of an object of No.k (i.e., coincides with a point of a closed curved line of No.k). The step S812 returns "true" either when entering the object of No.k or when leaving it. In the former case, the color condition Cflag [k] flag of object NO.k is changed to color data of the closed curved line No.k (step S314). In the latter case, Cflag [k] is changed back to a null value of "−1" (step S314). In a subsequent step S316, the color No. (i.e., the color data of the closed curved line No.k) is set in the line color lcolor, and k is set in the line No.lnum. In a subsequent step S318, k is decremented by "1", thus selecting a closed curved line having a next higher priority. If the step 312 returns "false", subroutine jumps to the step S318.

Subsequent to the step S318, a step S320 is executed to check whether k is equal to or greater than "0" to see whether there remain closed curved lines for boundary test. If this is the case, the subroutine goes back to the step S312 to repeat the loop of boundary test. When the boundary test of the coordinate (i, j) has completed with respect to all objects or closed curved lines, the step S320 returns "false" so that the subroutine goes to step 322 in FIG. 11.

A dot-by-dot painting process with respect to closed curved line is executed as shown in FIG. 11. First, step S322 initializes k to n pointing to the background. For example, when there are 6 closed curved lines, they are numbered by 0 to 5 in the priority decreasing order while the background is numbered by 6. Then, in a step S324 a check is made as to whether the color condition flag Cflag [k] is not equal to a null value of "−1", i.e., set to a color No. In the flow chart, this check is expressed as Cflag[k]!=−1.

with the sign of "!" representing "not" in the "C language". The color condition flag Cflag[k] set to a color No. means that the coordinate (i, j) locates inside of the object of No.k or on the left boundary thereof.

If the color condition flag Cflag[k] is set to a color No., the subroutine executes a step S326 to set the k in color buffer Cbuf before going to a step S330. Otherwise, the subroutine jumps to the step S330.

Subsequently, in a step S328 k is decremented by "one" to select a next higher priority. In a subsequent step S330, a check is made as to whether the k is equal to or greater than "0", to see whether there remains objects for inside test. If this is the case, the routine goes back to the step S324 to repeat the loop of inside test. Having tested the inside test of the coordinate (i, j) with respect to all objects, the color buffer cbuf stores No. of the object or closed curved line having the highest priority in the objects within which the coordinate (i, j) locates. Then, the step S330 sees a negative k so that the subroutine goes to a step S332.

In the step S332, a check is made as to whether the line color lcolor is not equal to "−1", i.e., set to a color No. The line color lcolor remains "−1" if the coordinate (i, j) does not locate on any closed curved line. In this case, cflag[cbuf] determines the color of the coordinate (i, j) so that color (i, j) is set to cflag[cbuf] at step 340. The line color lcolor has been set to a color No. if the coordinate (i, j) locate on a closed curved line. Then step S334 checks as to whether lnum≦cbuf. If this is the case, the line color lcolor determines the color of the coordinate (i, j) so that color [i] [j] is set to lcolor at step 336, otherwise cflag [cbuf] determines the color of the coordinate (i, j) so that color [i] [j] is set to cflag [cbuf] at step S340. In this manner, the coordinate (i, j) or dot is painted in the determined color.

Then, the step S338 is executed to increment the column pointer j by one for the next dot. Then, in a step S342 a check is made as to whether the j has reached ndots (for instance 256 dots as the number of pixels per line on the raster grid plane) have been reached. If not, the subroutine goes back to the step 308 in FIG. 10 to repeat the same process. Thus, in the next pass the color is determined with respect to the next dot on the same line. With j=ndot at step S342, the color determining process has been completed with respect to all the dots or pixels in one line, and a step S344 is executed.

In the step S344, the line pointer i is incremented by "1" for the next line. In a subsequent step S346, a check is made as to whether the line pointer i has reached n lines (for instance 525 lines as the number of lines on the raster grid plane). If not, the subroutine goes back to the step S306 in FIG. 10 to reset the column pointer j to "0" for repeating the same process for the next line. With j=nline at step S346, the color determining process has been completed for all the pixels on the raster grid plane, thus ending the subroutine.

In this manner, the color determining process scans the raster grid plane with respect to each coordinate or pixel thereof in a raster scan manner. For each image object enclosed by a closed curved line, the process tests the coordinate to see whether it is included in the object or not. When an image object does not overlap with any other image object, it is painted with the color of a closed curved line enclosing that image object. When an area in common to a plurality of image objects (overlapping objects) is found, the area is painted with the color of the overlapping object or closed curved line having the highest priority (i.e., the one defining the foreground among the overlapping objects).

Figure 18:
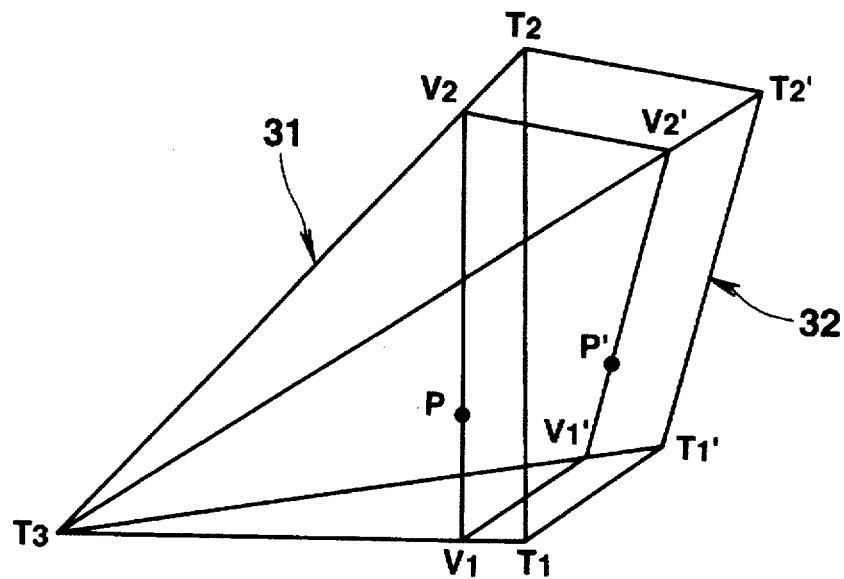
FIGS. 18 and 19 show how graphic transformation is effected in accordance with the embodiment.

After painting process, a completed face image such as the one 20 shown in FIG. 18 is displayed on the display 5.

With this embodiment, there is no need of having color data for each pixel, thus reducing the stored data required. In addition, it is possible to reduce the memory capacity, thus leading to cost reduction. Further, similar effects are obtainable when displaying color animation image instead of face image.

Further, while in the above embodiment Bezeir curved line parameters are used as curved line parameters for generating curved lines, this is by no means limitative, and it is possible to use B spline curved lines or any other curved lines as well. It is further possible to suitably use such parameters as parabolas, hyperbolas, trigonometric functions, etc.

In this case, suitable formulas of parabolas, hyperbolas, trigonometric functions, etc. may be used in correspondence to the shapes of closed curved line to be generated. It is thus possible to generate desired closed curved lines to meet various purposes or situations.

Further, the color image that is displayed is not limited to face image or animation image, but the invention is further applicable to various images, characters, background data, etc. used for such purposes as video games and the like.

Further, the invention is applicable not only to the color display of face image or animation image on the computer or television display screen, but also to display in other fields and of other kinds of images.

Now, a second embodiment of the invention will be described with reference to FIGS. 14 to 20. In this embodiment, the hardware arrangement is the same as that shown in FIG. 1.

Figure 14:
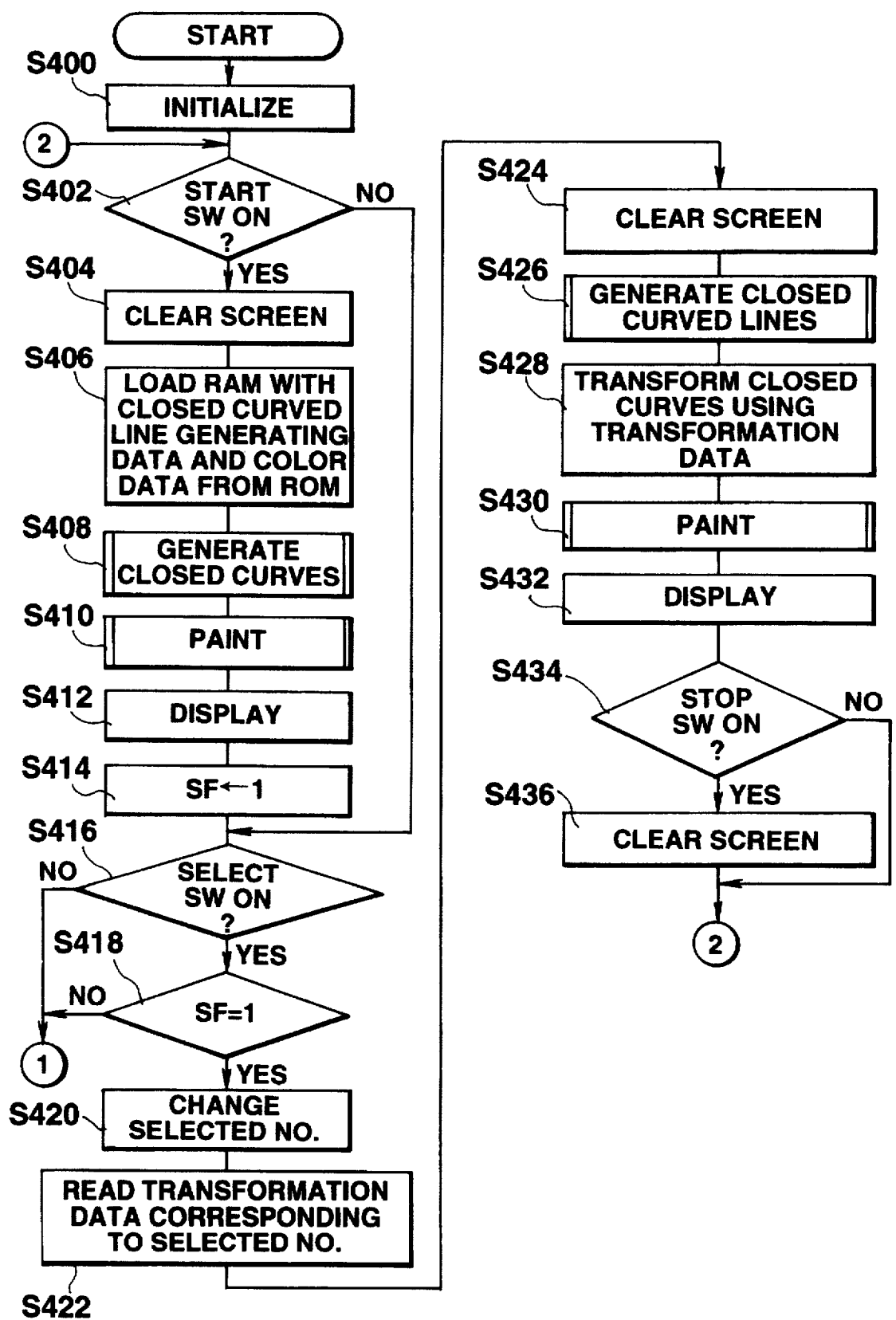
FIG. 14 is a flow chart of a main program for generating a face image in accordance with a second embodiment of the invention.

FIG. 14 is a flow chart of a main program for generating a face image in accordance with the second embodiment. When the program is started, a step S400 of initialization is first executed. For example, at this time initialization of various resisters in the CPU 1, clearing of work area in the RAM 3, sub-routine initialization, flag clearing, etc., are executed.

In a subsequent step S402, a check is made as to whether a start switch among the switches 4 has been "on". If the start switch has been "on", a step S404 is executed to clear the display on the display 5. In the first pass an initial image or an image for some operation may be provided, or nothing may be displayed. In either case, the display screen is cleared in the step S404. If any face image has been displayed, it is cleared.

In the ROM 2 are stored, as shown in FIG. 15, face image data for generating a reference face image (hereinafter sometimes referred to as reference image) and a plurality of transformation data (1) to (n) each for transforming the reference face image to change the expression of the face. The face image data are stored in predetermined storage areas of the ROM 2 and include closed curved line A to F generating data representing the outline and various parts of the face and closed curved line A to F color data. The closed curved line A to F color data designate colors of image objects surrounded by the closed curved lines A to F, respectively.

The transformation data (1) to (n) represent transformations of the face expression. For example, the transformation data (1) is used for representing an angry face, the transformation data (2) for a smiling face, and so forth. The desired one of the transformation data can be selected by a selection switch. They can be set freely to provide a desired expression of the face, and it is possible to freely set transformation data content.

Returning to the program, in a subsequent step S406 the closed curved line A to F generating data and also closed curved line A to F color data are read out from the ROM 2 into the RAM 3 to generate the reference face image.

The RAM 3 has the following storage areas in addition to the various work areas shown in FIG. 4, the data read out from the ROM 2 being loaded in their corresponding areas.

Selection No; area for storing No. of transformation data selected by selection switch.

Transformation data; area for storing the selected transformation data.

Returning again to the description of the flow chart, after the step S406, a subsequent step S408 is executed to generate the closed curved lines A to F according to the loaded closed curved line A to F generating data (the process being the same as in the step S22 in FIG. 2). Then, a step S410 is executed to make painting with respect to the generated closed curved lines A to F (the process being the same as in the step S24 to in FIG. 2). Thus, the closed curved lines A to F corresponding to various parts of the reference face image are generated, and painting in predetermined colors is made with respect to the generated closed curved lies A to F, thus generating a colored reference face image. Then, a step S412 is executed to display the generated color reference face image on the display 5. In a subsequent step S414, start flag SF is set to "1". The start flag SF is changed such that it is cleared to "0" in the initialization and is set to "1" when the reference face image is generated in response to the "on" operation of the start switch. With SF=1, it is possible to transform the reference face image with the selected transforming data.

Subsequent to the step S414, a step S416 is executed. If it is determined in the step S402 that the start switch is "off", the program jumps to the step S416 without generating the reference face image.

In the step S416, a check is made as to whether the selection switch is "on" to select transformation data. If the selection switch is "on", the selected No. is changed in a step S420. If the selection switch is "off", the program jumps to a step S434.

A. When selection switch is "off":

The step S434 checks as to whether a stop switch is "on". The stop switch is operated to terminate or stop face image display. If the stop switch is "on", a step S436 is executed to clear the display screen. The program then returns to the step S402 of checking the start switch operation. If it is determined in the step S434 that the stop switch is "off", the program skips the step S436 to the step S402 of the start switch operation check without clearing the display screen.

B. When selection switch is "on":

The step S418 checks as to whether the start flag SF is set to "1". If the start flag SF is "0", the step S434 is executed. At this time, no face image transformation is provided in response to the operation of the selection switch, no reference image has been generated.

If it is found in the step S418 that the start flag SF is "1", the step S420 is executed to update the selected No. for selecting transformation data. For example, when transformation data (1) has been selected in the preceding pass, the operation of the selection switch causes updating of the selection No. to "2" for the next transformation data (2).

Then, in a step S422, the selected transformation data of the selected No. is transferred from the ROM 2 to the RAM 3. If the selected NO. is "2", for instance, it selects the transformation data (2). Then, in a step S424 the screen of the display 5 is cleared. Thus, the face image that has been displayed disappears. In a subsequent step S426, the closed curved lines A to F are generated from the closed curved line A to F data (the process being the same as that in the step S22 in FIG. 2), and in a step S428 closed curved line transformation is made according to the selected transformation data. As a result, the closed curved lines are transformed according to the selected transformation data (for instance, transformation data (2)).

Subsequently, in a step S430 the raster grid plane with the transformed closed curved lines, is painted (the process being the same as that in the step S24 in FIG. 2) thus obtaining a colored and transformed face image. In a subsequent step S432, the transformed face image, is displayed on the display 5.

Thereafter, the step S434 is executed to check whether the stop switch is "on" as noted above. In this manner, the apparatus first generates and displays the reference image. Then, the user operates the selection switch to select the desired transformation data. Using the transformation data, the apparatus transforms the reference image into a transformed one having a difference face expression (e.g., angry face, smiling one). Now, description will be made on the principle of the transforming process in the step S428 in FIG. 14, which is a graphic transformation process used for generating various expressions of the same personality with small quantity of data. This principle is applied to transform the closed curved lines of face image according to transformation data as noted above.

Figure 17:
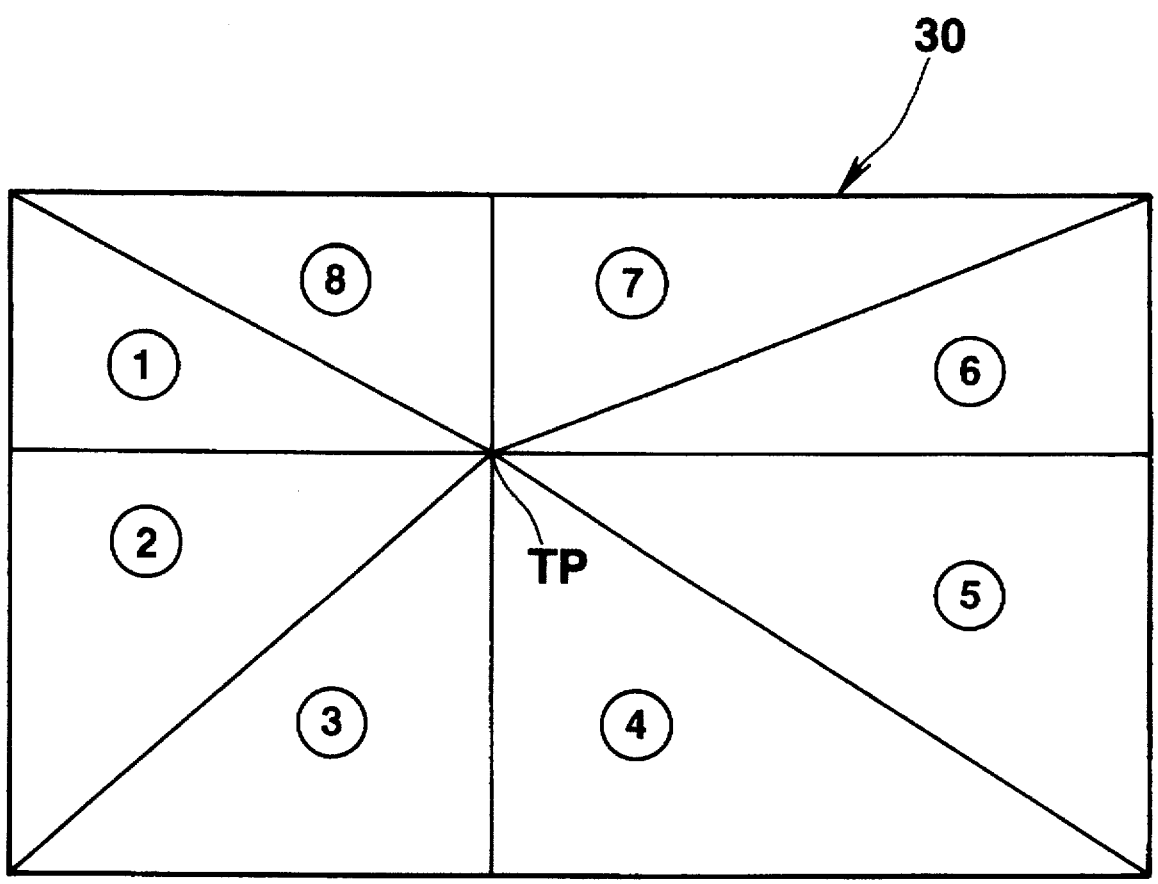
FIG. 17 represents a rectangle which is divided into right triangles for graphic transformation in accordance with the embodiment.

The principle will be described in connection with the case shown in FIG. 17, in which a rectangle 80 is divided into a plurality of triangles (1) to (8) to be transformed for image transformation. As shown in FIG. 17, the triangle 30 is divided into the eight triangles (1) to (8), which are all right triangles to facilitate calculations for position transformation.

As condition of transformation, a fixed point TP is set as the center of division of the rectangle 30 with an aim of reducing data involved. In addition, position transformation 1 shown in FIG. 18 is adopted for the transformation of the right triangles (1), (2), (5) and (6), and position transformation 2 shown in FIG. 19 is adopted for the transformation of the right triangles (3), (4), (7) and (8).

Figure 19:
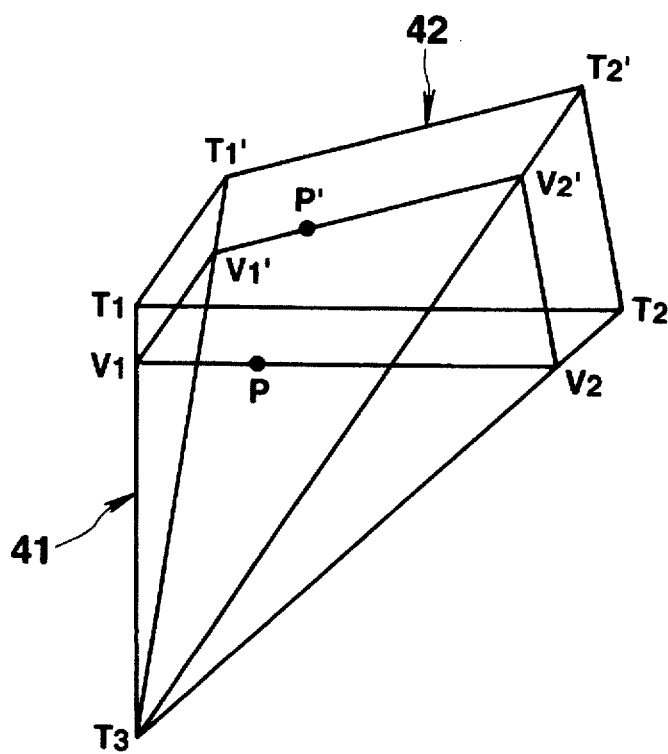

A. Position transformation 1 based on right triangle framing:

FIG. 19 shows an example of position transformation 1 based on right triangle framing. Here, a right triangle 31 having vertexes $T_1$ to $T_3$ is transformed into a triangle 32 having vertexes $T_1'$ to $T_3$, without changing the position of the vertex $T_3$. In this case, the position transformation from the right triangle 31 to the triangle 32 is made through the following calculations.

An internal point P in and points $V_1$ and $V_2$ on two sides of the right triangle 31 have their x coordinates given as $$V_1x = V_2x = Px$$

In addition, the internal point P and the vertex $T_1$ are related to each other by relative position vr as $$vr = V_1x/T_1x = Px/T_1x.$$

The y coordinate of the point $V_1$ is $$V_1y = 0.$$

Using the relative position vr relating the internal point P and the vertex $T_2$, the y coordinate of the point $V_2$ is expressed as $$V_2y = T_2y \, vr.$$

Thus, the relative position pr of the internal point P is expressed as $$\begin{aligned} pr &= (V_2y - V_1y)/(Py - V_1y) \\ &= V_2y/Py \\ &= T_2y \, Px/T_1x \, Py. \end{aligned}$$

The coordinates of the points $V_1'$ and $V_2'$ on two sides of the transformed triangle 32 can be expressed as $$V_1'x = T_1'x \, vr,$$

$$V_1'y = T_1'y \, vr,$$

$$V_2'x = T_2'x \, vr, \text{ and}$$

$$V_2'y = T_2'y \, vr.$$

From the above date, the x coordinate of the internal point P' of the transformed triangle 32 can be calculated as follows. Since there holds the relation;

$$(V_2'x - V_1'x):(P'x - V_1'x) = (V_2x - V_1x):(P_x - V_1x).$$

It leads to:

$$(V_2'x - V_1'x)/(P'x - V_1'x) = pr.$$

Thus, using the pr the x coordinate of the internal point P' after the transformation is obtained as $$\begin{aligned} P'x &= (V_2'x - V_1'x)pr + V_1'x \\ &= (T_2'x - T_1'x)*(vr/pr) + T_1'x \, vr \\ &= (T_2'x - T_1'x)*(T_1x \, Py)/(T_2y \, Px)* \\ &\quad (Px/T_1x + T_1'x(px/T_1x) \\ &= (T_1'x/T_1x) \, Px + \{(T_2'x - T_1'x)/T_2y\}Py. \end{aligned}$$

Likewise, the y coordinate of the internal point P' of the transformed triangle 32 can be calculated as follows. Since there holds the relation;

$$(V_2'y - V_1'y):(P'y - V_1'y) = (V_2y - V_1y):(Py - V_1y),$$

It leads to;

$$(V_2'y - V_1'y)?(P'y - V_1'y) = pr.$$

Thus, using the pr the y coordinate of the internal point P' after the transformation is obtained as $$\begin{aligned} P'y &= (V_2'y - V_1'y)/pr + V_1'y \\ &= (T_2'y - T_1'y)*(vr/pr) + T_1'y \, vr \\ &= (T_2'y - T_1'y)*(T_1x \, Py)/(T_2y \, Px)* \\ &\quad (Px/T_1x) + T_1'y(Px/T_1x) \\ &= (T_1'y/T_1x) \, Px + \{(T_2'y - T_1'y)/T_2y\}Py. \end{aligned}$$

As shown, when transforming the right triangle 31 having the vertexes $T_1$ to $T_3$ to the triangle 32 having the vertexes $T_1'$ to $T_3'$ without changing the position of the vertex $T_3$, the internal point after the transformation is computed from the internal point before the transformation using the transformation data of coordinates of vertexes $T_1$, $T_2$, $T_1'$ and $T_2'$. In other words, when the internal point P is made to be each dot of the closed curved lines in the face image before the transformation, the corresponding dot after the transformation is obtained as the internal point P'. Besides, since the position of the vertex T3 is fixed, the transformation involves reduced data. Through the above transformation process, it is thus possible to vary the expression of the face while retaining the identity of the personality.

B. Position transformation 2 based on right triangle framing.

FIG. 19 shows an example of position transformation 2 based on right triangle framing. Here, a right triangle 41 having vertexes $T_1$ to $T_3$ is transformed to a triangle 42 having vertexes $T_1'$ to $T_3'$ without changing the position of the vertex $T_3$. In this case, the position transformation of the right triangle 41 to the triangle 42 is made through the following calculations.

The y coordinates of an internal point P and points $V_1$ and $V_2$ on two sides of the right triangle 41 are expressed as $$V_1y = V_2y = Py$$

The internal point P and the vertex $T_1$ are related to each other by relative position vr as $$vr = V_1y/T_1y = Py/T_1y.$$

The x coordinate of the point $V_1$ is given as $$V_1x = 0.$$

Using the relative position vr, the x coordinate of the point $V_2$ is expressed as $$V_2x = T_2x\ vr.$$

Thus, the relative position pr of the internal point P is expressed as $$pr = (V_2x - V_1x)/(Px - V_1x)$$
$$= V_2x/Px$$
$$= T_2x\ Py/T_1y\ Px.$$

Further, the coordinates of the points $V_1'$ and $V_2'$ on the two sides of the transformed triangle are expressed as $$V_1'x = T_1'x\ vr,$$
$$V_1'y = T_1'y\ vr,$$
$$V_2'x = T_2'x\ vr,\text{ and}$$
$$V_2'y = T_2'y\ vr.$$

From the above data, the x coordinate of the internal point P' of the transformed triangle 42 can be calculated as follows. Since there holds a relation;

$$(V_2'x - V_1'x):(P'x - V_1'x) = (V_2x - V_1x):(Px - V_1x).$$

It leads to:

$$(V_2'x - V_1'x)/(P'x - V_1'x) = (V_2x - V_1x)/(Px - V_1x).$$
$$= V_2x/Px$$
$$= pr.$$

Using this relation, the x coordinate of the internal point p after the transformation is obtained as $$\begin{aligned}P'x &= (V_2'x - V_1'x)pr + V_1'x \\ &= (T_2'x - T_1'x)*(vr/pr) + T_1'x\ vr \\ &= (T_2'x - T_1'x)*(T_1y\ Px)/(T_2x\ Py)* \\ & \quad (Py/T_1y + T_1'x(Py/T_1y) \\ &= \{(T_2'x - T_1'x)/T_2x\}Px + (T_1'x/T_1y)Py.\end{aligned}$$

Likewise, the y coordinate of the internal point P' of the transformed triangle 42 can be calculated as follows. Since there holds a relation:

$$(V_2'y - V_1'y)/(P'y - V_1'y) = pr.$$

Using this relation the y coordinate of the particular point P' can be obtained as $$\begin{aligned}P'y &= (V_2'y - V_1'y)pr + V_1'y \\ &= (T_2'y - T_1'y)*(vr/pr) + T_1'y\ vr \\ &= (T_2'y - T_1'y)*(T_1y\ Px)/(T_2x\ Py)* \\ & \quad (Py/T_1y + T_1'y(Py/T_1y) \\ &= \{(T_2'y - T_1'y)/T_2x\}Px + (T_1'y/T_1y)Py.\end{aligned}$$

As shown, when transforming the right triangle 41 having the vertexes $T_1$ to $T_3$ into the triangle 42 without changing the position of the vertex $T_3$, the x and y coordinates of the internal point P' after the transformation are computed from the internal point P before the transformation using the transformation data of coordinates of vertexes $T_1$, $T_2$, $T_1'$ and $T_2'$. In other words, when the particular point P is made to be each dot of the closed curved lines in the face image before the transformation, the corresponding dot after the transformation can be obtained as the particular point P'. Besides, since the position of the vertex T3 is fixed, less data is necessary for the transformation. The transformation process thus permits variation of the face expression while retaining the identity of the personality.

As has been shown, by dividing the rectangle 30 into a plurality of (i.e., eight in this embodiment) right triangles (1) to (8) and transforming the image by transformation of these triangles, the expression of the face can be readily varied with less data required for the transformation, i.e., data of the division center PT of the triangle 30, data of parts to be transformed, original and transformed data of the rectangle 30.

In this embodiment, using the above transformation process the reference face image is transformed to vary the expression of the face. First, a reference face image 51, exemplified in FIG. 20 is generated in the main program. Then transformation data is selected by operating the selection switch. As a result, the selected transformation data is read out from the ROMs, to effect transformation of closed curved lines in the reference face image 51. Eventually, a transformed image 52 with a varied face expression (for instance in a surprised expression) is obtained and displayed on the display 5 as shown in FIG. 20. By changing the transformation data, the face image can be displayed in another expression (such as a smiling expression, etc.) of the same personality.

It is to be appreciated that, unlike the prior art, the expression of the face image in color display can be varied without need of having color data for each pixel, that is, color image display can be obtained by having only closed curved line generating data and color data corresponding to each closed curved line. Further, unlike the prior art, there is no need of having pieces of data of the entirety or part of face image corresponding in number to the number of different available expressions, but it suffices to add only transformation data corresponding to different expressions for providing different expressions of the reference face image. That is, the face of the same perfonality can be provided in different expressions with less data. It is thus possible to color display face image and vary the expression thereof with reduced data quantity, less memory capacity and at reduced cost.

Now, a third embodiment of the invention will be described with reference to FIGS. 21 to 24.

In this embodiment, an area of generated reference face image is designated with a correcting frame. Closed curved lines in the designated area are transformed according to transformation data. Painting is then made with respect to the objects surrounded by the transformed closed curved lines to generate a transformed image with a varied face expression. The hardware structure of this embodiment is the same as that shown in FIG. 1 except for the switches 4 includes a correction switch, a correction start switch and a painting switch. The correction switch is operated to designate an area of the face image in a correcting frame. The correction start switch is operated to start the transformation of the area designated by the correcting frame. The painting switch is operated to effect color painting of face image.

Figure 21:
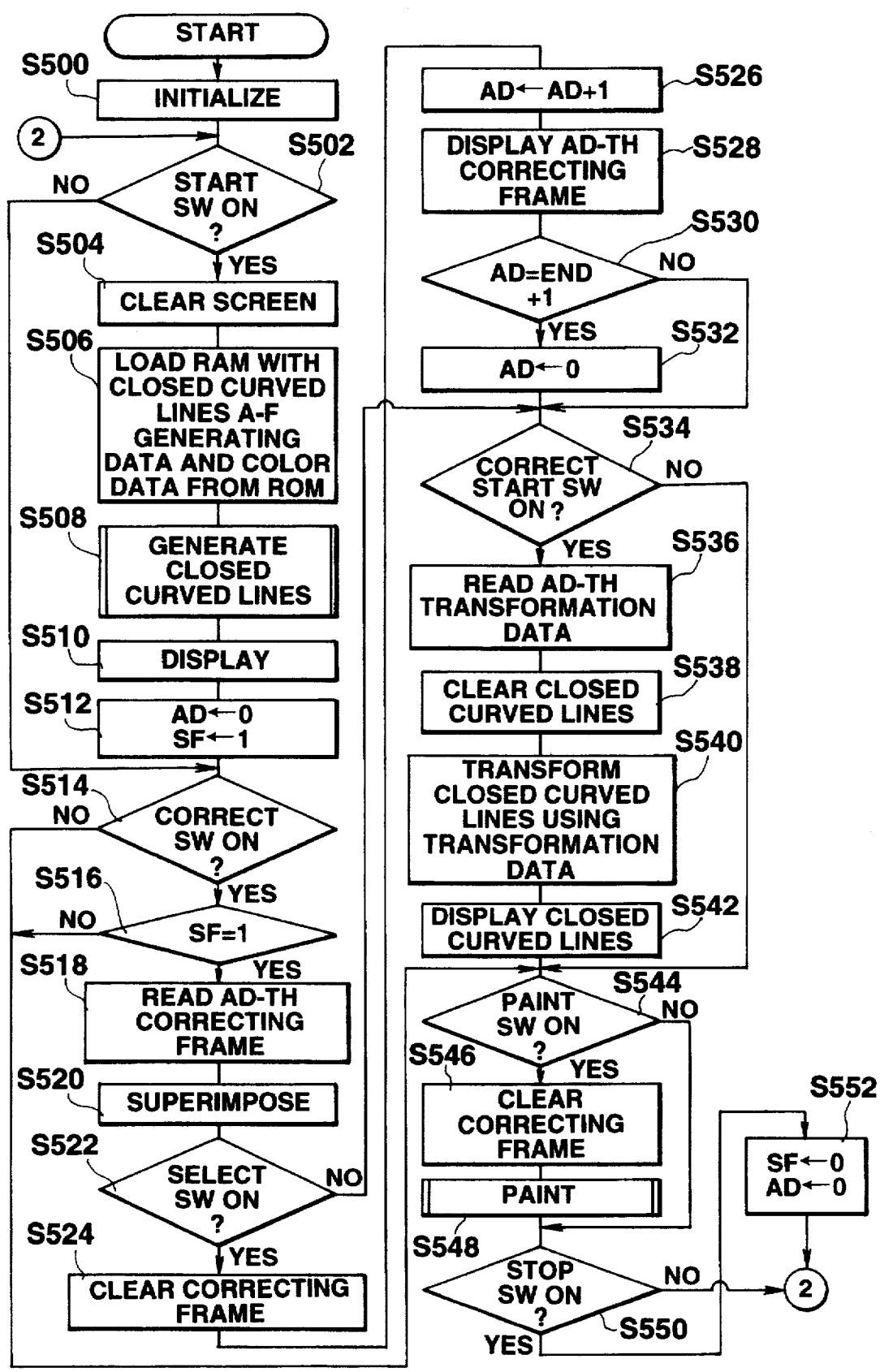
FIG. 21 is a flow chart of a main program for generating a face image in accordance with a third embodiment of the invention.

FIG. 21 is a flow chart of the main program of face image generating process. When the program is started, a step S500 of initialization is executed to initialize various registers in the CPU 1, clear work areas in the RAM 3, initialize subroutines, reset flags, etc.

In a subsequent step S502, a check is made as to whether the start switch is "on":

A. When start switch is "on":

When the start switch is "on", the screen of the display 5 is cleared in a step S504. In the first pass it is possible, for instance, to provide initialization display or some operation display, or nothing may be displayed. In either case, the display screen is cleared in the step S504. For example, when a face image has already been displayed, it is cleared.

Figure 22:
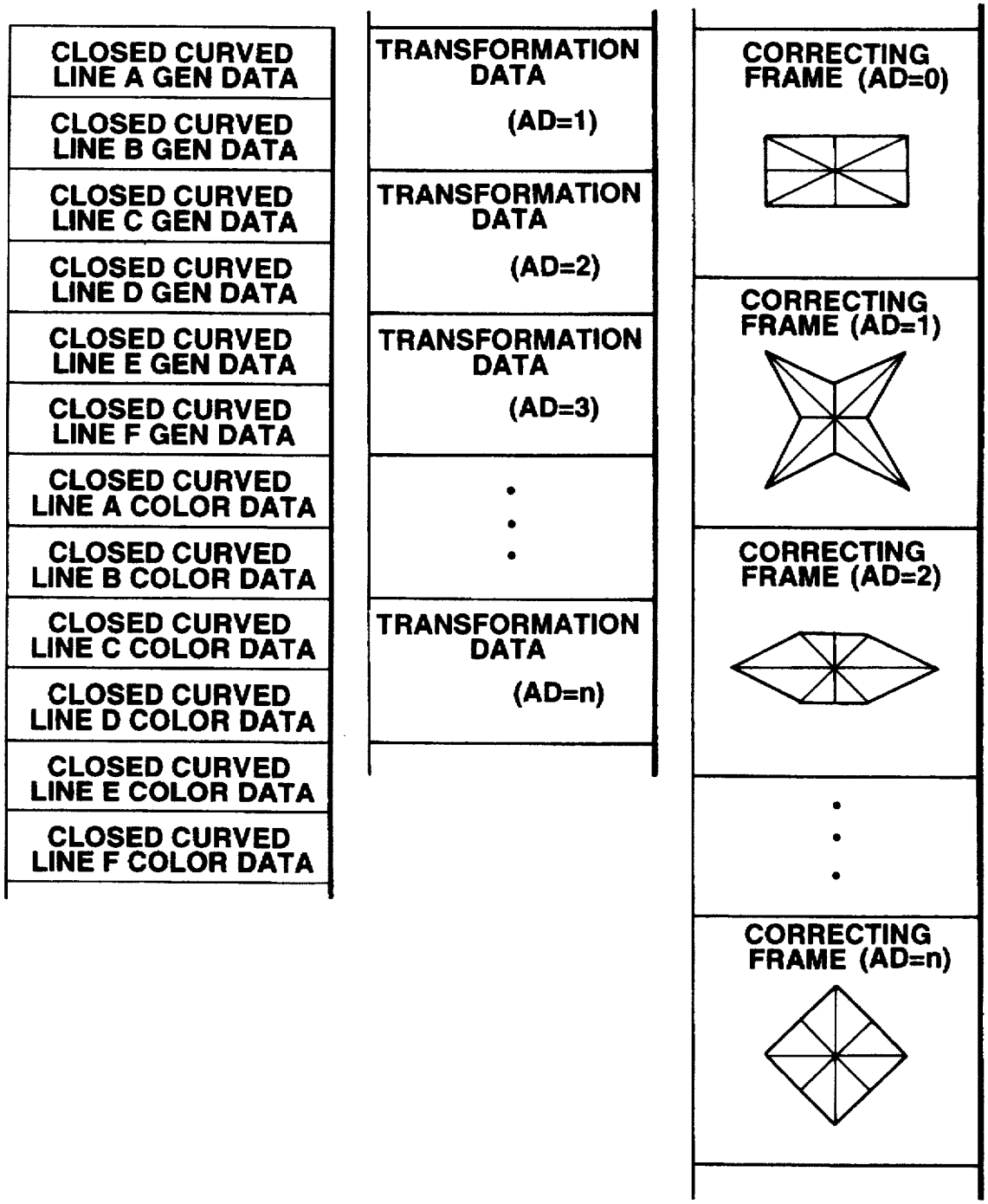
FIG. 22 represents data stored in ROM in accordance with the embodiment.

The ROM 2 stores, face image data for generating reference face image and a plurality of records of transformation data for varying the expression the face, as shown in FIG. 22. The plurality of records of transformation data records are stored in areas of addresses AD=1 to AD=n. The face image data are stored as closed curved line A to F generating data representing the outline and various parts of face and closed curved line A to F color data for designating colors of the closed curved lines. The closed curved line A to F color data are for designating colors corresponding to the closed curved line A to F generating data i.e., colors with which objects surrounded by closed curved lines are painted.

The plurality of transformation data records of Nos AD=1 to AD=n are for varying the expression of the reference face image. They correspond to different expressions of the face; for instance the data record of AD=1 corresponds to an angry expression, the data record of AD=2 corresponds to a smiling expression, and so forth. A transformation data record is selected by the operation of the selection switch. Further, in this embodiment, a plurality of correcting frame data records are stored in association with the transformation data records. Each correcting frame data record is used to display a corresponding correcting frame in superimposition upon the reference face image, thus informing the user of an image part to be transformed. The superimposition display of a correcting frame is executed in response to the operation of the correction switch.

Returning to FIG. 21, in a subsequent step S506 the closed curved line A to F generating data and closed curved line A to F color data are transferred from the ROM 2 to the RAM 3 to generate the reference face image.

Figure 23:
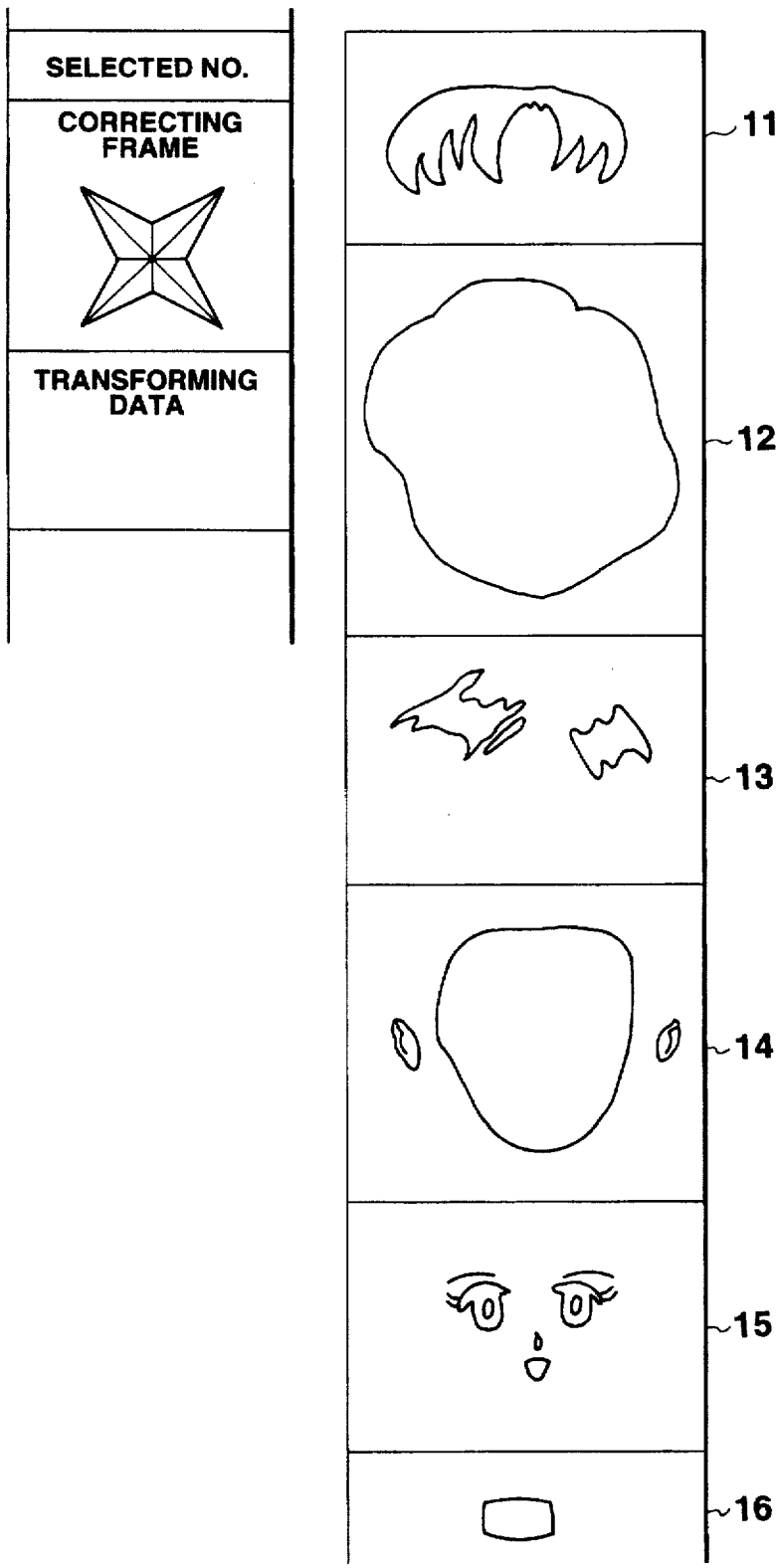
FIG. 23 represents data stored in RAM in accordance with the embodiment.

The RAM 3 has various work areas as shown in FIG. 23, and data from the ROM 2 are loaded in corresponding areas.

The work areas of the RAM 3 are as follows.

Areas for storing the closed curved line A to F generating data, closed curved line A to F color data, color condition flags (A) to (F), background color No. and selection No. are the same as in the previous embodiments.

Further, areas for storing correcting frame data and transformation data are provided for varying face expression. Further areas 11 to 16 are provided to store generated closed curved lines cutting various parts of face image. For instance, the area 11 is for hair, the area 12 for hair style, the area 13 for shine of hair, the area 15 for parts of face, and the area 16 for neck.

Returning to FIG. 21 again, subsequent to the step S506 a step 508 is executed to generate the closed curved lines A to F according to the loaded closed curved line A to F generating data (the process being the same as that described before). Then a step S510 of a display process is executed to display the generated closed curved lines of the reference face image. At this time, a process of painting with respect to the closed curved lines A to F has not yet been executed.

In a subsequent step S512, the pointer AD is cleared to "0". The pointer AD designates a correcting frame and transformation data record stored in the ROM 2. Also in the step S512 the start flag SF is set to "1". The start flag SF is cleared to "0" in the initialization process and also in a step S552 to be described later. The start flag SF of "1" indicates that the closed curved lines the reference face image have been generated so that it is ready to transform them to vary the expression of the face.

Subsequent to the step S512, a step S514 is executed to check the correction switch state. The correction switch is operated to designate an area of the reference image in a correcting frame for varying the face expression. If the correction switch is "off", the program jumps to a step S544. If the correction switch is "on", the correcting frame data is read out in a step S518.

A. When the correction switch is "off":

The step S544 checks as to whether the paint switch is "on". The paint switch is operated when starting a painting process with respect to objects surrounded by the closed curved lines. If the paint switch is "on", a step S546 is executed to clear the correcting frame (for instance, the one 71 shown in FIG. 24) from the display screen. Then a step S548 of a painting process (similar in detail to the subroutine described earlier) is executed to paint objects surrounded by closed curved lines, thus generating a color face image. It is noted that the painting process is done either for reference closed curved lines generated in step S508 or for transformed closed curved lines generated in step S540. The color face image thus generated is displayed on the display 5.

A subsequent step S550 checks as to whether the stop switch is "on". The stop switch is operated to stop or discontinue the face display. If the stop switch is "on", the step S552 is executed to clear the start flag SF to "0" and reset the pointer AD to "0". The program then returns to the step S502 to check whether the start switch is operated. If the stop switch is "off", the program skips the step S522 to return to the step S502 of the start switch operation check.

B. When correction switch is turned on:

A step S516 checks as to whether the start flag SF is "1". If the start flag SF is "0", the program jumps to the step S544 since no reference face image has been generated.

If the start flag SF is "1", a step S518 is executed to transfer AD-th correcting frame data from the ROM 2 to the RAM 3. For instance, with AD=0, a rectangular frame (FIG. 22), indicative of no transformation is loaded in the RAM 3. With AD=1, a star-shaped correcting frame (FIG. 22) is loaded into the RAM 3. Each correcting frame (AD=1 to n) has a shape transformed from the rectangular frame of no transformation (AD=0).

Then a step S20 displays the correcting frame to superimpose the face image on the screen. For example, a rectangular frame 71 shown in FIG. 24 is displayed in superimposition on reference face image 61. The frame indicates the portion of the face image that is to be transformed. Then, a step S522 checks as to whether the selection switch is "on". If the selection switch is "on", a step S524 is executed to clear the display of the correcting frame. The correcting frame thus disappears from the display screen. Then, a step S526 increments the pointer AD by one, thus designating, the next correcting frame. Then a step S528 reads and displays the AD-th correcting frame. For example, with AD=2, a rhombus correcting frame shown in FIG. 22 is displayed.

Subsequently, a step S530 is executed to check whether the pointer AD has reached (END+1), that is, whether all the correcting frames have been displayed. If this is not the case, the program goes to a step S534. In the affirmative, a step S582 clears the pointer AD to "0".

The step S584, checks as to whether the correction start switch is "on". If the correction start switch is "on", a step S536 is executed to transfer the AD-th transformation data corresponding to the correcting frame from the ROM 2 to the RAM 3. If AD=1, for instance, transformation data of AD=1 is read out.

Thereafter, a step S538 clears the closed curved lines displayed on the screen. Then, in a step S540 the closed curved lines of the reference face image are transformed according to transformation data. For example, if AD=1, the reference image is transformed according to transformation data AD=1. Then, in a step S542 the closed curved lines after the transformation are displayed. As a result, the transformed face image is displayed as the closed curved lines. Then, the step S544 is executed. If the correction start switch is "off (step S534)", the program skips steps S536 to S542 to the step S544. Thus, at this time the face image is not transformed.

The process in the step S544 and following steps are as described before.

FIG. 24 shows an example of image transformation. First, a reference image 81 is displayed. Then, a rectangular frame 71 is displayed in superimposition on the reference face image 61 to indicate a portion to be transformed.

For providing a different face expression, a different correcting frame 72 having a different shape from that of the rectangular frame may be designated with respect to the reference image 61. In response to the operation of the correction start switch, the transforming process transforms the closed curved lines of the reference image 61 according to transformation data designated by the correcting frame 72, thus generating an unpainted transformed image 82 having a different expression. Finally, the painting process makes a color transformed face image 63.

As has been shown, in this embodiment the process of varying the face expression is executed by designating part of generated reference image with a correcting frame, transforming the part according to transformation data corresponding to the correcting frame, and then painting with respect to the boundaries and inside of the closed curved lines of the transformed basic image. Thus, it is possible to vary the expression of the reference image with respect to designated part thereof. A correcting frame is conveniently displayed in superimposition on the reference face image to inform the user of the part of the image to be transformed.

Now, a fourth embodiment of the invention will be described with reference to FIGS. 25 to 29. The hardware structure of this embodiment is the same as that shown in FIG. 1.

Figure 25:
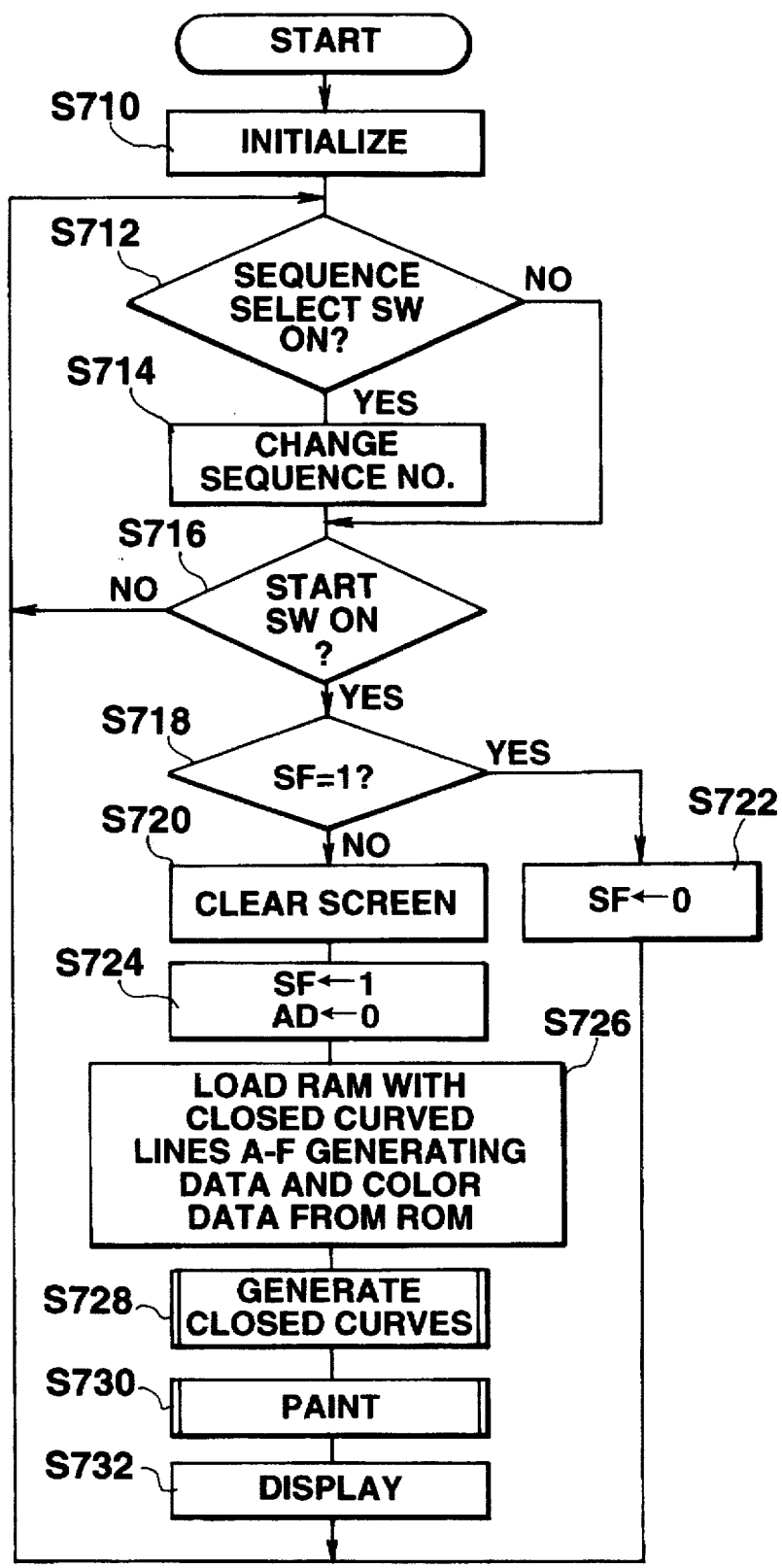
FIG. 25 is a flow chart of a main program for generating a face image in accordance with a fourth embodiment of the invention.

FIG. 25 is a flow chart showing the main program of a face image generating process. When the program is started, a step S710 of initialization is first executed to initialize various registers in the CPU 1, clear work areas of the RAM 3, initialize subroutines, reset flags, etc.

In a subsequent step S712, a check is made as to whether a sequence selection among the switches 4 is "on". If the sequence selection switch is "on", a step S714 is executed to update the sequence No. This means selecting, from a plurality of face image sequence, a new one corresponding to the updated sequence No. Then a step S716 is executed. If the sequence selection switch is "off", the program skips the step S714 to the step S716 without changing the sequence No.

Figure 26:
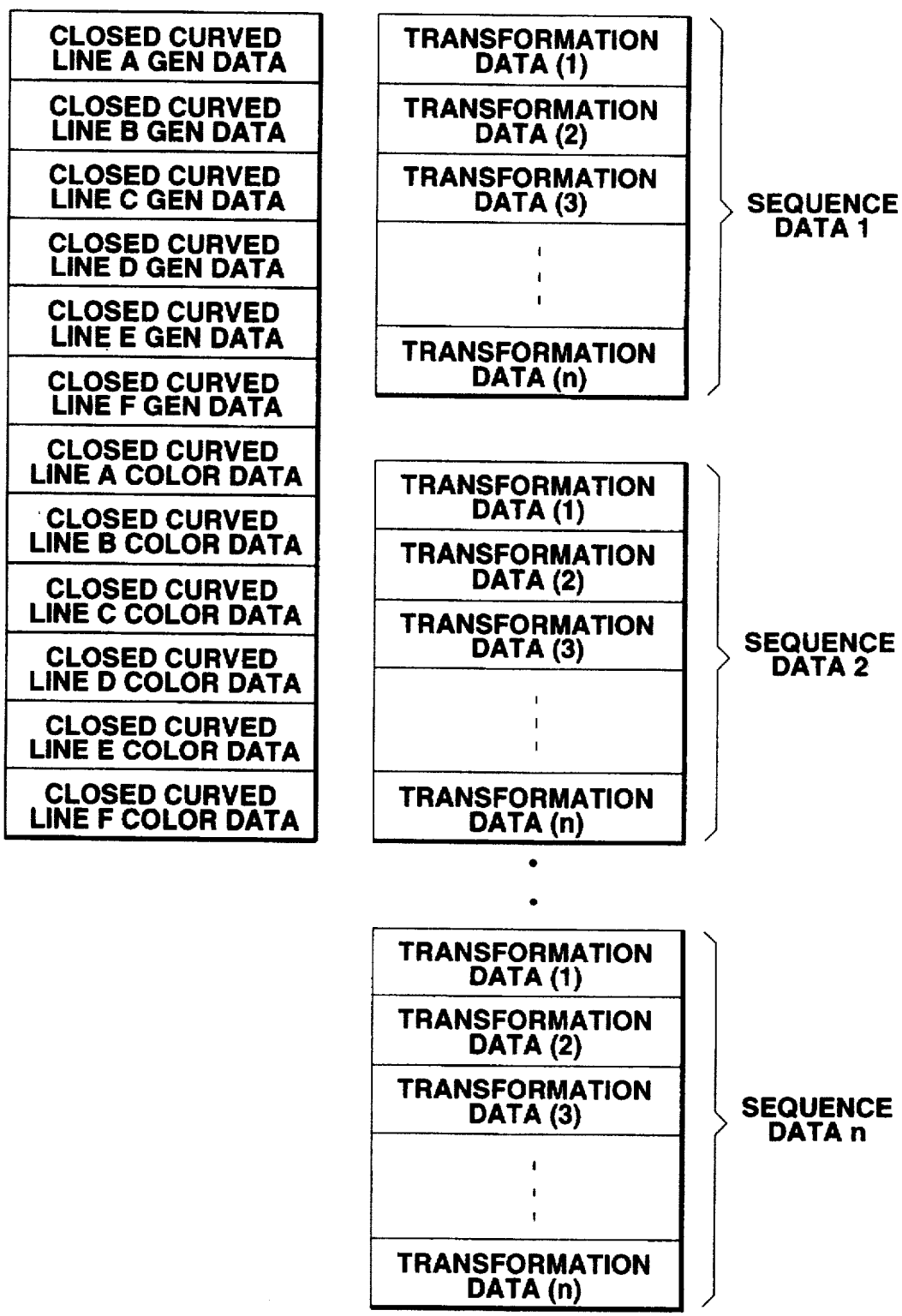
FIG. 26 represents data stored in ROM in accordance with the embodiment.

The ROM 2 stores, face image data for generating a reference face image and a plurality of sequence data records (a) to (n) for respective face image sequences, as shown in FIG. 26. The face image data comprise closed curved line A to F generating data defining closed curved lines that represent the outline and various parts of the face, and closed curved line A to F data for designating colors with which image objects surrounded by the closed curved lines are painted.

Each sequence data record is used to provide an image sequence or animation of face expression. For instance, sequence data record (1) is for a smiling face, animation sequence data record (2) for an angry face animation, and so forth. Each sequence data record is constructed by a plurality of transformation data records (1) to (n).

If sequence No.1 is selected the step S714 transfers the transformation data (1) to (n) of sequence data record (1) from the ROM 2 to the RAM 3.

The subsequent step S716 checks as to whether a start switch among the switches 4 is "on". If the start switch is "off", the program goes back to the step S712. If the start switch is "on", a step S718 is executed to check whether start flag SF is "1". The start flag SF changed between "1" and "0" alternately in response to "on" operations of the start switch in steps S722 and S724. When SF=1, face image sequence is generated in an interrupting process to be described later.

If the start switch is depressed with SF=0, the program changes SF to "1" (step S724) after clearing the display screen (step S720). If the start switch is depressed with SF=1, the program changes SF to "0" (step S722), returning to the step S712.

It will be seen that the face image sequence display or animation is started or stopped in response to an "on" operation of the start switch.

The step S724 also initializes transformation pointer AD to "0", thus selecting the first transformation data of the sequence data record.

Next, a step S726 transfers closed curved line A to F generating data and closed curved line A to F color data from the ROM 2 to the RAM 3 for generating the reference image.

As shown in FIG. 27, the RAM 3 has the following work areas in addition to those described in connection with FIG. 4.

Sequence No.: area for storing sequence No. selected by sequence selection switch.

Transformation data (1) to (n): area for storing transformation data (1) to (n) of the selected sequence data record.

Returning to FIG. 25, subsequent to the step S726 a step S728 is executed to generate closed curved lines A to F according to the loaded closed curved line A to F generating data (the process being the same as that in the step S22 in FIG. 2). Then a step S730 paints image objects surrounded by the generated closed curved lines A to F (the process being the same as that in the step S24 in FIG. 2), thus generating the reference face image. Then, a step S732 is executed to display the generated face image on the display 5. Subsequent to the step S732, the program returns to the step S712 so as to repeat the same loop. In this way, the reference or first face image of the animation is generated and displayed.

Figure 28:
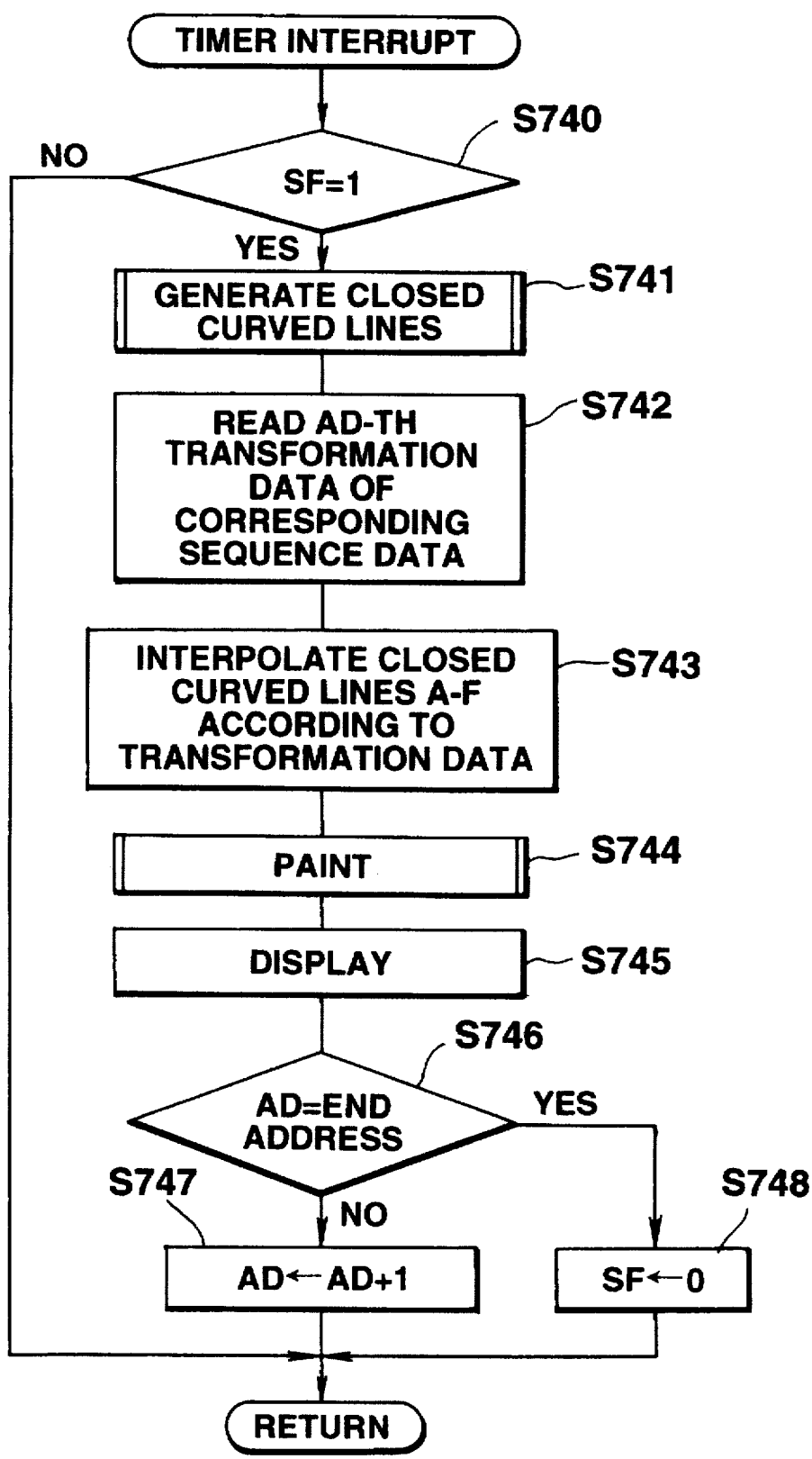
FIG. 28 is a flow chart of a timer interrupt routine in accordance with the embodiment.

FIG. 28 is a flow chart showing a timer interrupt routine. The timer interrupt routine is repeated at predetermined intervals of time to make and display image sequence or animation.

In the timer interrupt routine, a check is first made in a step S740 as to whether the start flag SF is "1". If the start flag SF is not "1", there is no request of image sequence display by the "on" operation of the start switch, thus returning the main program.

If the start flag SF is "1", a step S741 is executed to generate the closed curved lines A to F (the process being the same as that in the step S22 in FIG. 2). Then a step S742 loads AD-th transformation data of the selected sequence data record from the ROM 2 into RAM 3.

Then, a step S743 interpolates the closed curved lines A to F according to the loaded transformation data (the process being the same as that in the step S428 in FIG. 14). Thus making transformed closed curved lines. The transformed closed curved lines represent a unpainted transformed image in the image sequence.

A subsequent step S744 paints image objects surrounded by the transformed closed curved lines A to F (the process being the same as that in the step S24 in FIG. 2), thus making a painted transformed face image. Then, a step S748 displays the painted transformed face image. The face image thus displayed represents an image frame in the animation or image sequence. Then, a step S746 checks as to the transformation pointer has reached the end. In the negative, a step S747 increments the pointer AD by one. Thus, in the next pass, the timer interrupt routine makes the next image frame of the animation.

If the transformation pointer AD has reached the end, the routine resets the start flag SF to "0" (step S748) and returns to the main program.

In this manner, the timer interrupt routine successively reads a plurality of transformation data records constructing an image sequence data record, successively transforms the reference face image with respect to the closed curved lines according to the transformation data records, and paints the results, thus making an animation or image sequence in which face expression changes from one image frame to another.

Figure 29:
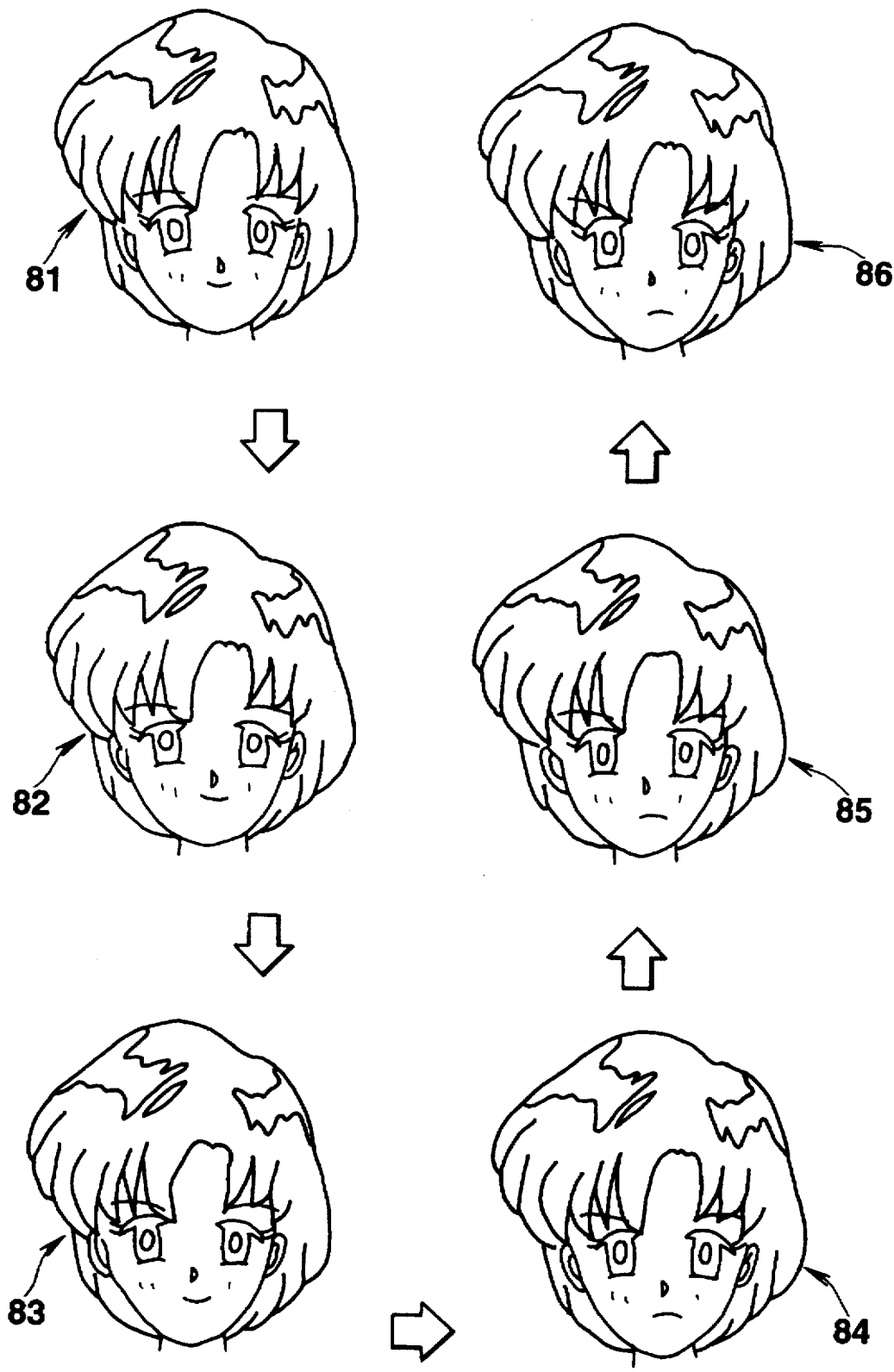
FIG. 29 represent a face animation in accordance with the embodiment.

FIG. 29 shows an example of image sequence with a changing face expression. In FIG. 29, face images 82 to 86 are sequentially made and displayed in the timer interrupt process by transforming the reference face image 81 according to a sequence of transformation data records. In this way, it is possible to realize image sequence or animation with variation of the expression of the reference face image. Unlike the prior art, there is no need of having pixel-by-pixel image data for all image frames involved in the animation. According to the fourth embodiment, the animation is obtained simply from closed curved line generating data and color data in addition to sequence data (i.e., a plurality of transformation data records) for varying the expression. Thus, the embodiment realizes color face image sequence display of animation with reduced data quantity and reduced memory capacity and at reduced cost. To vary expression more finely, it is possible to make and display an interpolated image frame between image frames in the image sequence exemplified in FIG. 29. This is done by interpolating between each point of closed curved lines made by a transforming data record and that made by the next transforming data record.

Now, a fifth embodiment of the invention will be described with reference to FIGS. 30 to 32.

In this embodiment, a plurality of mini-sequence data records each constructed by a small number of pieces of transformation data are prepared. Among from them desired mini-sequence data records are selected and combined into an edited sequence of transformation data. The hardware structure of this embodiment is the same as that of the previous embodiment shown in FIG. 1 except for provision of a sequence set mode switch and a selection switch in the switches 4. The sequence set mode switch is operated to select a mode for editing mini-sequences into the desired sequence of transformation data. The selection switch is operated to select a desired one of the plurality of mini-sequences for the editing.

Figure 30:
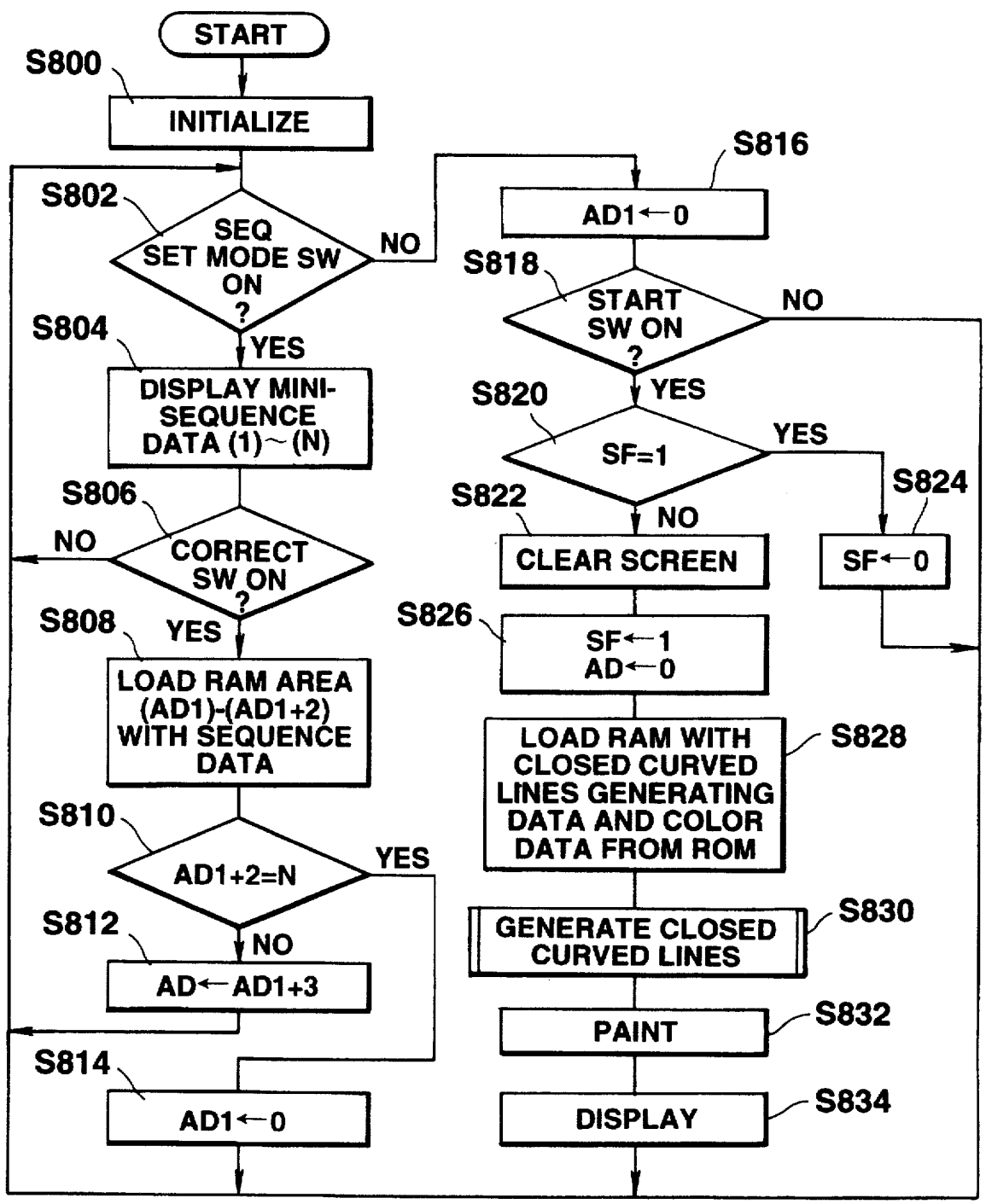
FIG. 30 is a flow chart of a main program in accordance with a fifth embodiment of the invention.

FIG. 30 is a flow chart showing the main program of a face image generating process in accordance with the fifth embodiment. When the program is started, a step S800 of initialization is first executed to initialize various registers in the CPU 1, clear work areas in the RAM 3, initialize subroutines, reset flags, etc.

A subsequent step S802 checks as to whether the sequence mode switch is "on".

A. Sequence set mode:

If the sequence set mode switch is "on", a step S804 is executed to display mini-sequence data (1) to (n).

Figure 31:
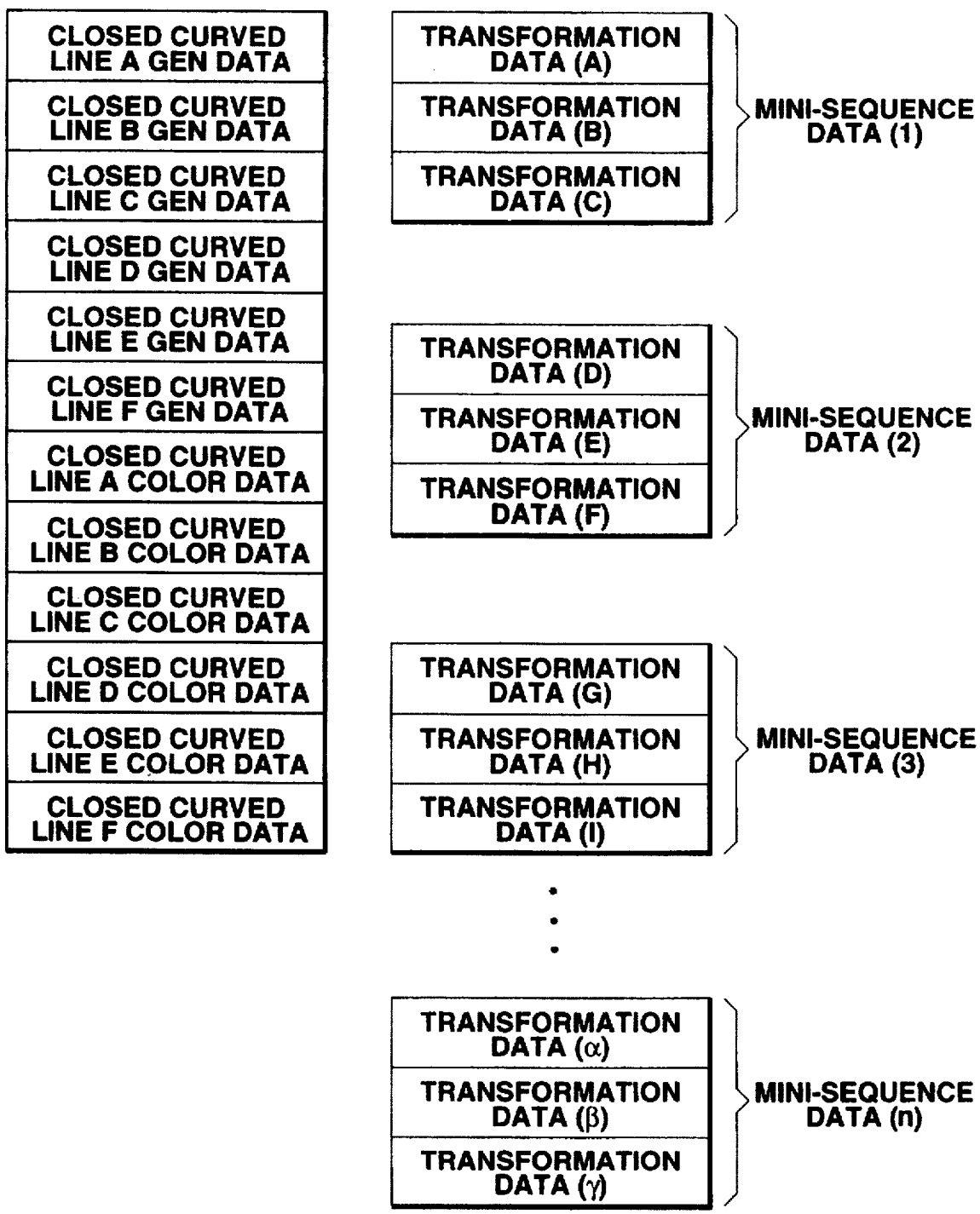
FIG. 31 represents data stored in ROM in accordance with the embodiment.

As shown in FIG. 31, the ROM 2 stores face image data for generating reference face image and a plurality of mini-sequence data records (1) to (n). The face image data comprise closed curved line A to F generating data defining closed curved lines that represent the outline and various parts of the face, and closed curved line A to F color data for designating colors with which to paint image objects surrounded by the closed curved lines.

Each mini-sequence data record (1) to (n) is constructed by a short sequence of transformation data. Particularly, in this embodiment each mini-sequence data record has three pieces of transformation data; for instance the mini-sequence data record (1) has transformation data pieces (A) to (C), the mini-sequence data record (2) has transformation data pieces (D) to (F), the mini-sequence data record (3) has transformation data pieces (G) to (I) and so on.

Desired mini-sequence data records are selected and combined into a desired sequence of transformation data pieces which are successively used to transform the reference face image for animation display with a changing face expression. This editing feature makes it possible to freely combine the mini-sequence data records for the desired animation display.

Returning to FIG. 30, after the mini-sequence data (1) to (n) have been displayed in the step S804, a check is made in a step S806 as to whether the selection switch is "on". If the selection switch is "off", the program returns to the step S802. If the selection switch is "on", a step S808 is executed to load the selected mini-sequence data record with storage areas AD1 to (AD1+2) of the RAM 3.

Figure 32:
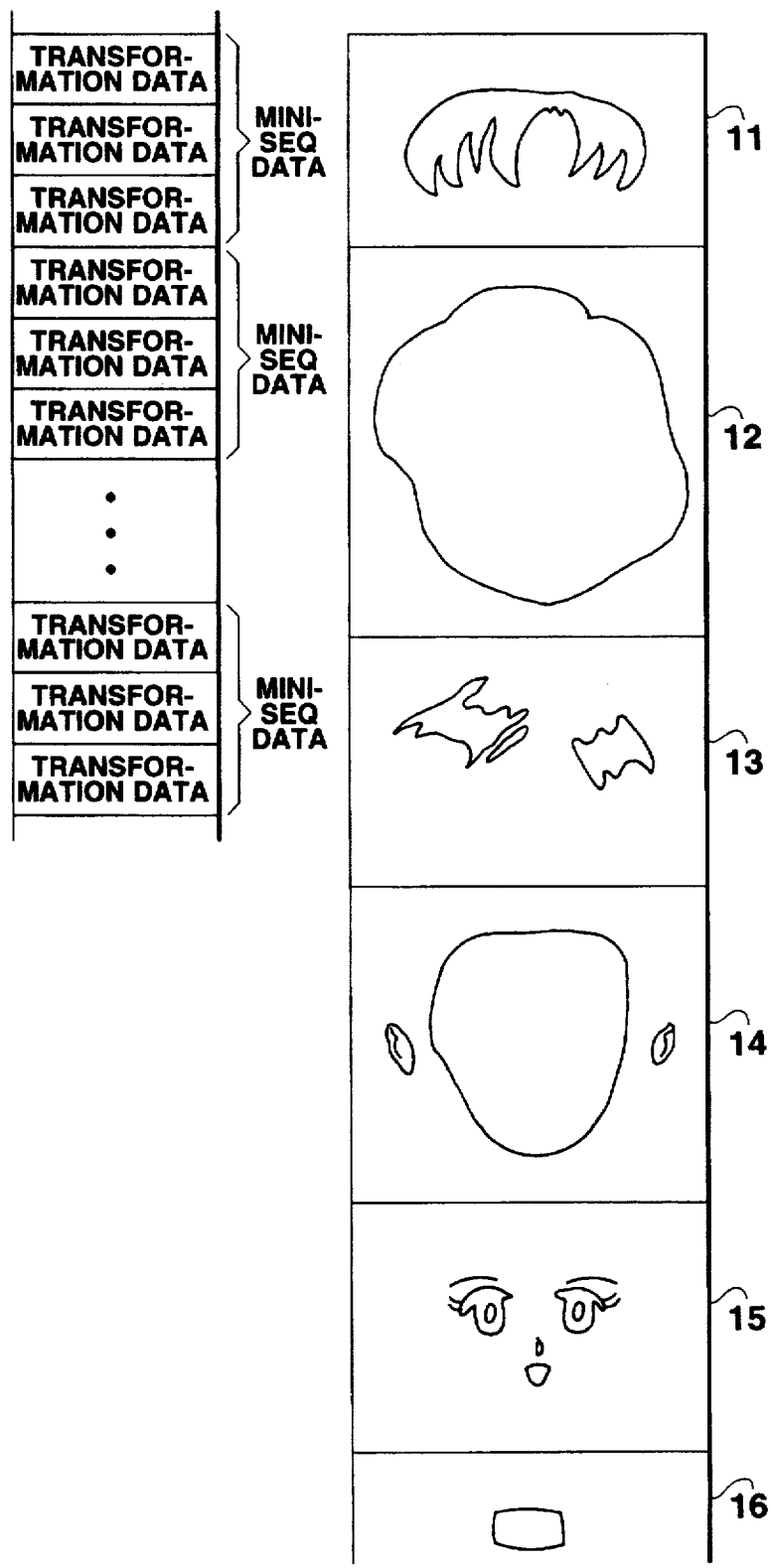
FIG. 32 represents data stored in RAM in accordance with the embodiment.

The RAM 3 has various work areas shown in FIG. 32. Data read out from the ROM 2 are stored in corresponding storage areas of the RAM 3.

The work areas of the RAM 3 are as follows.

The areas for loading closed curved line A to F generating data, closed curved line A to F color data, color condition flags (A) to (F) and background color No., are the same as those in the previous embodiments.

A plurality of areas are provided for storing the edited sequence of transformation data pieces which is obtained by selecting mini-sequence data records each having three transformation data pieces. Areas 11 to 16 are for storing generated closed curved lines corresponding to various parts of generated face. For instance the area 11 is for hair, the area 12 for hair style, the area 13 for shine of hair, the area 14 for outline of face, the area 15 for parts of face, and the area 16 for neck.

Returning to FIG. 30, after the selected mini-sequence data record has been stored in the areas AD1 to (AD1+2) of the RAM 3, a check is made in a step S810 as to whether the pointer (AD1+2) has reached n which is the maximum number of transformation data pieces for the edited sequence. In the negative, a step S812 is executed to increment the pointer AD1 by three, and the program then returns to the step S802. In the affirmative, a step S814 is executed to initialize the sequence data area address pointer AD1 to "0", and the program then returns to the step S802. In this manner a plurality of mini-sequence data records are sequentially selected and stored in the RAM 3. The selected sequence of mini-sequence data records constitute the edited sequence of transformation data pieces, based on which the animation is made in a time interrupt routine identical with that shown in FIG. 28.

B. Out of sequence set mode.

If the sequence mode switch is "off", a step S816 is executed to reset the edited-sequence data area pointer AD1 to "0". Now, it is ready to start the animation. A subsequent step S818 checks as to whether the start switch is "on".

C. When start switch is "on":

If the start switch (start/stop switch) is "on", a step S820 is executed to check whether the start flag SF has been set to "1". The start flag SF is changed alternately between "1" and "0" in response to "on" operations of the start switch. With SF="1", it is possible to provide face image sequence of animation display.

Specifically, if the start switch is depressed with SF=0, a step S826 changes the start flag to "1" after a step 822 clears the display screen. If the start switch is depressed with SF=1, a step 824 resets the start flag SF to "0", returning the step S802.

It will be appreciated that image sequence of animation is started or stopped in response to an "on" operation of the start switch.

Subsequent to the step S826, a step S828 is executed to transfer the closed curved line A to F generating data and the closed curved line A to F color data from the ROM 2 to the RAM 3 for generating the reference face image as the initial face image in the image sequence of animation.

Then a step S830 generates the closed curved lines A to F from the loaded closed curved line A to F generating data (the process being the same as that in the step S22 in FIG. 2). The next step S832 paints image objects surrounded by the generated closed curved lines A to F (the process being the same as that in the step S24 in FIG. 2), thus making the colored reference face image. Then, a step S834 displays the colored reference face image. After the step S834, the program returns to the step S802.

Further, the timer interruption process (FIG. 28) is repeatedly executed to make and display the face image sequence of animation based on the edited sequence of transformation data pieces made in the sequence set mode.

In this embodiment a plurality of mini-sequence data records (1) to (n) are provided. The editing feature selects and combines mini-sequence data records into a desired sequence of transformation data pieces. The time interrupt process makes and displays the image sequence of animation by successively making transformed face images of the reference face image in accordance with the edited sequence of transformation data pieces. With the fifth embodiment, the user can program or edit the desired image sequence of animation with desired image variations.

Now, a sixth embodiment of the invention will be described with reference to FIGS. 33 to 35.

In this embodiment, transformation data for transforming face image is input by the user himself or herself. The hardware structure of the sixth embodiment is the same as that shown in FIG. 1 except for the provision of a sequence set mode switch, an input switch and a step switch. The sequence set mode switch is operated to select a sequence set mode. In the sequence set mode, the input switch is operated to input a transformation data piece for transforming face image. In the sequence set mode, the step switch is operated on when inputting the next transformation data piece. Using these switches, the user programs a desired sequence of transformation data pieces.

Figure 33:
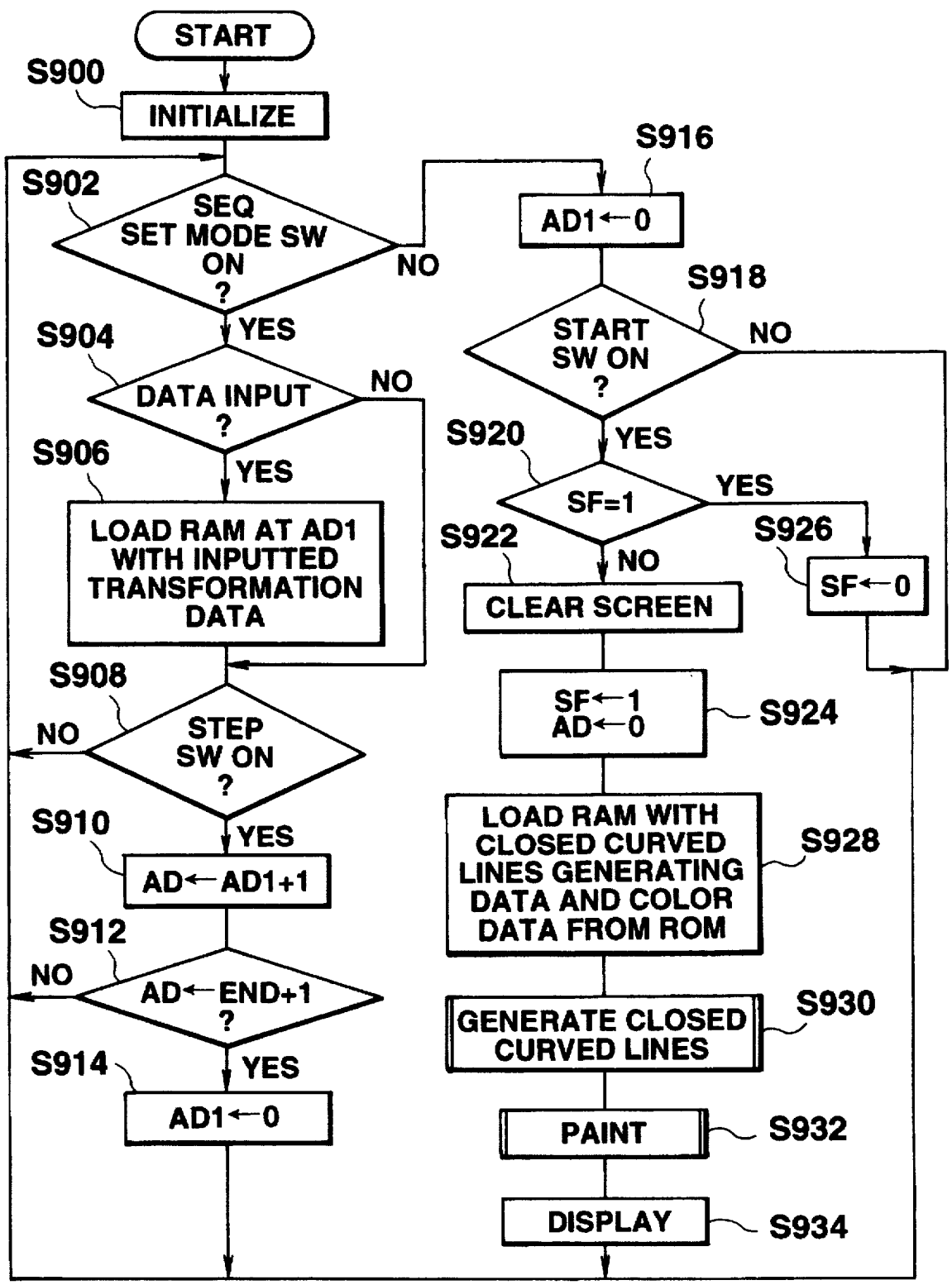
FIG. 33 is a flow chart of a main program for generating a face image in accordance with a sixth embodiment of the invention.

FIG. 33 is a flow chart showing the main program of a face image generating process in accordance with the sixth embodiment. When the program is started, a step S900 of initialization is first executed, to initialize various registers in the CPU 1, clear work areas of the RAM 3, initialize subroutines, reset flags, etc.

A subsequent step S902, check as to whether the sequence mode switch is "on".

A. Sequence mode:

If the sequence mode switch is "on", a check is made in a step S904 as to whether the input switch has been operated to input a transformation data piece.

As shown in FIG. 34, the ROM 2 stores face image data for generating a reference image. The face image data comprise closed curved line A to F generating data defining closed curved lines that represent the outline and various parts of the face, and closed curved line A go F color data designating colors with which to paint image objects surrounded by the closed curved lines.

Returning to FIG. 33, if it is found in the step S904 that the input switch has been operated, a step S906 is executed to load the input transformation data in sequence data area AD1 of the RAM 3. The input switch enables input of face image transformation data. For example, for varying the expression of the face, various transformation data for changing the shapes and positions of face portions may be input by operating the switch. The input switch may be a keyboard or a mouse.

Figure 35:
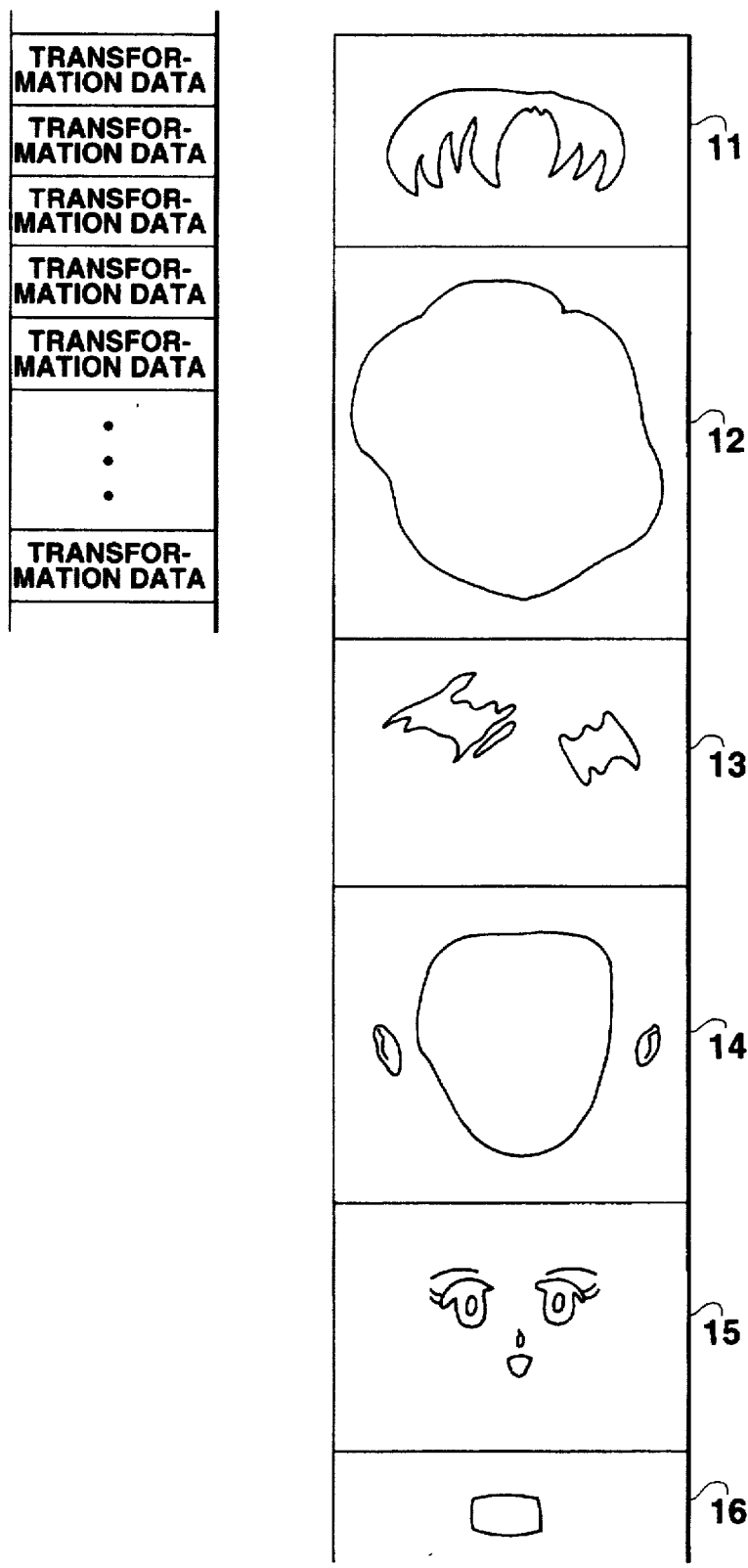
FIG. 35 represents data stored in RAM in accordance with the embodiment.

The RAM 3 has various work areas shown in FIG. 35, and data read out from the ROM 2 are loaded in corresponding areas.

The work areas of the RAM 3 are as follows.

As in the previous embodiments, there are areas for storing closed curved line A to F generating area, closed curved line A to F color data, color condition flags (A) to (F) and background color No.

Further, there are a plurality of areas for storing a sequence of transformation data pieces input by the input switch. These areas are designated by pointer AD1. Further, there are areas 11 to 16 for storing generated closed curved lines representing various parts of face image; for instance, the area 11 is for hair, the area 12 is for hair style, the area 13 for shine of hair, the area 14 is for outline of face, the area 15 is for parts of face, and the area 16 is for neck.

Returning to FIG. 33, after the step S906, a check is made in a step S908 as to whether the step switch is "on". If the step switch is "off", the program returns to the step S902. If the step switch is "on", a step S910 is executed to increment the pointer AD1 by one to make ready for the next transformation data. Then, a check is made in a step S912 as to whether the pointer AD1 has become equal to the (last address+1). Unless AD1=(last address+1), the program returns to the step S902 to repeat the same loop. Thus, in the next and following passes, a plurality of transformation data pieces are successively input and stored in sequence data areas of addresses (AD1+2), (AD1+3), . . . as shown in FIG. 35.

If it is found in the step S912 that the pointer AD1 has become equal to the (last address+1), the program goes to a step S914 to reset the pointer AD1 to "0" and then returns to the step S902. In this way, a desired sequence of transformation data pieces are input and stored. The sequence of transformation data pieces constitutes a desired image sequence data record. The time interrupt routine of FIG. 28 makes and displays a image sequence or animation in which the reference face image changes in face expression from one image frame to another by successively transforming the reference face image based on the sequence of transformation data pieces input by the user.

B. Out of sequence mode:

If the sequence mode switch is "off", a step S916 is executed to reset the pointer AD1 designating the sequence data area to "0" to make ready for animation display. Then, a check is made in a step S918 as to whether the start/stop switch has been turned on. If the start switch is "off", the program returns to the step S902.

C. When start/stop switch is turned on:

A step S920 checks as to whether the start flag SF has been set to "1". The start flag SF is changed alternately between "1" and "0" in response to "on" operations of the start switch. With SF=1, the time interrupt routine of FIG. 28 makes and displays face image sequence of animation.

If the start/stop switch is depressed with SF=0, a step S924 sets the start flag SF to "1" after a step S922 clears the display screen. If the start/stop switch is depressed with SF=1, a step S926 resets the start flag SF to "0" so that the program returns to the step S902. It will be appreciated that the face image sequence display of animation is started or stopped in response to an "on" operation of the start/stop switch. After the step S924, a step S928 loads the RAM 3 with closed curved line A to F generating data and closed curved line A to F color data from the ROM 2.

Then a step S930 generates the closed curved lines A to F according to the loaded closed curved line A to F generating data (the process being the same as that of the step S22 in FIG. 2). The next step S932 paints or colors the image objects surrounded by the generated closed curved lines A to F (the process being the same as that of the step 24 in FIG. 2), thus making a colored reference face image. Finally, a step S934 displays the generated reference face image on the display screen. Subsequent to the step S934, the program returns to the step S902.

The time interrupt process of FIG. 28 makes and displays the face image sequence of animation which starts with the reference face image made by the main program. The following images in the animation sequence are made by successively transforming the reference face image by the set sequence of transformation data pieces.

With the sixth embodiment, the user can freely decide and input transformation data contents to set a desired sequence of transformation data pieces (sequence data record). This achieves greater flexibility of transformation, resulting in a wide variety of animations.

Now, a seventh embodiment of the invention will be described with reference to FIGS. 36 to 40. The hardware structure in this embodiment is the same as that shown in FIG. 1.

Figure 36:
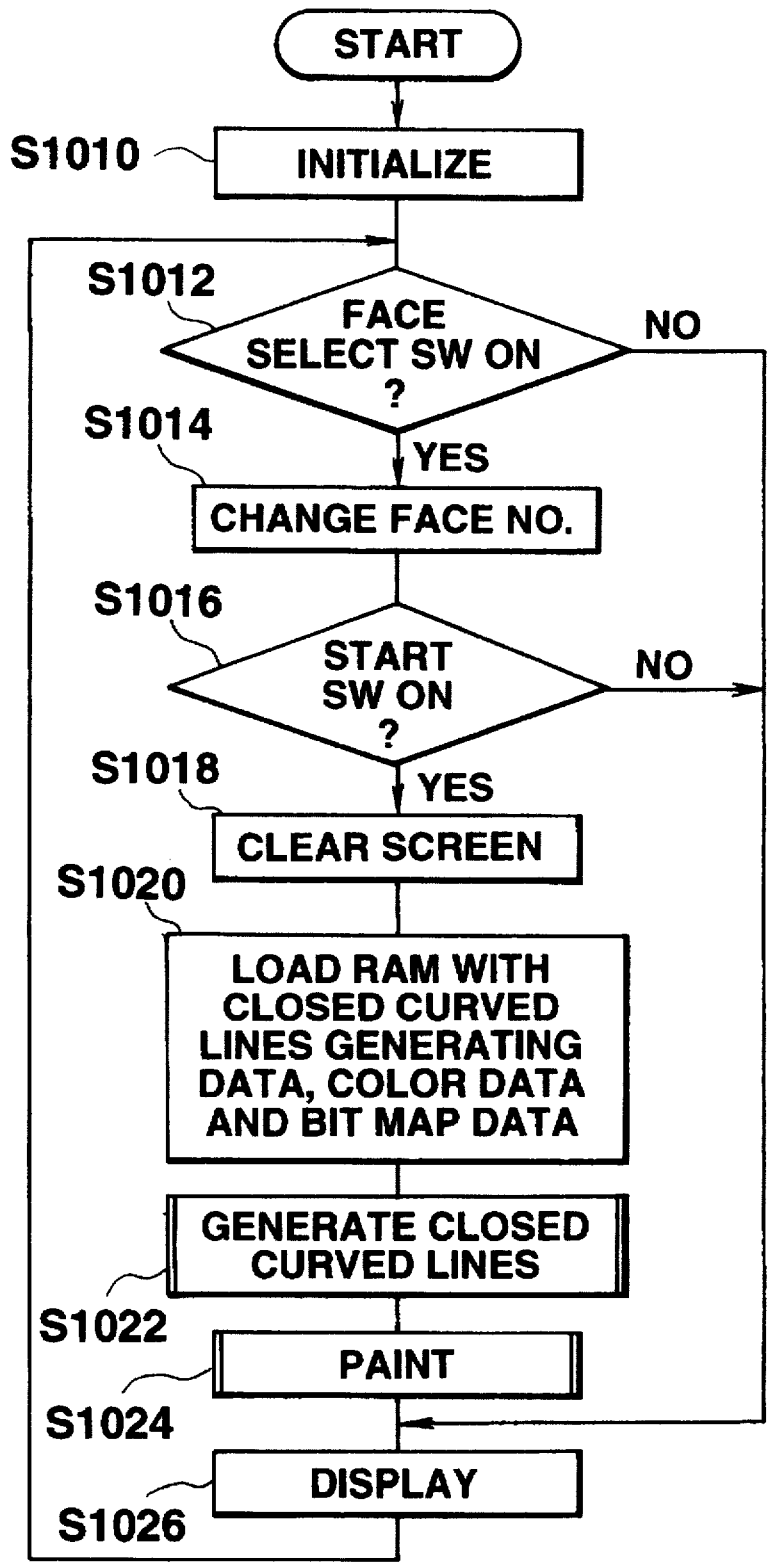
FIG. 36 is a flow chart of a main program for generating a face image in accordance with a seventh embodiment of the invention.

FIG. 36 is a flow chart showing the main program of a face image generating process in accordance with this embodiment. When the program is started, a step S1010 of initialization is first executed to initialize various registers in the CPU 1, clear work areas in the RAM 3, initialize subroutines, reset flags, etc.

In a subsequent step S1012, a check is made as to whether a face image selection switch among the switches 4 is "on". If the face image selection switch is "off", the program jumps to a step S1026 screen.

If the face image selection switch is "on", a step S1014 is executed to update the face image No. As shown in FIG. 37, the ROM 2 stores n different face image data records (1) to (n). Each face image data record comprises closed curved line A to E generating data defining closed curved lines that represent the outline and various parts of the face, and closed curved line A to E color data for designating colors with which image objects surrounded by the closed curved lines. Each face image data record further comprises bit map data F.

The bit map data F represents part of face image requiring fine display such as eyes. It directly represents image part in units of dots or pixels. The bit map data F has all dot coordinates of the part of the image and color data or No. assigned to each dot coordinate. After the step S1014, a check is made in a step S1016 as to whether the start switch among the switches 4 is "on". If the start switch is "off", the program jumps to the step S1026.

If the start switch is "on", a step 1018 is executed to clear the display screen.

Then, a step S1020 loads the RAM 3 with the face image data record of the selected face No. i.e., the closed curved line A to E generating data, the closed curved line A to E color data and the bit map data F from the ROM 2.

The RAM 3 has work areas shown in FIG. 38. Selected face No.: area for storing the selected face No.

Closed curved lines A–E generating data: areas for storing closed curved lines A–E generating data.

Closed curved lines A–E color data: areas for storing closed curved lines A–E color data.

Color condition flags A–E: areas for storing color condition flags A–E.

Dot data color condition flag: area for storing a color condition flag for bit map data. This flag is set to "–2".

Background color flag: area for storing a background color No.

Bit map data F: area for storing bit map data F.

Areas 11–15: for storing generated closed curved lines A–E.

Returning to FIG. 36, a step S1022 generates the closed curved lines A to E from the loaded closed curved line A to E generating data (the process being the same as that in the previous embodiment).

A subsequent step S1024 paints image objects of the generated closed curved lines and the bit map data, thus making a colored face image. Then a step S1026 is executed to displayed the face image thus generated on the display 5. Subsequent to the step S1026, the program returns to the step S1012. In the above way, face image that corresponds to the face image No. selected by the face image selection switch is generated and displayed.

Figure 39:
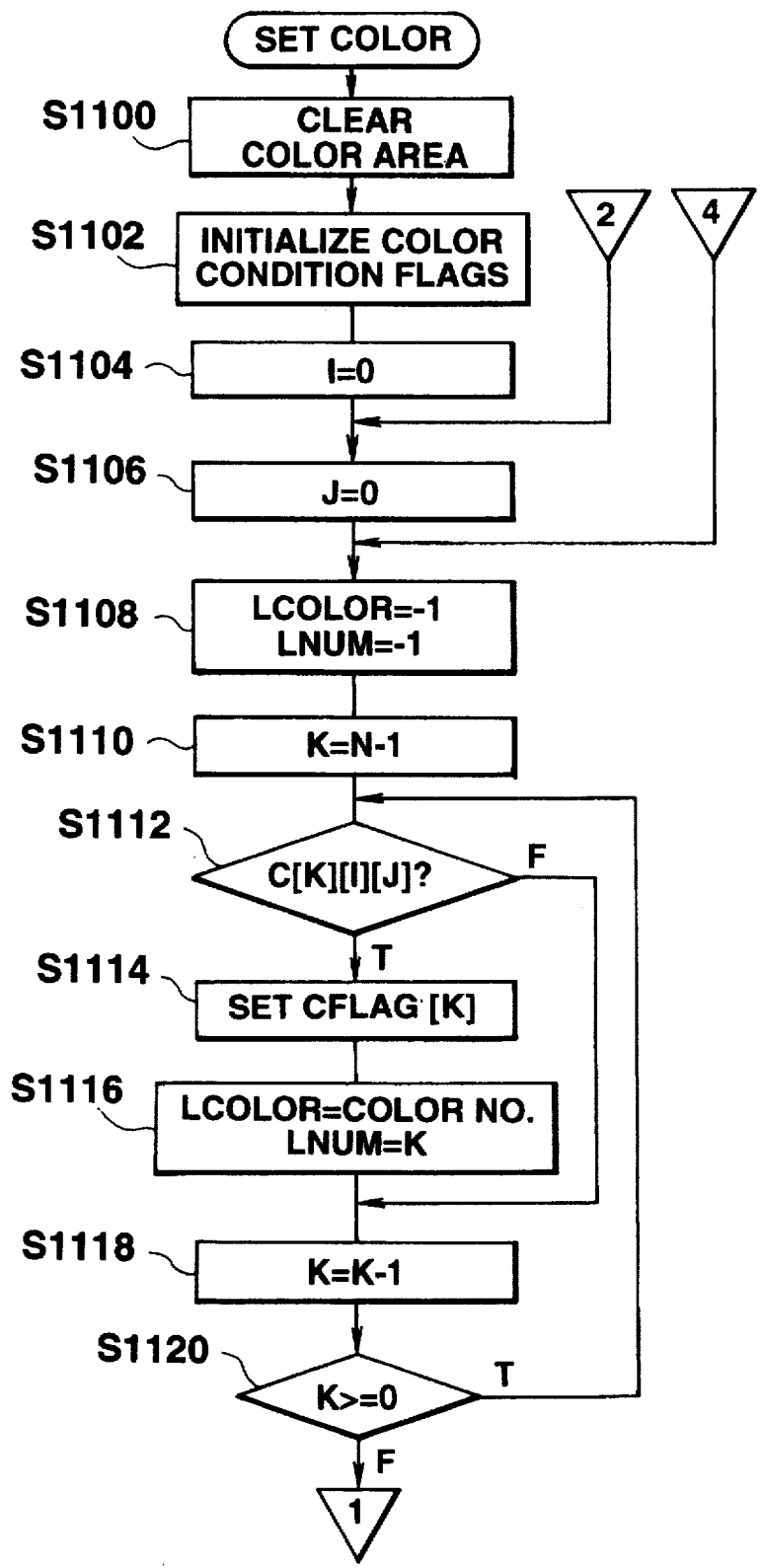
FIGS. 39 and 40 are flow chart of a routine for determining a color of coordinates in accordance with the embodiment.
Figure 40:
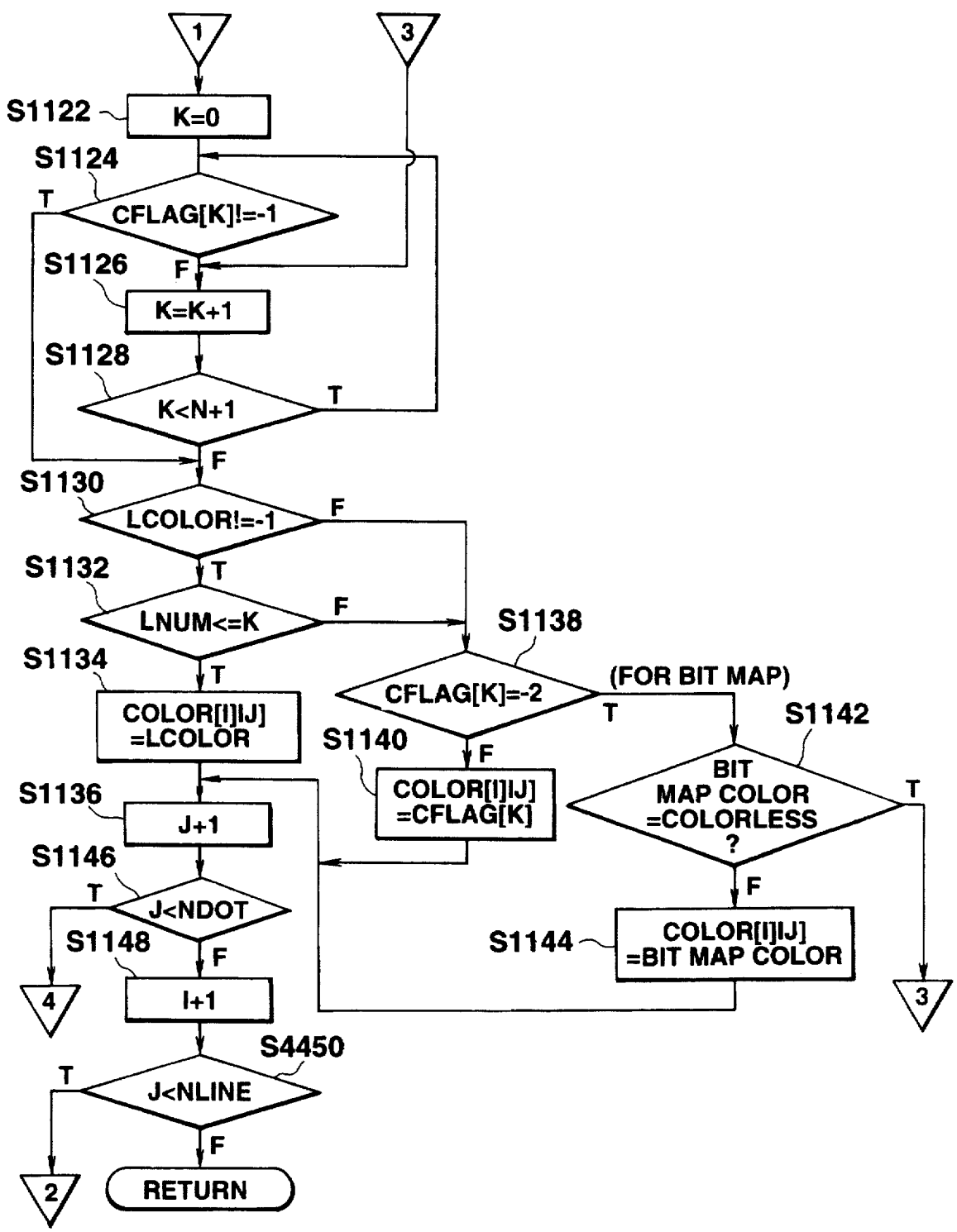

FIGS. 39 and 40 form a flow chart showing the color determining subroutine called in the step S1124 of painting in the main program. This subroutine generates a painted face image on a raster grid plane by painting objects surrounded by the drawn closed curved lines (see 11–15 in FIG. 38) while painting the bit mapped image object represented by the bit map data F. To this end, the subroutine determines a color of each coordinate on the raster grid plane. The raster grid plane has a dimension of nline lines by ndot columns so that a dot coordinate is represented by (i, j) in which i=i-th line and j=j-th column. The color determining subroutine scans the raster grid plane in a manner of raster scan starting with i=0 and j=0. If the coordinate is included in an area enclosed by one of the drawn closed curved and locates outside of an area enclosed by any other drawn closed curved lines and outside of the bit mapped image object, color thereof is determined by the color No. of the one of the drawn closed curved line. If the coordinate is a coordinate of the bit mapped image object and locates outside of an area enclosed by any of the drawn closed curved lines, color thereof is determined by the color No. assigned to that coordinate of the bit mapped image object. If the coordinate is included in an overlapped area in common with a plurality of the drawn closed curved lines (overlapping closed curved lines) and locates outside of the bit mapped image object, color thereof determined by the color No. of a selected one of the overlapping closed curved lines having the highest priority therein. If the coordinates is a coordinate of the bit mapped image and is included in an area enclosed by overlapping closed curved line(s), color thereof is determined by the color No. of the image object having the highest priority in the objects of the bit mapped image and the overlapping closed curved line(s). The highest priority is meant by the foreground or foremost ground.

First a step S1100 of this subroutine clears color areas. Thus, all the areas on the raster grid plane are initially cleared to colorless. Then, in a step S1102 color condition flags Cflag are initialized. The color condition flags Cflag[k] in which k=0 to n−1 are for image objects of Nos 0 to n−1. One of the image objects is the bit mapped image object represented by the bit map data F while the other image objects are defined by areas surrounded by the closed curved lines A–E. The priority increases as the k decreases. These color condition flags are all initialized to a null value of "−1". The color condition flag of background Cflag(n) is initialized to the background color No.

In scanning a line of the raster grid plane when entering an image object of a closed curved line, the color condition flag of that object in changed to a color No. indicative of the color of the closed curved line of that object (i.e., stored color data corresponding to the closed curved line). When entering the bit mapped image object, the color condition flag thereof is changed to an unique value of "−2". When going out of an image object, the corresponding color condition flag is changed back to a null value of "−1".

In a step S1104, the line pointer i is initialized to "0", and in a step S1106 the column pointer j is initialized to "0". The line pointer i is for designating successive lines (for instance lines 0 to 524) on the raster grid plane, and the column pointer j is for designating successive columns. By setting pointer i=0 line 0 is designated, and by setting pointer j=0 column 0 on line 0 is designated.

In a subsequent step S1108, line color lcolor is initialized to "−1", and line No. lnum is initialized to "−1." The next step S1100 initializes the image object No.k to n−1. The image object No.k designates the higher priority the smaller its value. That is, when k=0, the priority is highest, and it becomes progressively lower as k increases. Thus, in the step S1110, the lowest priority is set.

In a subsequent step S1112, a function C[k][i][j] is checked. The function C[k][i][j] is a boundary test instruction for checking whether the coordinate (i, j) on the raster grid plane locates on a boundary of an image object of No.k. The step S1112 returns "true" either when entering the object of No.k or when leaving it. In the former case, the color condition Cflag [k] flag of object NO.k is changed to color data of the closed curved line No.k, or "−2" if the image object of No.k is the bit mapped image object represented by the bit map data F.(step S1114). In the latter case, Cflag [k] is changed back to a null value of "−1" (step S1114). In a subsequent step S1116, the color No. (i.e., the color data of the closed curved line No.k) is set in the line color lcolor, and k is set in the line No.lnum. In a subsequent step S1118, k is decremented by "1", thus selecting an image object having a next higher priority. If the step 1112 returns "false", subroutine jumps to the step S1118.

Subsequent to the step S1118, a step S1120 is executed to check whether k is equal to or greater than "0" to see whether there remain image objects for boundary test. If this is the case, the subroutine goes back to the step S1112 to repeat the loop of boundary test. When the boundary test of the coordinate (i, j) has completed with respect to all image objects, the step S1120 returns "false" so that the subroutine goes to step 322 in FIG. 40.

A dot-by-dot painting process is executed as shown in FIG. 40. First, step S1122 initializes k to "0" pointing to the highest priority. For example, when there are 6 image objects (five closed curved lines and one bit-mapped image object), they are numbered by 0 to 5 in the priority decreasing order while the background is numbered by 6. Then, in a step S1124 a check is made as to whether the color condition flag Cflag [k] is not equal to a null value of "−1". In the flow chart, this check is expressed as Cflag[k]!=−1.

with the sign of "!" representing "not" in the "C language". The color condition flag Cflag[k] not equal to "−1" means that the coordinate (i, j) locates inside of the image object of No.k or on the left boundary thereof.

If the color condition flag Cflag[k] is not equal to "−1", the subroutine goes to a step S1130; If the color condition flag Cflag[k] has been set to the null value "−1", a step S1126 increments the k by one, thus selecting a next lower priority. If k<n+1 (step S1128), the subroutine returns to the step S1124. In this manner, the subroutine finds the image object of No.k having the highest priority in image objects including the coordinate (i,j). If k=n+1 (step S1128), the subroutine goes to the step S1130.

In the step S1130, a check is made as to whether the line color lcolor is not equal to "−1". The line color lcolor remains "−1" if the coordinate (i, j) does not locate on any boundary of image objects. In this case, the subroutine goes to a step S1138. If lcolor is not equal to "−1", a step S1132 checks as to whether the line No. lnum is equal to or less than k. In the affirmative, lcolor determines the color of the coordinate (i, j). Thus a step S1134 sets color [i] [j] to lcolor, thus painting the coordinate (i, j). In the negative, the subroutine goes to the step S1138.

The step S1138 checks as to whether Cflag[k]=−2. In the negative, the color condition Cflag [k] determines the color of the coordinate (i, j). Thus, a step 1140 sets color [i] [j] to Cflag[k], painting the coordinate (i, j). In the affirmative, i.e., if the coordinate (i, j) is included in the bit mapped image object, a step S1142 checks whether the bit map color assigned to the coordinate (i, j) is colorless. In the affirmative, the subroutine moves back to the step S1126. In the negative, the bit map color determines the color of the coordinate (i, j). Thus, a step sets color [i] [j] to the bit map color to thereby paint the coordinate (i, j).

After painting the coordinate (i, j) in either of the steps S1184, S1140 and S1144, a step S1136 is executed to increment the column pointer j by one for the next coordinate or dot. Then, in a step S1146 a check is made as to whether the j has reached ndots (for instance 256 dots as the number of pixels per line on the raster grid plane) have been reached. If not, the subroutine goes back to the step 1108 in FIG. 39 to repeat the same process. Thus, in the next pass the color is determined with respect to the next dot on the same line. With j=ndot at step S1146, the color determining and pointing process has been completed with respect to all the dots or pixels in one line, and a step S1148 is executed.

In the step S1148, the line pointer i is incremented by "1" for the next line. In a subsequent step S1150, a check is made as to whether the line pointer i has reached n lines (for instance 525 lines as the number of lines on the raster grid plane). If not, the subroutine goes back to the step S1106 in FIG. 39 to reset the column pointer j to "0" for repeating the same process for the next line. With j=nline at step S1150, the color determining and painting process has been completed for all the pixels on the raster grid plane, thus ending the subroutine.

In this manner, the color determining process scans the raster grid plane with respect to each coordinate or pixel thereof in a raster scan manner. For each image object enclosed by a closed curved line or represented by bit/map data, the process tests the coordinate to see whether it is included in the image object or not. When an image object does not overlap with any other image object, it is painted with the color data stored for that image object. When an area in common to a plurality of image objects (overlapping objects) is found, the area is painted with the color of the overlapping object having the highest priority (i.e., the one defining the foreground among the overlapping objects).

After painting process, a completed face image is displayed on the display 5.

With this embodiment, there is no need of having color data for each pixel, thus reducing the stored data required. In addition, it is possible to reduce the memory capacity, thus leading to cost reduction.

Further, this embodiment can provide a face image having higher quality since bit map data are applied to represent those parts of the face (e.g., eyes) which require a detailed picture for reality.

What is claimed is:

1. A method for generating an image, comprising the steps of:

(A) storing a plurality of closed curved line data which define a plurality of closed curved lines on a predetermined plane;

(B) storing a plurality of color data each corresponding to a different one of said plurality of closed curved lines;

(C) computing coordinates of each closed curved line on said predetermined plane based on said stored closed curved line data to thereby draw said plurality of closed curved lines;

(D) designating an area on said predetermined plane including said computed coordinates, and transforming said computed coordinates included in said designated area based on transforming data;

(E) determining a color of coordinates of an area enclosed by said coordinates of a closed curved line including said transformed coordinates according to said stored color data corresponding to said closed curved line, and determining a color of coordinates of an overlapped area in common with a plurality of areas enclosed by a plurality of overlapping curved lines, by selecting said stored color data corresponding to one of said overlapping closed curved lines; and (F) painting coordinates of a closed curved line including said transformed coordinates, and coordinates of an area enclosed by said coordinates of said closed curved line with said determined color.

2. The method of claim 1 wherein said step (D) comprises the steps of:

providing a plurality of area designating data and a plurality of transforming data;

selecting one of said plurality of area designating data and one of said plurality of transforming data; and designating an area on said predetermined plane according to said selected area designating data, and transforming said computed coordinates of a closed curved line included in said designated area according to said selected transforming data.

3. The method of claim 1 wherein said designated area defines a rectangle area which is divided into a plurality of triangles, and wherein said step (D) involves transforming coordinates of a closed line included in said rectangle area by transforming each of said triangles from a first triangle to a second triangle.

4. The method of claim 3 wherein said first triangle is a right triangle.

5. The method of claim 4 wherein vertexes of said right triangle before transforming are represented by coordinates (T1x, T1y), (T2x, T2y) and (T3x, T3y), an internal point of said right triangle before transforming is represented by coordinates (Px, Py) and said vertexes after transforming are represented by coordinates (T1'x, T1'y), (T2'x, T2'y) and (T3'x, T3'y) whereas said internal point after transforming is represented by coordinates (P'x, P'y) in which $$P'x=(T1x'/T1x)Px+\{(T2'x-T1'x)/T2y\}Py, \text{ and}$$

$$P'y=(T1y'/T1x)Px+\{(T2'y-T1'y)/T2y\}Py.$$

6. The method of claim 4 wherein vertexes of said right triangle before transforming are represented by coordinates (T1x, T1y), (T2x, T2y) and (T3x, T3y), an internal point of said right triangle before transforming is represented by coordinates (Px, Py) and said vertexes after transforming are represented by coordinates (T1'x, T2'y), (T2'x, T2'y) and (T3x, T3y) whereas said internal point after transforming is represented by coordinates (P'x, P'y) in which $$P'x=\{(T2'x-T1'x)/T2x\}Px+\{(T1'x/T1y)Py, \text{ and}$$

$P'y=\{(T2'y-T1'y)/T2x\}Px+\{(T1'y/T1y)\}Py$.

7. The method of claim 1 wherein said plurality of closed curved lines represent parts of a face image.

8. An apparatus for generating an image, comprising:

storage means for storing a plurality of closed curved line data which define s plurality of closed curved lines on a predetermined plane and for storing a plurality of color data each corresponding to a different one of said plurality of closed curved lines;

drawing means for computing coordinates of each closed curved line on said predetermined plane based on said closed curved line data stored in said storage means to thereby draw said plurality of closed curved lines;

transforming means for designating an area on said predetermined plane including said computed coordinates and for transforming said computed coordinates included in said designated area based on transforming data;

overlap determining means for determining whether an area enclosed by coordinates of a closed curved line including said transformed coordinates is overlapped with an area enclosed by coordinates of a different closed curved line or lines; and painting means for painting coordinates of an area enclosed by coordinates of a closed curved line including said transformed coordinates such that those coordinates of an area which is not found to be overlapped by said overlap determining means are painted with color data stored in said storage means and corresponding to said closed curved line whereas those coordinates of an area which is found to be overlapped by said overlap determining means are painted with color data stored in said storage means and corresponding to one of overlapping closed curved lines.

9. The apparatus of claim 8 further comprising display means for displaying said plurality of closed curved lines painted by said painting means.

10. The apparatus of claim 9 wherein said display means includes means for displaying said designated area.

11. The apparatus of claim 8 further comprising printing means for printing said plurality of closed curved lines painted by said painting means.

12. The apparatus of claim 8 wherein said transforming means comprises:

means for storing area designating data and transforming data; and means for designating an area on said predetermined plane based on said stored area designating data and for transforming coordinates of a closed curved line included in said designated area based on said stored transforming data.

13. The apparatus of claim 8 wherein said transforming means comprises:

means for storing a plurality of area designating data and a plurality of transforming data; and means for selecting one of said stored plurality of area designating data to thereby designate an area, for selecting one of said stored plurality of transforming data and for transforming coordinates of a closed curved line included in said designated area based on said selected transforming data.

14. The apparatus of claim 8 wherein said designated area is defined by a rectangle area which is divided into a plurality of triangles, and wherein said transforming means comprises means for transforming coordinates of a closed curved line included in said rectangle area by transforming each of said triangles from a first triangle to a second triangle.

15. The apparatus of claim 14 wherein said first triangle is defined by a right triangle.

16. The apparatus of claim 15 wherein vertexes of said right triangle before transforming are represented by coordinates (T1x, T1y), (T2x, T2y) and (T3x, T3y), an internal point of said right triangle before transforming is represented by coordinates (Px, Py) and vertexes after transforming are represented by coordinates (T1'x, T1'y), (T2'x, T2'y) and (T3x, T3y) whereas said internal point after transforming is represented by coordinates (P'x, P'y) in which:

$P'x=(T1x/T1x)Px+\{(T2'x-T1'x)/T2y\}Py$, and $P'y=(T1y/T1x)Px+\{(T2'y-T1'y)/T2y\}Py$.

17. The apparatus of claim 15 wherein vertexes of said right triangle before transforming are represented by coordinates (T1x, T1y), (T2x, T2y) and (T3x, T3y), an internal point of said right triangle before transforming is represented by coordinates (Px, Py) and said vertexes after transforming are represented by coordinates (T1'x, T2'y), (T2'x, T2'y) and (T3x, T3y) whereas said internal point after transforming is represented by coordinates (P'x, P'y) in which $P'x=\{(T2'x-T1'x)/T2x\}Px+\{(T1'x/T1y)Py$, and $P'y=\{(T2'y-T1'y)/T2x\}Px+\{(T1'y/T1y)Py$.

18. The apparatus of claim 8 wherein said plurality of closed curved lines represent parts of a face image.

19. A method for generating an image, comprising the steps of:

(A) storing a plurality of closed curved line data which define a plurality of closed curved lines on a predetermined plane;

(B) storing a plurality of color data each corresponding to a different one of said plurality of closed curved lines;

(C) computing coordinates of each closed curved line on said predetermined plane based on said stored closed curved line data to thereby draw said plurality of closed curved lines;

(D) successively providing a plurality of transformation data;

(E) transforming said computed coordinates of a closed curved line included in an area on said predetermined plane based on said successively provided transformation data;

(F) determining a color of coordinates of an area enclosed by said coordinates of a closed curved line including said transformed coordinates according to said stored color data corresponding to said closed curved line, and determining a color of coordinates of an overlapped area in common with a plurality of areas enclosed by a plurality of overlapping closed curved lines by selecting said stored color data corresponding to one of said overlapping closed curved lines; and (G) painting coordinates of a closed curved line including said transformed coordinates, and coordinates of an area enclosed by said coordinates of said closed curved line with said determined color.

20. The method of claim 19 wherein said step (D) comprises the steps of:

providing a plurality of sequence data each constructed by a plurality of transformation data;

selecting one of said plurality of sequence data; and successively providing a plurality of transformation data constructing said selected sequence data.

21. The method of claim 19 wherein said step (D) comprises the steps of:

providing a plurality of short sequence data each constructed by a limited number of transformation data;

selecting and combining a plurality of said short sequence data to thereby make sequence data; and successively providing a plurality of said transformation data constructing said made sequence data.

22. The method of claim 19 wherein said plurality of closed curved lines represent parts of a face image.

23. An apparatus for generating an image, comprising:

storage means for storing a plurality of closed curved line data which define a plurality of closed curved lines on a predetermined plane and for storing a plurality of color data each corresponding to a different one of said plurality of curved lines;

drawing means for computing coordinates of each closed curved line on said predetermined plane based on said closed curved line data stored in said storage means to thereby draw said plurality of closed curved lines:

transformation data providing means for successively providing s plurality of transformation data;

transforming means for transforming said computed coordinates of a closed line included in an area on said predetermined plane based on said successively provided transformation data;

overlap determining means for determining whether an area enclosed by coordinates of a closed curved line including said transformed coordinates is overlapped with an area enclosed by coordinates of a different closed curved line or lines; and painting means for painting coordinates of an area enclosed by coordinates of a closed curved line including said transformed coordinates such that those coordinates of an area which is not found to be overlapped by said overlap determining means are painted with color data stored in said storage means and corresponding to said closed curved line whereas those coordinates of an area which is found to be overlapped by said overlap determining means are painted with color data stored in said storage means and corresponding to one of overlapping closed curved lines.

24. The apparatus of claim 23 wherein said transformation data providing means comprises:

means for storing a plurality of sequence data each constructed by a plurality of transformation data;

means for selecting one of said plurality of sequence data; and means for successively reading out a plurality of transformation data constructing said selected sequence data.

25. The apparatus of claim 23 wherein said transformation data providing means comprises:

means for storing a plurality of short sequence data each constructed by a limited number of transformation data;

means for selecting and combining a plurality of said short sequence data to thereby make sequence data; and means for successively providing a plurality of transformation data constructing said made sequence data.

26. The apparatus of claim 23 wherein said plurality of closed curved lines represent parts of a face image.

27. A method for generating an image, comprising the steps of:

(A) storing a plurality of closed curved line data which define a plurality of closed curved lines on a predetermined plane;

(B) storing a plurality of color data each corresponding to a different one of said plurality of closed curved lines;

(C) storing all coordinates of an image object on said predetermined plane, said coordinates referred to as dot coordinates, and storing color data each assigned to a different one of said dot coordinates;

(D) computing coordinates of each closed curved line on said predetermined plane based on said stored closed curved line data to thereby draw said plurality of closed curved lines;

(E) determining color of each coordinate on said predetermined plane such that (a) if the coordinate is included in an area enclosed by one of said drawn closed curved lines and locates outside of an area enclosed by any other of said drawn closed curved lines and outside of said image object, color thereof is determined by stored color data corresponding to said one of said drawn closed curved lines, (b) if the coordinate is one of said dot coordinates and locates outside of an area enclosed by any of said drawn closed curved lines, color thereof is determined by stored color data assigned to said one of said dot coordinates, (c) if the coordinate is included in an overlapped area in common with a plurality of said drawn closed curved lines, referred to as overlapping closed curved lines, and locates outside of said image object, color thereof is determined by stored color data corresponding to a selected one of said overlapping closed curved lines, and (d) if the coordinate is one of said dot coordinates and is included in an area enclosed by at least one of said drawn closed curved line, referred to as overlapping closed curved line(s), color thereof is determined by a one selected from among stored color data assigned to said one of said dot coordinates and stored color data corresponding to said overlapping closed curved line(s); and (F) painting each coordinate on said predetermined plane with said determined color.

28. The method of claim 27 wherein said plurality of closed curves represent parts of a face image.

29. An apparatus for generating an image comprising:

first storage means for storing a plurality of closed curved line data which define a plurality of closed curved lines on a predetermined plane and for storing a plurality of color data each corresponding to a different one of said plurality of closed curved lines;

second storage means for storing all coordinates of an image object on said predetermined plane, said coordinates referred to as dot coordinates and for storing color data each assigned to a different one of said dot coordinates;

drawing means for computing coordinates of each closed curved line on said predetermined plane based on said stored closed curved line data to thereby draw said plurality of closed curved lines;

color determining means for determining color of each coordinate on said predetermined plane such that (a) if the coordinate is included in an area enclosed by one of said drawn closed curved lines and locates outside of an area enclosed by any other of said drawn closed curved lines and outside of said image object, color thereof is determined by stored color data corresponding to said one of said drawn closed curved lines, (b) if the coordinate is one of said dot coordinates and locates outside of an area enclosed by any of said drawn closed curved lines, color thereof is determined by stored color data assigned to said one of said dot coordinates, (c) if the coordinate is included in an overlapped area in common with a plurality of said drawn closed curved lines, referred to as overlapping closed curved lines, and locates outside of said image object, color thereof is determined by stored color data corresponding to a selected one of said overlapping closed curved lines, and (d) if the coordinate is one of said dot coordinates and is included in an area enclosed by at least one of said drawn closed curved line, referred to as overlapping closed curved line(s), color thereof is determined by a one selected from among stored color data assigned to said one of said dot coordinates and stored color data corresponding to said overlapping closed curved line(s); and painting means for painting each coordinate on said predetermined plane with said determined color.

30. The apparatus of claim 29 wherein said plurality of closed line curves represent parts of a face image.

31. A method for generating a face image, comprising the steps of:

(A) storing a plurality of closed curved line data which define a plurality of closed curved lines on a predetermined plane each representing a part of the face image;

(B) storing a plurality of color data each corresponding to a different one of said plurality of closed curved lines and representing a color of a corresponding part of the face image;

(C) computing coordinates of each closed curved line on said predetermined plane based on said stored closed curved line data to thereby draw said plurality of closed curved lines;

(D) designating an area on said predetermined plane including said computed coordinates, and transforming said computed coordinates included in said designated area based on transforming data;

(E) determining a color of coordinates of an area enclosed by said coordinates of a closed curved line including said transformed coordinates according to said stored color data corresponding to said closed curved line, and determining a color of coordinates of an overlapped area in common with a plurality of areas enclosed by a plurality of overlapping curved lines, by selecting said stored color data corresponding to one of said overlapping closed curved lines; and (F) painting coordinates of a closed curved line including said transformed coordinates, and coordinates of an area enclosed by said coordinates of said closed curved line with said determined color.

32. An apparatus for generating a face image, comprising:

storage means for storing a plurality of closed curved line data which define a plurality of closed curved lines on a predetermined plane each representing a part of the face image and for storing a plurality of color data each corresponding to a different one of said plurality of closed curved lines and representing a color of a corresponding part of the face image;

drawing means for computing coordinates of each closed curved line on said predetermined plane based on said closed curved line data stored in said storage means to thereby draw said plurality of closed curved lines;

transforming means for designating an area on said predetermined plane including said computed coordinates and for transforming said computed coordinates included in said designated area based on transforming data;

overlap determining means for determining whether an area enclosed by coordinates of a closed curved line including said transformed coordinates is overlapped with an area enclosed by coordinates of a different closed curved line or lines; and painting means for painting coordinates of an area enclosed by coordinates of a closed curved line including said transformed coordinates such that those coordinates of an area which is not found to be overlapped by said overlap determining means are painted with color data stored in said storage means and corresponding to said closed curved line whereas those coordinates of an area which is found to be overlapped by said overlap determining means are painted with color data stored in said storage means and corresponding to one of overlapping closed curved lines.

33. A method for generating a face image, comprising:

(A) storing a plurality of closed curved line data which define a plurality of closed curved lines on a predetermined plane each representing a part of the face image;

(B) storing a plurality of color data each corresponding to a different one of said plurality of closed curved lines and representing a color of a corresponding part of the face image;

(C) computing coordinates of each closed curved line on said predetermined plane based on said stored closed curved line data to thereby draw said plurality of closed curved lines;

(D) successively providing a plurality of transformation data;

(E) transforming said computed coordinates of a closed curved line included in an area on said predetermined plane based on said successively provided transformation data;

(F) determining a color of coordinates of an area enclosed by said coordinates of a closed curved line including said transformed coordinates according to said stored color data corresponding to said closed curved line, and determining a color of coordinates of an overlapped area in common with a plurality of areas enclosed by a plurality of overlapping closed curved lines by selecting said stored color data corresponding to one of said overlapping closed curved lines; and (G) painting coordinates of a closed curved line including said transformed coordinates, and coordinates of an area enclosed by said coordinates of said closed curved line with said determined color.

34. An apparatus for generating a face image, comprising:

storage means for storing a plurality of closed curved line data which define a plurality of closed curved lines on a predetermined plane each representing a part of the face image and for storing a plurality of color data each corresponding to a different one of said plurality of curved lines and representing a color of a corresponding part of the face image;

drawing means for computing coordinates of each closed curved line on said predetermined plane based on said closed curved line data stored in said storage means to thereby draw said plurality of closed curved lines;

transformation data providing means for successively providing a plurality of transformation data;

transforming means for transforming said computed coordinates of a closed line included in an area on said predetermined plane based on said successively provided transformation data;

overlap determining means for determining whether an area enclosed by coordinates of a closed curved line including said transformed coordinates is overlapped with an area enclosed by coordinates of a different closed curved line or lines; and painting means for painting coordinates of an area enclosed by coordinates of a closed curved line including said transformed coordinates such that those coordinates of an area which is not found to be overlapped by said overlap determining means are painted with color data stored in said storage means and corresponding to said closed curved line whereas those coordinates of an area which is found to be overlapped by said overlap determining means are painted with color data stored in said storage means and corresponding to one of overlapping closed curved lines.

35. A method for generating a face image, comprising the steps of:

(A) storing a plurality of closed curved line data which define a plurality of closed curved lines on a predetermined plane each representing a part of the face image;

(B) storing a plurality of color data each corresponding to a different one of said plurality of closed curved lines and representing a color of a corresponding part of the face image;

(C) storing all coordinates of an image object on said predetermined plane, said coordinates referred to as dot coordinates, and storing color data each assigned to a different one of said dot coordinates;

(D) computing coordinates of each closed curved line on said predetermined plane based on said stored closed curved line data to thereby draw said plurality of closed curved lines;

(E) determining color of each coordinate on said predetermined plane such that (a) if the coordinate is included in an area enclosed by one of said drawn closed curved lines and locates outside of an area enclosed by any other of said drawn closed curved lines and outside of said image object, color thereof is determined by stored color data corresponding to said one of said drawn closed curved lines, (b) if the coordinate is one of said dot coordinates and locates outside of an area enclosed by any of said drawn closed curved lines, color thereof is determined by stored color data assigned to said one of said dot coordinates, (c) if the coordinate is included in an overlapped area in common with a plurality of said drawn closed curved lines, referred to as overlapping closed curved lines, and locates outside of said image object, color thereof is determined by stored color data corresponding to a selected one of said overlapping closed curved lines, and (d) if the coordinate is one of said dot coordinates and is included in an area enclosed by at least one of said drawn closed curved line, referred to as overlapping closed curved line(s), color thereof is determined by a one selected from among stored color data assigned to said one of said dot coordinates and stored color data corresponding to said overlapping closed curved line(s); and (F) painting each coordinate on said predetermined plane with said determined color.

36. An apparatus for generating a face image comprising:

first storage means for storing a plurality of closed curved line data which define a plurality of closed curved lines on a predetermined plane each representing a part of the face image and for storing a plurality of color data each corresponding to a different one of said plurality of closed curved lines and representing a color of a corresponding part of the face image;

second storage means for storing all coordinates of an image object on said predetermined plane, said coordinates referred to as dot coordinates and for storing color data each assigned to a different one of said dot coordinates;

drawing means for computing coordinates of each closed curved line on said predetermined plane based on said stored closed curved line data to thereby draw said plurality of closed curved lines;

color determining means for determining color of each coordinate on said predetermined plane such that (a) if the coordinate is included in an area enclosed by one of said drawn closed curved lines and locates outside of an area enclosed by any other of said drawn closed curved lines and outside of said image object, color thereof is determined by stored color data corresponding to said one of said drawn closed curved lines, (b) if the coordinate is one of said dot coordinates and locates outside of an area enclosed by any of said drawn closed curved lines, color thereof is determined by stored color data assigned to said one of said dot coordinates, (c) if the coordinate is included in an overlapped area in common with a plurality of said drawn closed curved lines, referred to as overlapping closed curved lines, and locates outside of said image object, color thereof is determined by stored color data corresponding to a selected one of said overlapping closed curved lines, and (d) if the coordinate is one of said dot coordinates and is included in an area enclosed by at least one of said drawn closed curved line, referred to as overlapping closed curved line(s), color thereof is determined by a one selected from among stored color data assigned to said one of said dot coordinates and stored color data corresponding to said overlapping closed curved line(s); and painting means for painting each coordinate on said predetermined plane with said determined color.

\* \* \* \* \*

UNITED STATES PATENT AND TRADEMARK OFFICE
CERTIFICATE OF CORRECTION

PATENT NO. : 5,611,037
DATED : March 11, 1997
INVENTOR(S) : Hayashi

It is certified that error appears in the above-indentified patent and that said Letters Patent is hereby corrected as shown below:

Column 37, (claim 8, line 3), "s" should be --a--

Column 39, (claim 23, line 12), "s" should be --a--

Signed and Sealed this

Twenty-sixth Day of August, 1997

Attest:

BRUCE LEHMAN

Attesting Officer

Commissioner of Patents and Trademarks